United States Patent
Kubota et al.

[11] Patent Number: 6,128,056
[45] Date of Patent: Oct. 3, 2000

[54] LIQUID CRYSTAL DISPLAY ELEMENT IN WHICH THE POLYMER LIQUID CRYSTAL COMPOSITE LAYER IS DIVIDED INTO AN ACTIVE AREA AND A NON-ACTIVE AREA AND METHOD OF MANUFACTURING THE SAME

[75] Inventors: Hirofumi Kubota; Kenji Nakao, both of Osaka; Tsuyoshi Uemura, Kadoma, all of Japan

[73] Assignee: Matsushita Electric Industrial Co., Ltd., Japan

[21] Appl. No.: 09/230,891

[22] PCT Filed: Jun. 3, 1998

[86] PCT No.: PCT/JP98/02470

§ 371 Date: Feb. 2, 1999

§ 102(e) Date: Feb. 2, 1999

[87] PCT Pub. No.: WO98/55896

PCT Pub. Date: Dec. 10, 1998

[30] Foreign Application Priority Data

| Jun. 4, 1997 | [JP] | Japan | 9-146182 |
| May 28, 1998 | [JP] | Japan | 10-147488 |
| May 29, 1998 | [JP] | Japan | 10-149033 |

[51] Int. Cl.[7] ............................................. G02F 1/1333
[52] U.S. Cl. .............................. 349/86; 349/88; 349/92
[58] Field of Search ................................. 349/86, 88, 92, 349/93

[56] References Cited

U.S. PATENT DOCUMENTS

| 3,872,050 | 3/1975 | Benton et al. | 252/480 |
| 5,200,845 | 4/1993 | Crooker et al. | |
| 5,243,451 | 9/1993 | Kanemoto et al. | |
| 5,304,323 | 4/1994 | Arai et al. | 252/299.5 |
| 5,327,271 | 7/1994 | Takeuchi et al. | 359/75 |

(List continued on next page.)

FOREIGN PATENT DOCUMENTS

| 3-63625 | 3/1991 | Japan. |
| 3-245121 | 10/1991 | Japan. |
| 3-278024 | 12/1991 | Japan. |
| 4-98220 | 3/1992 | Japan. |
| 4-96713 | 8/1992 | Japan. |
| 5-210095 | 8/1993 | Japan. |
| 7-20444 | 1/1995 | Japan. |

OTHER PUBLICATIONS

Tahara et al., Structure Analysis of LCPC by Conocal Fluorescence Microscopy and its Application, 1996, pp. 403–404.

Kobayashi et al., Light Switching Properties and mechanism of Electro–Optical Effect for (Polymer)/(Liquid crystal) Composite Film, 1989, pp. 190–191.

Flate Panel Display, 1991, pp. 219–224.

Kunigita et al., A Full–Color Projection TV Using LC/Polymer Composite Light Valves, 1990, pp. 227–230.

Tahara et al., Structure Analysis of LCPC by Confocal Fluorescence Microscopy and its Application, 1996, pp. 403–404 with partial translation.

(List continued on next page.)

Primary Examiner—Kenneth Parker
Assistant Examiner—Mike Qi
Attorney, Agent, or Firm—Parkhurst & Wendel, L.L.P.

[57] ABSTRACT

A liquid crystal display element includes a polymer liquid crystal composite layer in which liquid crystal droplets are dispersed and held in a continuous phase of matrix comprising polymer compound, or liquid crystals are dispersed and held in networks of matrix of a three dimensional network form comprising polymer compound. All areas of this polymer liquid crystal composite layer, except a non-active area, in which cracks will develop, in the vicinity of a sealant, is formed as an active area, so that, even when the cracks develop, stripy display unevenness caused by the cracks can be prevented from being visually confirmed on a display screen.

31 Claims, 35 Drawing Sheets

U.S. PATENT DOCUMENTS

| | | | |
|---|---|---|---|
| 5,353,133 | 10/1994 | Bernkopf | 359/41 |
| 5,401,437 | 3/1995 | Im . | |
| 5,427,828 | 6/1995 | Park . | |
| 5,519,519 | 5/1996 | Nakajima et al. | 359/52 |
| 5,559,615 | 9/1996 | Takei et al. . | |
| 5,729,312 | 3/1998 | Yamagishi et al. | 349/86 |
| 5,738,804 | 4/1998 | Cao et al. | 252/299.01 |
| 6,017,468 | 1/2000 | Chung et al. | 252/299 |

OTHER PUBLICATIONS

Kobayashi et al., Light Switching Properties and Mechanism of Electro–Optical Effect for (Polymer)/(Liquid Crystal) Composite Film, 1989, pp. 190–191 with partial translation.

Flat Panel Display, 1991, pp. 219–224, with partial translation.

Kunigita et al., A Full–Color Projection TV Using LC/Polymer Composite Light Valves, 1990, pp. 227–230.

Pressure

Light from the backlight

Pressure

After pressed

Before pressed

Light from the backlight

LIQUID CRYSTAL DISPLAY ELEMENT IN WHICH THE POLYMER LIQUID CRYSTAL COMPOSITE LAYER IS DIVIDED INTO AN ACTIVE AREA AND A NON-ACTIVE AREA AND METHOD OF MANUFACTURING THE SAME

TECHNICAL FIELD

The present invention relates to a liquid crystal display element, and more particularly, to a polymer dispersed liquid crystal display element in which liquid crystal is dispersed in polymer compound and a producing method therefor.

BACKGROUND ART

A polymer dispersed liquid crystal display element, which is a display system utilizing the light scattering effects of the composite material comprising liquid crystal and polymer compound, requires no polarizers to produce linearly polarized light, unlike general type liquid crystal display elements such as Twisted Nematic (TN), and thus has a high light availability efficiency. Accordingly, attention is being given to the polymer dispersed liquid crystal display element as the coming generation of liquid crystal display element, and the research and development are being lively made.

The polymer dispersed liquid crystal display element can be classified under the following structure. First is the structure of Nematic liquid crystal being micro-encapsulated with polyvinyl alcohol and the like, which is called NCAP (Nematic Curviliner Aligned Phase); Second is the structure of liquid crystal droplets of a generally spherical or ellipsoid-of-revolution form being each separately dispersed in polymer matrix, which is called PDLC (Polymer Dispersed Liquid Crystal) (e.g. Society for information display international symposium digest '90 P.227–230); Third is the structure of the liquid crystal droplets existing in the form of being partly contacting with and connecting with each other, not in the form of being separate from each other (e.g. $22^{nd}$ liquid crystal symposium digest 1996 P403–404); and Fourth is the structure of polymer resin spreading in the form of a three dimensional network in a continuous phase of liquid crystal, which is called PNLC (Polymer Network Liquid Crystal) (e.g. U.S. Pat. No. 5,304,323 and $15^{th}$ liquid crystal symposium digest 1989 P190).

Usually, only one of these kinds of structure was adopted in these conventional type of polymer dispersed liquid crystal display elements.

Take the polymer dispersed liquid crystal display element of the conventional type having the structure of the liquid crystal droplets being dispersed in the form of a part thereof being contacting with and connecting with each other (see FIG. 31(a)) for instance, it was produced by the following technique.

First, opposing upper and lower substrates 1001 and 1002 were bonded together through a sealant 1006 so that an uniform gap could be formed therebetween. Then, a mixture including liquid crystal material and polymerizable monomer was filled in between the upper and lower substrates 1001 and 1002. After polymerization temperature and irradiation intensity of ultraviolet was so set as to be prescribed conditions,. the mixture was irradiated with ultraviolet, so that the monomer is polymerized to cause a phase separation of the liquid crystal material. The irradiation of ultraviolet was so controlled as to be uniform in the panel surface.

As a result of this, the state of the liquid crystal material being dispersed in the polymer matrix or the state of the liquid crystal material being dispersed in continuation in the polymer matrix was presented between the two substrates in accordance with the prescribed conditions (cf. e.g. Flat panel display '91, NIKKEI BP Co., Ltd., Page 221).

However, the polymer dispersed liquid crystal display element having the structure of the liquid crystal droplets being completely separated from each other, which is in actual use in the TFT liquid crystal panel, is low in light scattering, thus presenting problems of low contrast and high driving voltage.

The reduction of scattering of light is caused for the following reason. In the case of liquid crystal droplets being separated from each other, their particle size is about 0.8 $\mu$m, which corresponding to about 69% of the percentage of the liquid crystal. If the particle size and percentage of the liquid crystal exceed these values, the liquid crystal droplets will take the form of being partly connected to each other. Now, if incident light has wavelength of, for example, about 0.4 $\mu$m, the particle size of the liquid crystal droplets of about 1.2 $\mu$m, which corresponding to about 75% in the percentage of the liquid crystal, is required for the sufficient effect of scattering of light. However, in the case of the liquid crystal droplets being separated from each other, as described above, since the particle size is too small, the scattering of light is low and thus deterioration of contrast is caused. On the other hand, the increase of the driving voltage is caused for the following reason. In the case of the liquid crystal droplets being separated from each other, since the scattering of light is low, as mentioned above, the panel gap must be enlarged to obtain the same scattering of light as in the case of the liquid crystal droplets being partly contacting with and connected with each other. As a result of this, the increase of the driving voltage is caused.

The polymer dispersed liquid crystal display element having the structure of the liquid crystal droplets being partly connecting with each other or the polymer network type of polymer dispersed liquid crystal display element has a problem that cracks develop in the polymer resin extending from an area in the vicinity of the sealant to an active area due to variations in ambient temperature and thereby stripy display unevenness is caused.

The inventors discovered that the display unevenness was caused in, for example, the inspection step in which the polymer dispersed liquid crystal display element is allowed to stand under environment of high temperature for a given time and thereafter is cooled down to room temperature, for the purpose of evaluating the reliability in temperature variations. The mechanism for causing the display unevenness will be described below. When the polymer dispersed liquid crystal display element is allowed to stand under high temperature of 80° C. for 24 hours, polymer resin 1005 and liquid crystal 1004 expand, as shown in FIG. 31(b). At that time, the sealant 1006 supporting the upper and lower substrates also expands with temperature, but is rather smaller in degree of expansion. Due to this, the upper and lower substrates of the liquid crystal panel deforms into a convex form in section. At high temperatures at which viscosity of liquid crystal is reduced sharply, the liquid crystal flows with ease. In addition, since the upper substrate 1001 and the lower substrate 1002 are fixed via the sealant 1006 around their marginal portions, a pressure from the upper substrate 1001 and the lower substrate 1002 is applied to a composite layer in the direction indicated by arrows in the same figure. As a result, the liquid crystal existing in the vicinity of the sealant 1006 receives the pressure and flows to an interior of the panel. Then, when the liquid crystal panel is cooled down to room temperature, the viscosity of the liquid crystal increases under room temperature. As a result of this, the liquid crystal flowing to the center part of the liquid crystal panel does not return to the area in the vicinity of the sealant 1006, and resultantly the density of liquid crystal in the area in the vicinity of the sealant 1006 decreases. Because of this, when a pressure from the upper substrate 1001 and the lower substrate is applied to the polymer resin matrix in the vicinity of the sealant 1006, cracks 1007 develop. See FIG. 31(*c*). Thus, the stripy display unevenness is created around the marginal portion of the display screen.

As discussed above, with the polymer dispersed liquid crystal display element having the structure of the liquid crystal droplets being completely separated from each other, the stripy display unevenness is not visually confirmed on the display screen, but contrast is originally low. On the other hand, with the polymer dispersed liquid crystal display element having the structure of the liquid crystal droplets being partly connected with each other or the polymer network type of polymer dispersed liquid crystal display element, good contrast is presented, but the stripy display unevenness is visually confirmed on the display screen. Thus, the polymer dispersed liquid crystal display element that can provide good contrast and also can prevent the development of display unevenness has never been provided so far.

On the other hand, the stripy display unevenness caused by the development of cracks can be created due to the following mechanism. It is noted that the display unevenness stated herein can be created in the structure of liquid crystal droplets of being each separately dispersed in polymer resin matrix, which is called PDLC, as well. The discussion on the mechanism will be given below, taking the PDLC as an example.

The above-described polymer dispersed liquid crystal display element has the structure in which a composite layer 2103 is interposed between upper and lower substrates 2101, 2102 forming thereon display electrodes 2104, 2104, as shown in FIG. 32. A color filter layer 2106 is formed between the upper substrate 2101 and the display electrode 2104. The composite layer 2103 is formed with being in intimate contact with the upper substrate 2101 and the lower substrate 2102. The composite layer 2103 has the structure of the liquid crystal droplets being dispersed in the matrix phase of polymer compounds.

The above-described polymer dispersed liquid crystal display element has a problem that the composite layer 2103 expands and contracts due to variations of ambient temperature, to cause the cracks in the polymer resin in an area in the vicinity of the sealant 2105 and in turn cause the stripy display unevenness.

This stripy display unevenness is caused in, for example, the inspection step including a heat shock process in which the polymer dispersed liquid crystal display element is allowed to stand under environments of high temperature for a given time and thereafter is cooled down to room temperature, for the purpose of evaluating the reliability in temperature variations. Specifically, when the polymer dispersed liquid crystal display element is allowed to stand under high temperature for a given time, the composite layer 2103 expand, as shown in FIG. 33(*b*). At that time, the viscosity of the composite layer 2103 decreases sharply under this environment, so that the flowability of the composite layer 2103 increases. In addition, since the upper substrate 2101 and the lower substrate 2102 are fixed via the sealant 105 around their marginal portions, a pressure from the upper substrate 2101 and the lower substrate 2102 is applied to a composite layer 2103 in the direction indicated by arrows in the same figure. As a result of this, polymer resin and the others flow to a center part of the liquid crystal panel, to cause the center part of the panel to expand further (see FIG. 33(*c*)). Then, when the liquid crystal panel is cooled down to room temperature, the viscosity of the composite layer 2103 increases and thereby the flowability decreases. Due to this, the density of liquid crystal existing in the vicinity of the sealant 2105 is reduced, to thereby cause the cracks 2110 to develop in the vicinity of the sealant 2105 (See FIG. 33(*d*)). As a result of this, the stripy display unevenness is created around the marginal portion of the display screen.

Further, in the case where the composite layer 2103 is in intimate contact with the upper and lower substrates 2101, 2102, as in the conventional type of polymer dispersed liquid crystal display element described above, there arises a problem that when the display screen is pressed through, for example, a pen input and the like, the display unevenness is created on the display screen.

This problem will be discussed in detail below. FIG. 34 is a plan view of a conventional type polymer dispersed liquid crystal display element when viewed from the upper substrate 2101 side. When the liquid crystal panel is pressed at the point A shown in the same figure from the lower substrate 2102 side, the composite layer 2103 which is in intimate contact with the upper and lower substrates 2101, 2102 deflects together with the upper and lower substrates 2101, 2102 (See FIG. 35). This produces shearing stress 2122 in the directions indicated by arrows in the figure in the most deflected part of the liquid crystal panel between the upper substrate 2101 and the composite layer 2103 and between the lower substrate 2102 and the composite layer 2103. Through the action of shearing stress 2122, microscopic spaces surrounded by the polymer resin are each deflected from their original spherical form to a flattened form having a length extending vertically to the upper substrate 2101 which is smaller than a length extending parallel to the same 2101 (See FIG. 36). As a result of this, the liquid crystal molecules enclosed in the microscopic spaces of the flattened form are aligned in the shearing stress direction. Thus, when the electric field is OFF, in an area 2111, transmitted light is scattered and opaque appearance is presented, while on the other hand, in an area 2110 of a wing-like form, the index of refraction with respect to the direction of incident light decreases and thus the scattering of light is weakened, so that somewhat transparent appearance is presented. As a result, the display unevenness is created on the display screen (See FIG. 34). On the other hand, when the electric field is ON, a threshold voltage in the area 2110 of the wing-like form becomes smaller than that in the area 2111, so that variations in threshold voltage are caused. Thus, in this case also, the display unevenness is created.

Further, the above-described conventional type of polymer dispersed liquid crystal display element has the problem of generation of color mixing among coloring material layers R, G, B and loss of light availability efficiency caused by black matrixes.

Specifically, as shown in FIG. 37, the light coming from, for example, the lower substrate 2101 side is scattered when it is incident on the composite layer 2103. A part of the incident light as scattered is then absorbed in the black matrixes to cause the loss of light. On the other hand, the remaining light passes through the composite layer 2103 and arrives at the coloring material layer G of the color filter layer 2106. Further, when the light is incident on the upper substrate 2101 from the color material layer G, the light is scattered radially. Where the upper substrate 2101 is made of glass or equivalent, the index of refraction therein $n_g$ (e.g. $n_g=1.5$) is larger than the index of refraction in air $n_{air}$ (=1.0). Due to this, some of the scattered light is totally reflecting at the boundary between the upper substrate 2101 and the air. When the totally reflecting light is incident on the adjacent coloring material layer B, the color mixture is caused.

Furthermore, the above-described conventional type of polymer dispersed liquid crystal display element has the following problem as well. With the electric field applied to the composite layer 2103, the state of display is inspected on whether there exist defects such as dot defects and line defects. This inspection step is not performed until after an assembled empty cell is filled with a liquid crystal material to form the liquid crystal cell (the same is applied to the other conventional types of polymer dispersed liquid crystal display elements including TN type one). Therefore, when defects of the display screen originating from defects of the composite layer 2103 are found in the inspection step, even the opposite substrate with an expensive color filter layer is junked, thus introducing the increase of costs.

To sum up the foregoing, the above-described conventional type of polymer dispersed liquid crystal display elements have the following disadvantages.

In the case of the polymer dispersed liquid crystal display element having the structure of the liquid crystal droplets being completely separated from each other, light scattering is low and thus contrast is poor and also driving voltage is high;

Display unevenness is caused by deflection of the liquid crystal panel or by heat shock or equivalent in the reliability evaluation test;

When the color filter layer is provided for performing color display, the color mixture is caused among the coloring material layers of R, G, B and reduction in light availability efficiency caused by the loss of light through the black matrixes is introduced; and When defects are found by the inspection of display, even the opposite substrate with the expensive color filter layer is junked, thus introducing the increase of costs.

DISCLOSURE OF THE INVENTION

The present invention as a group has been made in the light of the present circumstances described above. It is the primary object of the invention to provide a liquid crystal display element having good display properties, such as contrast and scattering of light, without causing stripy display unevenness, and a producing method therefor. It is the secondary object of the present invention to provide a liquid crystal display element that can prevent generation of display unevenness and color mixture to provide good visible appearance quality and temperature characteristic, and a producing method therefor.

It is noted that although the present invention as a group is on the basis of the same or similar concept, since the each individual invention is embodied into different examples, the present invention is divided into the first inventive group and the second inventive group in the specification on a closely pertinent invention basis. Hereinafter, the description on the content of the invention is given in sequence for every group (inventive group).

(1) First Inventive Group

The invention of the first inventive group was made to accomplish the primary object described above. The invention of this group relates to a liquid crystal display element that can eliminate mainly stripy display unevenness on the display screen to provide good display properties, such as contrast and scattering of light, and a producing method therefor.

In order to accomplish the primary object, the invention provides a liquid crystal display element, wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is such that liquid crystal droplets are dispersed and held in a continuous phase of matrix comprising polymer compound, or liquid crystals are dispersed and held in networks of matrix of a three dimensional network form comprising polymer compound; that an outer periphery of the polymer liquid crystal composite layer and an inner periphery of said sealant are so formed as to come into intimate contact with each other; that the polymer liquid crystal composite layer is so split that a body portion of the polymer liquid crystal composite layer can be formed as an active area and also a marginal portion of the polymer liquid crystal composite layer in the vicinity of the sealant can be formed as a non-active area; that the polymer liquid crystal composite layer in the active area is such that the liquid crystal droplets are dispersed and held in the continuous phase of matrix comprising polymer compound, with their being partly connected with each other, or the liquid crystals are dispersed and held in the networks of matrix in the three dimensional network form comprising the polymer compound; and that a particle size of the liquid crystal droplets or an interval of the networks in the active area and a particle size of the liquid crystal droplets or an interval of the networks in the non-active area are so formed as to be different from each other.

According to this construction, a particle size of the liquid crystal droplets or an interval of the networks in the non-active area and a particle size of the liquid crystal droplets or an interval of the networks in the active area are so formed as to be different from each other. This can produce the result that in a reliability test, for example, in which the liquid crystal display element is allowed to stand in the environment in which ambient temperature varies from high temperature to low temperature, development of cracks is prevented in the polymer liquid crystal composite layer in the vicinity of the sealant.

To be more specific, when a particle size of the liquid crystal droplets or an interval of the network in the non-active area is smaller than a particle size of the liquid crystal droplets or an interval of the network in the active area and also the liquid crystal droplets are each separately dispersed in an area in the vicinity of the sealant, it becomes difficult for the liquid crystal to move toward a center part of the polymer liquid crystal composite layer, even when ambient temperature rises. As a result of this, the reduction of density of liquid crystal in the non-active area in the vicinity of the sealant is prevented, then preventing the development of cracks. On the other hand, when a particle size of the liquid crystal droplets or an interval of the network in the non-active area is larger than a particle size of the liquid crystal droplets or an interval of the network in the active area, the flow of liquid crystal is facilitated. In detail, a large particle size of the liquid crystal droplets or a large interval of the network can allow the liquid crystal to easily move between the liquid crystal droplets even in the cases where the liquid crystal is expanded under a high temperature and the pressure caused by surrounding polymer resin suddenly changes when cooled. As a result of this, the reduction of the density of liquid crystal in the non-active area in the vicinity of the sealant is suppressed to prevent the development of cracks.

Besides, since the polymer liquid crystal composite layer having a different structure than the structure in which liquid crystal droplets are each separately dispersed in matrix comprising polymer compound is formed in the active area, generation of display unevenness is prevented with good contrast being maintained.

It is to be noted that a variety of test time is available in the reliability test as described above. In the case of the test time being short, the development of cracks may be prevented by slightly varying the difference between the particle size or the interval of the network in the non-active area and that in the active area.

Further, in order to accomplish the primary object, the invention provides a liquid crystal display element, wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is such that liquid crystal droplets are dispersed and held in a continuous phase of matrix comprising polymer compound, or liquid crystals are dispersed and held in networks of matrix of a three dimensional network form comprising polymer compound; that an outer periphery of the polymer liquid crystal composite layer and an inner periphery of the sealant are so formed as to come into intimate contact with each other; that the polymer liquid crystal composite layer is so split that a body portion of the polymer liquid crystal composite layer can be formed as an active area and also a marginal portion of the polymer liquid crystal composite layer in the vicinity of the sealant can be formed as a non-active area; that the polymer liquid crystal composite layer in the active area is such that the liquid crystal droplets are dispersed and held in the continuous phase of matrix comprising polymer compound, with their being partly connected with each other, or the liquid crystals are dispersed and held in the networks of matrix in the three dimensional network form comprising the polymer compound; and that a percentage of liquid crystal in the active area and a percentage of liquid crystal in the non-active area are so formed as to be different from each other.

According to this construction, a percentage of liquid crystal in the non-active area and a percentage of liquid crystal in the active area are so formed as to be different from each other. This can produce the result that in a reliability test, for example, in which the liquid crystal display element is allowed to stand in the environment in which ambient temperature varies from high temperature to low temperature, development of cracks is prevented in the polymer liquid crystal composite layer in the vicinity of the sealant.

To be more specific, when a percentage of liquid crystal in the non-active area is smaller than a percentage of liquid crystal in the active area and also the liquid crystal droplets are each separately dispersed in an area in the vicinity of the sealant, it becomes difficult for the liquid crystal to move toward a center part of the polymer liquid crystal composite layer, even when ambient temperature rises. As a result of this, the reduction of density of liquid crystal in the non-active area in the vicinity of the sealant is prevented, then preventing the development of cracks. On the other hand, when a percentage of liquid crystal in the non-active area is larger than a percentage of liquid crystal in the active area, a particle size of the liquid crystal droplets or an interval of the network in the non-active area becomes larger than a particle size of the liquid crystal droplets or an interval of the network in the active area. As a result of this, the flow of liquid crystal is facilitated. This can allow the liquid crystal to easily move between the liquid crystal droplets even in the cases where the liquid crystal is expanded under a high temperature and the pressure caused by surrounding polymer resin suddenly changes when cooled. As a result of this, the reduction of the density of liquid crystal in the non-active area in the vicinity of the sealant is suppressed to prevent the development of cracks.

Besides, since the polymer liquid crystal composite layer having a different structure than the structure in which liquid crystal droplets are each separately dispersed and held in matrix comprising polymer compound is formed in the active area, generation of display unevenness is prevented with good contrast being maintained.

It is to be noted that a variety of test time is available in the reliability test as described above. In the case of the test time being short, the development of cracks may be prevented by slightly varying the difference between the percentage of liquid crystal in the non-active area and that in the active area.

The difference between the percentage of liquid crystal in the active area and the percentage of liquid crystal in the non-active area should preferably be not less than 5%.

Further, in order to accomplish the primary object, the invention provides a liquid crystal display element, wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is such that liquid crystal droplets are dispersed and held in a continuous phase of matrix comprising polymer compound, or liquid crystals are dispersed and held in networks of matrix of a three dimensional network form comprising polymer compound; that an outer periphery of the polymer liquid crystal composite layer and an inner periphery of the sealant are so formed as to come into intimate contact with each other; and that all areas of the polymer liquid crystal composite layer, except an area in the vicinity of the sealant in which cracks will develop, are formed as an active area.

With this construction, an area in the vicinity of the sealant in which cracks will develop when a reliability test is, for example, carried out in the environment in which ambient temperature varies from high temperature to low temperature, is excluded from the active area, thus enabling stripy display unevenness caused by the cracks to be prevented from being visually confirmed on the display screen.

Further, in order to accomplish the primary object, the invention provide a liquid crystal display element, wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is such that liquid crystal droplets are dispersed and held in a continuous phase of matrix comprising polymer compound, or liquid crystals are dispersed and held in networks of matrix of a three dimensional network form comprising polymer compound; that an outer periphery of said polymer liquid crystal composite layer and an inner periphery of the sealant are so formed as to come into intimate contact with each other; and that a material composed mainly of liquid crystal is filled in an interior of cracks developing in the vicinity of the sealant.

With this construction, the interiors of the cracks are filled with a material consisting essentially of liquid crystal. This enables the difference in index of refraction between the cracks and the surrounding polymer liquid crystal complex layer to be reduced, to make the cracks themselves inconspicuous.

Further, in order to accomplish the primary object, the invention provides a liquid crystal display element, wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is such that liquid crystal droplets are dispersed and held in a continuous phase of matrix comprising polymer compound, or liquid crystal droplets are dispersed and held in networks of matrix of a three dimensional network form comprising polymer compound; and that an area of a frame-like form having a width of not less than 1.5 mm is provided around an inner periphery of the sealant and also an active area is provided at the inside of the area of the frame-like form.

In this construction, in consideration of the fact that the cracks develop in the frame-like area having the width of not less than 1.5 mm from the inner periphery of the sealant, irrespective of the area or size of the liquid crystal panel, the active area is provided at least at the further inside of the frame-like area so that the cracks can be surely prevented from developing in the active area. As a result of this, no stripy display unevenness caused by the cracks is presented on the display screen.

Further, in order to accomplish the primary object, the invention provides a liquid crystal display element wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer includes an active area and a non-active area of a frame-like form located in an outer margin of the active area; that the polymer liquid crystal composite layer in the active area is such that liquid crystal droplets are dispersed and held in a continuous phase of matrix comprising polymer compound, with their being partly connected to each other, or liquid crystal droplets are dispersed and held in networks of matrix of a three dimensional network form comprising polymer compound; and that the polymer liquid crystal composite layer in the non-active area is such that liquid crystal droplets of generally spherical or ellipsoid of revolution are held in a matrix comprising polymer compound, with their being dispersed separately from each other.

With this construction, the liquid crystal droplets are dispersed separately from each other in an area in the vicinity of the sealant, so that, even when ambient temperature rises, they are hard to move toward the center. As a result of this, the reduction of density of liquid crystal in the non-active area in the vicinity of the sealant is prevented, thus preventing the development of cracks. Besides, formed in the active area is the polymer liquid crystal composite layer having such a structure that liquid crystal droplets are dispersed and held in a continuous phase of matrix comprising polymer compound, with their being partly connected to each other, or liquid crystal droplets are dispersed and held in networks of matrix of a three dimensional network form comprising polymer compound. Hence, generation of display unevenness is prevented with good contrast being maintained.

Preferably, the percentage of liquid crystal in the active area should be larger than the percentage of liquid crystal in the non-active area. More preferably, the percentage of liquid crystal in the active area should be in the range of 70% or more to 80% or less and also the percentage of liquid crystal in the non-active area should be less than 70%.

Further, it is preferable that an particle size of the liquid crystal droplets or an interval of the network in the active area is in the range of 0.8 $\mu$m or more to 1.4 $\mu$m or less and also a particle size of the liquid crystal droplets in the non-active area is less than 0.8 $\mu$m.

Further, it is desirable that the non-active area is in the form of a frame-like form having a width of not less than 1.0 mm. This can produce the effects of preventing the generation of display unevenness and further enlarging the active area.

In order to accomplish the primary object, the invention provide a liquid crystal display element wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer includes an active area and a non-active area of a frame-like form located in an outer margin of the active area; that the polymer liquid crystal composite layer in the active area is such that liquid crystal droplets are dispersed and held in a continuous phase of matrix comprising polymer compound, with their being partly connected to each other, or liquid crystal droplets are dispersed and held in networks of matrix of a three dimensional network form comprising polymer compound; and that the polymer liquid crystal composite layer in the non-active area is formed with liquid crystal and polymer compound being compatible with each other.

With this construction, the liquid crystal and the polymer compound in the non-active area in the vicinity of the sealant are held in the state of being compatible with each other and are formed in a liquid state or a semi-solid state. Hence, no cracks develop. Besides, formed in the active area is the polymer liquid crystal composite layer having such a structure that liquid crystal droplets are dispersed and held in a continuous phase of matrix comprising polymer compound, or liquid crystal droplets are dispersed and held in a network of a three-dimensional network-structured matrix comprising said polymer compound. Hence, generation of display unevenness is suppressed, with good contrast being maintained.

Preferably, the non-active area should be in the form of a frame-like form having a width of not less than 1.0 mm. This can produce the effects of preventing the generation of display unevenness and further enlarging the active area.

Further, in order to accomplish the primary object, the invention provides a liquid crystal display element wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is located in a place corresponding to an active area and also a side gap layer is provided in a place corresponding to a non-active area between the sealant and the polymer liquid crystal composite layer.

With this construction, a side gap layer is provided in the area in the vicinity of the sealant in which the cracks will develop, and no polymer compound and liquid crystal exists therein. Thus, even when the polymer liquid crystal composite layer expands and contracts in volume due to ambient temperature variations, the development of the cracks can be completely prevented. Therefore, the generation of stripy display unevenness due to the cracks can be prevented.

The non-active area should preferably be in the form of a frame-like form having a width of not less than 1.0 mm. This can produce the effects of preventing the development of display unevenness and further enlarging the active area.

Further, the side gap layer may be vacuum or may be filled with a gas. The side gap layer of vacuum can provide the result that even when the polymer liquid crystal composite layer expands in volume at high temperature, the expanded volume can be relieved by the side gap layer.

Also, the side gap layer may alternatively be filled with a polymer compound. This can produce the effect of increasing breaking strength, as compared with the case of the liquid crystal droplets existing in the side gap layer, thus suppressing the development of cracks.

Further, in order to accomplish the primary object, the invention provides a liquid crystal display element wherein a polymer liquid crystal composite layer in which liquid crystal droplets are dispersed in polymer compound is interposed between a pair of substrates each having on an inner surface thereof an electrode, the pair of substrates being bonded together through a sealant, characterized in that the polymer liquid crystal composite layer is such that liquid crystal droplets are dispersed and held in a continuous phase of matrix comprising polymer compound, or liquid crystals are dispersed and held in networks of matrix of a three dimensional network form comprising polymer compound; that the polymer liquid crystal composite layer is separated into a non-active area of a frame-like form arranged to extend along an inner margin of the sealant and an active area arranged at an inside of the non-active area; and that a particle size of the liquid crystal droplets or an interval of the networks in the non-active area in the vicinity of the sealant are larger than a particle size of the liquid crystal droplets or an interval of the networks in the active area.

With this construction, the particle size of the liquid crystal droplets or the interval of the network in the vicinity of the sealant are made larger than the particle size of the liquid crystal droplets or the interval of the network in the active area of the polymer liquid crystal composite layer, thus enabling the flow of liquid crystal to be facilitated. In other words, since the liquid crystal droplets in the non-active area are large in particle size, connecting portions of the liquid crystal droplets in the non-active area to the liquid crystal droplets in the active area are sequentially enlarged. This can allow the liquid crystal to easily move between the liquid crystal droplets even in the cases where the liquid crystal is expanded under a high temperature and the pressure caused by surrounding polymer resin suddenly changes when cooled. As a result of this, with good contrast kept unchanged, the development of cracks in the non-active area is prevented and the generation of the stripy display unevenness is suppressed.

It is to be noted that the percentage of liquid crystal in the active area should be smaller than the percentage of liquid crystal in the non-active area. Specifically, it is preferable that the percentage of liquid crystal in the active area is in the range of 70% or more to 80% or less and also the percentage of liquid crystal in the non-active area is 80%.

Further, it is preferable that difference between the percentage of liquid crystal in the active area and the percentage of liquid crystal in the non-active area is set to be not less than 5%.

Further, it is preferable that the particle size of the liquid crystal droplets or the interval of the network in the non-active area is 1.8 μm or more and also the particle size of the liquid crystal droplets or the interval of the networks in the active area is in the range of 0.8 μm or more to 1.4 μm or less.

Further, it is preferable that the non-active area is in the form of a frame-like form having a width of not less than 1.0 mm. This can provide the effects of preventing the generation of display unevenness and further enlarging the active area.

In addition, in order to accomplish the primary object, the invention provides a method for producing a liquid crystal display element, the method comprising a phase separation step in which after a liquid crystal polymer precursor compatible solution including liquid crystal and polymer precursor is interposed between a pair of substrates each having on an inner surface thereof an electrode, a surface of the substrates is irradiated with ultraviolet so that the liquid crystal and the polymer precursor in the liquid crystal polymer precursor compatible solution can be phase-separated by the polymer precursor being polymerized and cured, to thereby produce a polymer liquid crystal composite layer in which liquid crystal droplets are dispersed and held in a continuous phase of matrix comprising polymer compound or liquid crystal droplets are dispersed and held in networks of a three dimensional network form of matrix comprising polymer compound, said phase separation step comprising the step of controlling an irradiation intensity of a first ultraviolet, with which an area of the polymer liquid crystal composite layer corresponding to an active area is irradiated, to be smaller than an irradiation intensity of a second ultraviolet with which an area of the polymer liquid crystal composite layer corresponding to a non-active area is irradiated, whereby the active area takes the structure that the liquid crystal droplets are dispersed and held in the continuous phase of matrix comprising the polymer compound, with their being partly connected to each other, or the liquid crystal droplets are dispersed and held in the networks of the three dimensional network form of matrix comprising the polymer compound, while on the other hand, the non-active area takes the structure that the liquid crystal droplets of generally spherical or ellipsoid of revolution are held in the matrix comprising the polymer compound, with their being dispersed separately from each other.

According to this method, the non-active area takes the structure that the liquid crystal droplets are held in the matrix comprising the polymer compound, with their being dispersed separately from each other, which makes it hard for the liquid crystal droplets to move toward the center even when ambient temperature rises. As a result of this, the reduction of density of liquid crystal in the non-active area in the vicinity of the sealant is prevented, thus preventing the development of cracks. Therefore, a liquid crystal display element capable of preventing the display unevenness and having good display properties, such as contrast, can be produced.

Further, in order to accomplish the primary object, the invention provides a method for producing a liquid crystal display element, the method comprising a phase separation step in which after a liquid crystal polymer precursor compatible solution including liquid crystal and polymer precursor is interposed between a pair of substrates each having on an inner surface thereof an electrode, a surface of the substrates is irradiated with ultraviolet so that the liquid crystal and the polymer precursor in the liquid crystal polymer precursor compatible solution can be phase-separated by the polymer precursor being polymerized and cured, to thereby produce a polymer liquid crystal composite layer in which liquid crystal droplets are dispersed and held in a continuous phase of matrix comprising polymer compound or liquid crystal droplets are dispersed and held in networks of a three dimensional network form of matrix comprising polymer compound, said phase separation step including the step in which at least a non-active area of the polymer liquid crystal composite layer is masked by a shielding means for shielding ultraviolet, followed by the irradiation of ultraviolet.

According to this method, the non-active area is masked by a shielding means for shielding ultraviolet, followed by the irradiation of ultraviolet, to produce the polymer liquid crystal composite layer. Then, the liquid crystal and the polymer compound in the non-active area are held in the state of being compatible with each other, taking a liquid form or a semi-solid form. Hence, no cracks develop. Thus, a liquid crystal display element capable of preventing display unevenness and having good display properties can be produced.

The shielding means may be formed by a reflector made of material capable to reflect ultraviolet. This can produce the effect of controlling a temperature rise of the liquid crystal panel, to facilitate the control of polymerization temperature when the polymer liquid crystal composite layer is formed through the irradiation of ultraviolet.

Further, in order to accomplish the primary object, the invention provides a method for producing a liquid crystal display element, the method comprising a phase separation step in which after a liquid crystal polymer precursor compatible solution including liquid crystal and polymer precursor is interposed between a pair of substrates each having on an inner surface thereof an electrode, a surface of said substrates is irradiated with ultraviolet so that said liquid crystal and said polymer precursor in the liquid crystal polymer precursor compatible solution can be phase-separated by the polymer precursor being polymerized and cured, to thereby produce a polymer liquid crystal composite layer in which liquid crystal droplets are dispersed and held in a continuous phase of matrix comprising polymer compound or liquid crystal droplets are dispersed and held in networks of a three dimensional network form of matrix comprising polymer compound, said phase separation step comprising the step of controlling an irradiation intensity of a first ultraviolet, with which an area of the polymer liquid crystal composite layer corresponding to an active area is irradiated, to be larger than an irradiation intensity of a second ultraviolet with which an area of the polymer liquid crystal composite layer corresponding to a non-active area is irradiated, whereby the polymer liquid crystal composite layer takes the structure that the liquid crystal droplets are dispersed and held in the continuous phase of matrix comprising the polymer compound or the liquid crystal droplets are dispersed and held in the networks of the three dimensional network form of matrix comprising the polymer compound, while also, a particle size of the liquid crystal droplets or an interval of the networks in the active area of the polymer liquid crystal composite layer is smaller than a particle size of the liquid crystal droplets or an interval of the networks in the non-active area.

According to this method, the active area is irradiated with the first ultraviolet to thereby cause the active area to take the structure in which the liquid crystal droplets are dispersed and held in the continuous phase of matrix comprising the polymer compound or in the networks of the three dimensional network form of matrix comprising the polymer compound. Along with this, the non-active area is irradiated with the second ultraviolet to thereby produce the structure in which a particle size of the liquid crystal droplets or an interval of the network in the non-active area is larger than a particle size of the liquid crystal droplets or an interval of the network in the active area. This enables the liquid crystal to easily move between the liquid crystal droplets even in the cases where the liquid crystal is expanded under a high temperature and the pressure caused by surrounding polymer resin suddenly changes when cooled. This can produce the liquid crystal display element in which development of cracks in the non-active area in the vicinity of the sealant and generation of the stripy display unevenness are prevented, with good contrast being kept unchanged.

It is preferable that the irradiation intensity of the first ultraviolet is 50 mW/cm$^2$ or more and the irradiation intensity of the second ultraviolet is 20 mW/cm$^2$ or less.

(2) Second Inventive Group

The invention of the second inventive group was made to accomplish the secondary object described above. The invention of this group provides a liquid crystal display element capable of preventing the generation of display unevenness and color mixture to provide good visible appearance quality and temperature characteristic, and a producing method therefor.

In order to accomplish the secondary object, the invention provides a liquid crystal display element comprising a first substrate, a second substrate confronting the first substrate, a polymer liquid crystal composite layer which is interposed between the first and second substrates and in which liquid crystal droplets are dispersed and held in polymer compound, and a pair of first and second display electrodes for applying an electric field to the polymer liquid crystal composite layer, characterized in that the polymer liquid crystal composite layer is fixedly attached to the first substrate; that a gap layer is provided between the second substrate and the polymer liquid crystal composite layer; and that an area of the gap layer extending in a surface of the substrate is in an area including at least an entire active area.

According to this construction, the gap layer is provided between the polymer liquid crystal composite layer and the opposite substrate within an area including at least an entire active area corresponding to the display screen. In the case where the gap layer is provided in, for example, the entire area between the second substrate and the polymer liquid crystal composite layer, the second substrate and the polymer liquid crystal composite layer are not in contact with each other over the entire area, so that, even when a pressing force acts on that area from outside, shearing stress is not produced in that area. Likewise, in the case where the gap layer is provided in, for example, only the active area between the second substrate and the polymer liquid crystal composite layer, even when a pressing force acts on the active area from outside, the shearing stress is not produced in the active area. As a result, no display unevenness is caused. On the other hand, the shearing stress may possibly be caused at the outside of the active area, but even if the shearing stress is caused thereat, since no display unevenness is caused within the active area, as mentioned above, that presents no problem for the liquid crystal display element. Thus, creation of different light-scattering area by the action of shearing stress is prevented at least in the active area, so that the display unevenness in the display screen is reduced.

In short, the provision of the gap layer can add up to the function of preventing the shearing stress caused by deflections and the like. This can provide the polymer liquid crystal element with improved display qualities, such as a reduced display unevenness, and enhanced yields.

In addition, in order to accomplish the secondary object, the invention provides a liquid crystal display element comprising a first substrate, a second substrate confronting the first substrate, a polymer liquid crystal composite layer which is interposed between the first and second substrates and in which liquid crystal droplets are dispersed and held in polymer compound, and a pair of first and second display electrodes for applying an electric field to the polymer liquid crystal composite layer, the first and second substrates being bonded together at their marginal portions through a sealant, characterized in that the polymer liquid crystal composite layer is fixedly attached to the first substrate; that a gap layer is provided between the second substrate and the polymer liquid crystal composite layer; and that an area of the gap layer extending in a surface of the substrate is in an area including at least an entire active area.

This construction of the gap layer being provided between the second substrate and the polymer liquid crystal composite layer is also applicable to the liquid crystal display element in which the first and second substrates are bonded together at their marginal portions through a sealant.

Further, in order to accomplish the secondary object, the invention provides a liquid crystal display element comprising a first substrate, a second substrate confronting the first substrate, a polymer liquid crystal composite layer which is interposed between the first and second substrates and in which liquid crystal droplets are dispersed and held in polymer compound, and a pair of first and second display electrodes for applying an electric field to the polymer liquid crystal composite layer, the first and second substrates being bonded together at their marginal portions through a sealant, characterized in that the polymer liquid crystal composite layer is fixedly attached to the first substrate; that a gap layer is provided between the second substrate and the polymer liquid crystal composite layer; and that an area of the gap layer extending in a surface of the substrate is in an area including at least an area in the vicinity of sealant.

With this construction, even when the polymer liquid crystal composite layer expands and contracts in volume due to ambient temperature variations, since the gap layer formed at least in the area in the vicinity of sealant can relieve such volume variations, development of cracks can be prevented. Therefore, generation of stripy display unevenness due to the cracks can be prevented.

The gap layer may be formed of a fluidized layer. The fluidized layer does not have any fixed form but has such flowability as to be easily deformed when an external force is applied thereto. Thus, the gap layer formed of a fluidized layer can provide the effect that even when the liquid crystal display element is pressed, the shearing stress can be prevented from being generated between the first and second substrates and the polymer liquid crystal composite layer and also the deflection of the liquid crystal display element itself can be relieved.

The fluidized layer may be formed with its being filled with air. The fluidized layer formed of air can also produce the liquid crystal display element capable of reducing the display unevenness caused by pressing force and the stripy display unevenness caused by cracks. The fluidized layer formed of air requires no special material as the material for the fluidized layer, so that the liquid crystal display element having good display quality is achieved without bearing any extra costs.

Further, the fluidized layer may include therein liquid crystal material. The fluidized layer including therein the liquid crystal material can also produce the liquid crystal display element capable of reducing the display unevenness caused by the pressing and the stripy display unevenness caused by the cracks.

The gap layer may be formed of a vacuum layer. This can prevent the mixing of foreign objects, such as dusts, into the gap layer and the side gap layer, to further improve the display quality.

In this case, a side gap layer may be provided between an outer periphery of the polymer liquid crystal composite layer and an inner periphery of the sealant.

With this construction, even when the polymer liquid crystal composite layer expands or contracts in volume due to variations in ambient temperature, since no polymer compound and liquid crystal exists in the area in the vicinity of the sealant in which the cracks will develop, in other words, the side gap layer is provided in that area, the development of cracks can be completely prevented. Therefore, the generation of stripy display unevenness due to the cracks can be prevented.

Further, even when a stain of the sealant is caused by deformation, such as a laterally spreading pattern width of formation pattern of the sealant, the mixture of the sealant with the polymer liquid crystal composite layer can be prevented by the side gap layer. Desirably, the sealant and the polymer liquid crystal composite layer should be spaced from each other with a predetermined interval, to eliminate the need for positioning them so precisely that the specified formation pattern can be taken when the sealant is printed.

The gap layer and the side gap layer may be formed of a fluidized layer or a vacuum layer. The fluidized layer may be formed by air being filled in the gap layer and the side gap layer. Additionally, the fluidized layer may include therein a liquid crystal material.

Further, in order to accomplish the secondary object, a liquid crystal display element may comprise a first display electrode which is formed on a surface on the side of the polymer liquid crystal composite layer facing the first substrate; and a second display electrode which is formed on a surface on the side of the polymer liquid crystal composite layer facing the second substrate.

With this construction, an electric field can be applied to the polymer liquid crystal display element by the display electrodes being respectively formed on surfaces on the both sides of the liquid crystal composite layer facing the first and second substrates.

The second substrate may be provided with an optical color filter layer.

The provision of the optical color filter layer can provide a liquid crystal display element having a color display capability.

Further, it is preferable that where the relationship between an index of refraction $n_g$ of the second substrate and an index of refraction $n_{air}$ of air is $n_g > n_{air}$, the index of refraction $n_g$ of the second substrate and an index of refraction $n_x$ of the gap layer satisfy the relationship of Expression (1) and also an index of refraction $n_p$ of the polymer liquid crystal composite layer and the index of refraction $n_x$ of the gap layer satisfy the relationship of Expression (2):

$$n_g > n_x \tag{1}$$

$$n_p > n_x \tag{2}$$

For example, when light is applied from the first substrate side by a back light, the light is scattered when it is incident on the polymer liquid crystal composite layer. By the relationship of Expression (1) being set to be satisfied, a part of scattered light is permitted to totally reflect at the boundary between the polymer liquid crystal composite layer and the gap layer. It is noted that the term "a part of scattered light totally reflecting at the boundary" is intended to include the light that may possibly be totally reflecting at the boundary between the second substrate and the air and thereby be indirectly incident on a neighboring coloring material layer and the light that will be absorbed in the black matrixes. Thus, the provision of the gap layer can provide the results that a part of the scattered light which may cause the color mixture is eliminated in advance before it reaches the color filter layer and also the light absorbed in the black matrixes is reduced. As a result of this, the generation of color mixture can be reduced and an utilization efficiency of light can be enhanced to brighten the display screen.

Further, the second substrate may be provided with an optical reflecting member for reflecting light.

The optical reflecting member thus provided at the second substrate can produce a reflecting type of polymer liquid crystal display element having good display qualities and capabilities of, for example, preventing the display unevenness.

Further, a supporting member may be provided in the gap layer so that the second substrate and the polymer liquid crystal composite layer can be spaced from each other at a predetermined interval.

The supporting member arranged dispersedly in the gap layer between the second substrate and the polymer liquid crystal composite layer ensures the gap layer with a predetermined gap, even if the gap layer is, for example, a vacuum layer.

Further, in order to accomplish the secondary object, the invention provides a method for producing a liquid crystal display element comprising a first substrate, a second substrate confronting the first substrate, a polymer liquid crystal composite layer which is interposed between the first and second substrates and in which liquid crystal droplets are dispersed and held in polymer compound, and a pair of first and second display electrodes for applying an electric field to the polymer liquid crystal composite layer, the method comprising the first step of forming on the first substrate a switching element and the first display electrode electrically connected with the switching element; the second step of forming the polymer liquid crystal composite layer on the first display electrode; the third step of forming the second display electrode on the polymer liquid crystal composite layer; the fourth step of inspecting the state of display of the polymer liquid crystal composite layer by applying voltage to the first and second display electrodes; and the fifth step of selecting a polymer liquid crystal composite layer of a good state of display based on the inspection results in the fourth step and then bonding the first substrate and the second substrate together so that the polymer liquid crystal composite layer of the good state of display and the second substrate can be spaced from each other at a predetermined interval.

According to this method, since the inspection is carried out before the bonding process of the substrates, even when the first substrate is found to have defects, the need for junking the not-defective second substrate together with the defective first substrate can be eliminated. As a result of this, the liquid crystal display element can be produced with reduced costs and enhanced yields.

Further, according to this method, in the fifth step, the first and second substrates are bonded together so that the polymer liquid crystal composite layer and the second substrate can be spaced from each other at a predetermined interval. This can prevent the development of cracks caused by ambient temperature variations and the display unevenness caused by the deflection of the liquid crystal panel, to provide the liquid crystal display element having improved display qualities.

Further, the second substrate used in the fifth step may be provided with an optical color filter layer formed in advance on a surface of the second substrate.

According to this method, the liquid crystal display element having a color display capabilities can be produced with reduced costs and enhanced yields.

Further other objects, features and advantages of the invention will be fully understood from the following description. And, the benefits will be apparent from a consideration of the following description taken in connection with the accompanying drawings.

BRIEF DESCRIPTION OF THE DRAWINGS

FIG. 17 is a sectional view schematically illustrating the method for producing the liquid crystal display element.

FIG. 31 is a sectional view, schematically illustrating a conventional type liquid crystal display element, for illustrating the mechanism for development of the cracks.

FIG. 35(a) is an illustration showing the state of the liquid crystal droplets before the conventional type liquid crystal display element is pressed; and FIG. 35(b) is an illustration showing the state of the liquid crystal droplets after the conventional type liquid crystal display element is pressed;

FIG. 36 is an illustration for illustrating the mechanism for development of the cracks when the conventional type liquid crystal display element was subjected to heat shock; FIG. 36(c) is a sectional view showing the state of the polymer liquid crystal composite layer moving to the center part; and FIG. 36(d) is a sectional view showing the state of the cracks developing in the liquid crystal display element.

BEST MODE FOR CARRYING OUT THE INVENTION (1) Embodiments of the 1$^{st}$ Inventive Group The first inventive group of the present invention will be described below with reference to the accompanying drawings.

First Embodiment

The description on the first embodiment of the invention will be given below with reference to FIGS. 1 to 5.

Figure 1:
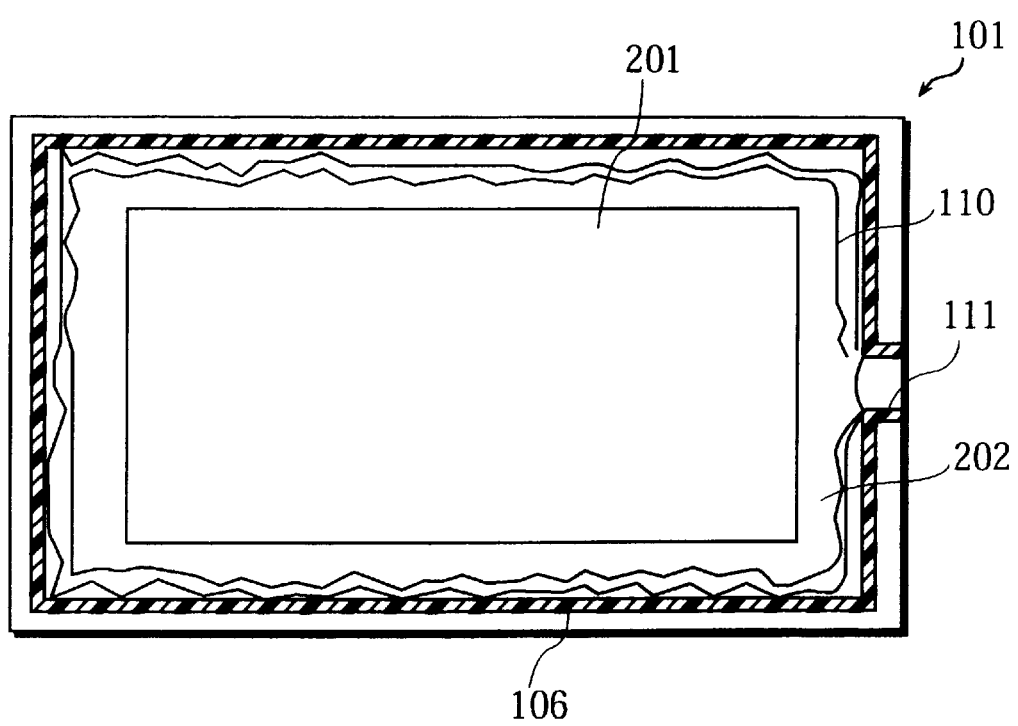
FIG. 1 is a plan view schematically illustrating a liquid crystal display element of the first embodiment of the first inventive group.
Figure 2:
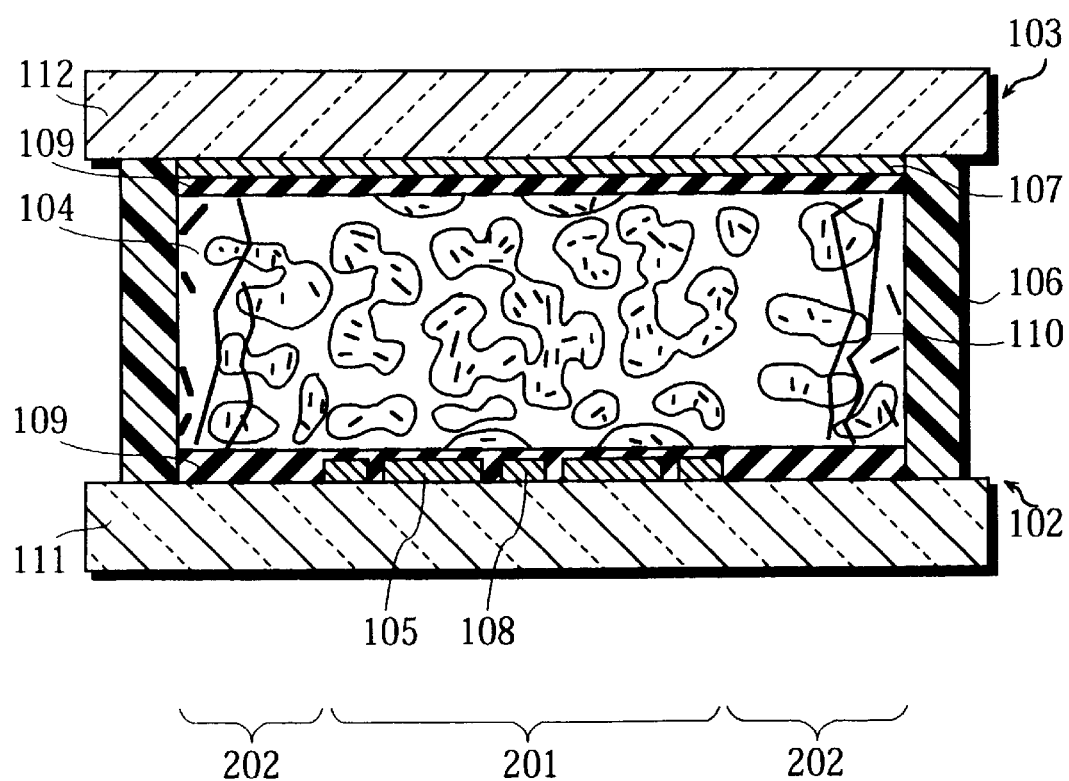
FIG. 2 is a sectional view schematically illustrating the liquid crystal display element.

FIG. 1 is a plan view of the liquid crystal display element 101 of the first embodiment of the invention. FIG. 2 is a sectional view schematically illustrating the liquid crystal display element.

As shown in FIGS. 1 and 2, the liquid crystal display element 101 comprises a TFT (Thin Film Transistor) substrate 102, an opposite substrate 103 confronting the TFT substrate 102 and a polymer liquid crystal composite layer 104 interposed between the TFT substrate 102 and the opposite substrate 103. A display screen of the liquid crystal display element 101 is set to be in the order of 6 inch or less.

The TFT substrate 102 is composed of a lower substrate 111 on which TFT (not shown) as switching elements, pixel electrodes 105 and source lines 108 electrically connected with the TFT are formed. Specifically, the TFT, the pixel electrodes 105 and the source lines 108 are formed on an area of the lower substrate 111 corresponding to an active area 201. Further, an insulating film 109 is disposed on the lower substrate 111 to cover the TFT and the pixel electrodes 105. On the other hand, the opposite substrate 103 is composed of an upper substrate 112 on which counter electrodes 107 are formed. Further, an insulating film 109 is disposed on the counter electrode 107. Also, a sealant 106 for bonding the TFT substrate 102 and the opposite substrate 103 together is formed in the frame-like form around the marginal portion of the liquid crystal panel.

It should be noted here that a non-active area 202 in the frame-like form having a width of not less than 1.5 mm is provided between the active area 201 in which the TFT, the pixel electrodes 105 and others are formed and the sealant 106.

Figure 3:
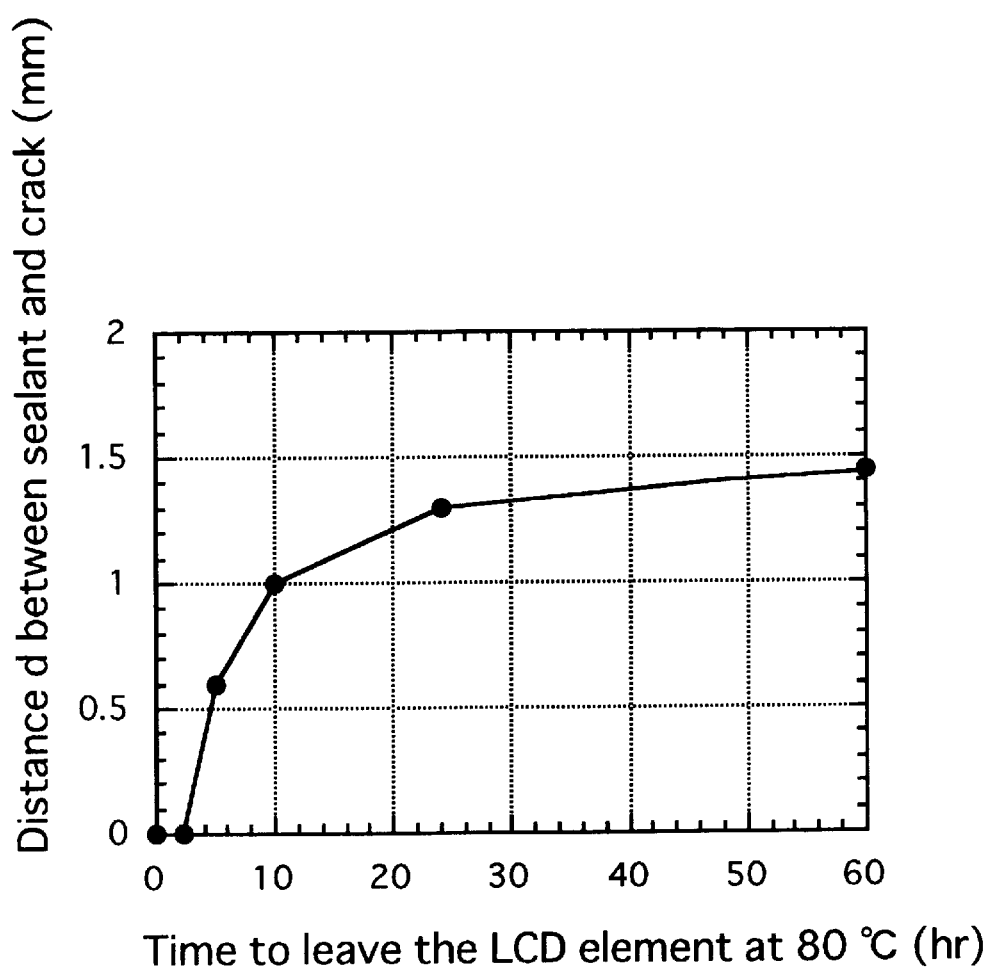
FIG. 3 is a graph showing a change in distance between the sealant 106 and the cracks 110 with time to leave the liquid crystal display element to stand at 80° C.
Figure 4:
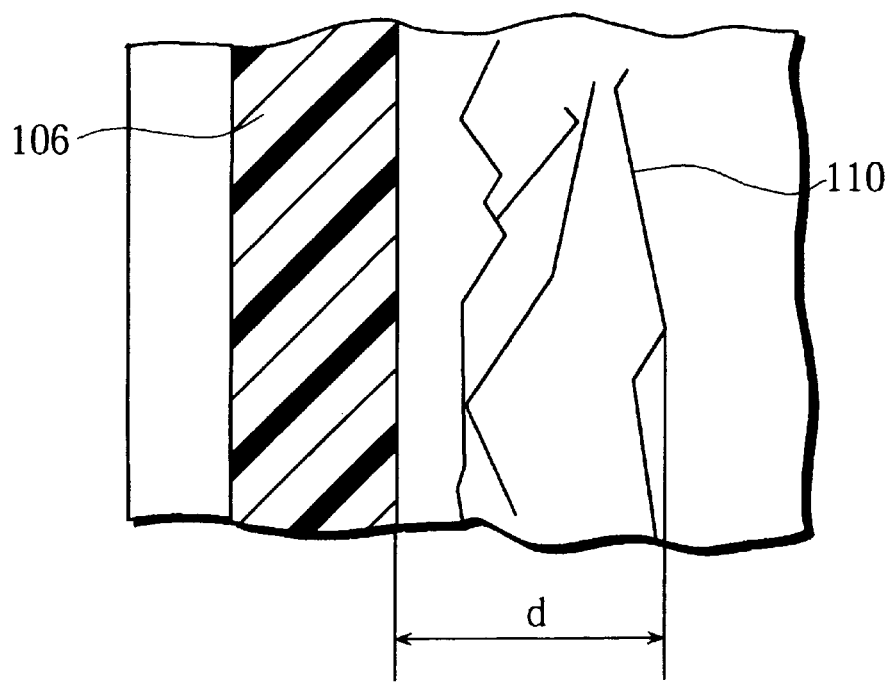
FIG. 4 is a plan view showing an essential part of the polymer dispersed liquid crystal element.
Figure 5:
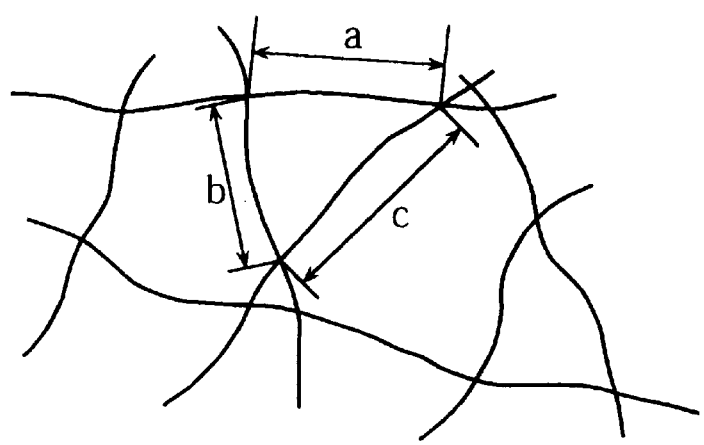
FIG. 5 is an illustration illustrating the state of the polymer liquid crystal composite layer, in the liquid crystal display element, having the structure of polymer resin expanding in the three dimensional network form in the continuous layers of liquid crystal.

In more detail, for example when the liquid crystal panel is allowed to stand at 80° C. for a long time, polymer resin matrix compound and liquid crystal droplets in the interior of the liquid crystal panel expand, to cause an expansion of the liquid crystal panel itself. The lower substrate 111 and the upper substrates 112 are distorted and thereby the liquid crystal in the vicinity of the sealant 106 is pressurized and is forced to flow to the interior of the panel. Thereafter, when the liquid crystal panel is cooled down to room temperature, the density of liquid crystal existing in the vicinity of the sealant 106 is reduced due to the liquid crystal flowing to the interior of the panel. As a result, the polymer resin matrix located in the vicinity of the sealant 106 becomes brittle, and further cracks 110 are developed in the polymer resin matrix by the pressure applied to the polymer resin matrix from the upper and lower substrates 112, 111. The area in which the cracks are developed corresponds to the non-active area 202 described above. It is to be noted here that the non-active area 202 of the frame-like form having a width of not less than 1.5 mm is determined on the basis of the results of FIG. 3. FIG. 3 shows a change in distance between the sealant 106 and the cracks 110 with time to leave the panel to stand at 80° C. As apparent from FIG. 3, even with 60 hours to leave the panel to stand at 80° C., the distance d (mm) between the sealant 106 and the crack 110 is just in the order of 1.45 mm at maximum. It will be understood from this that it is enough for the non-active area 202 to have a frame-like form having a width of not less than 1.5 mm. Thus, according to the liquid crystal display element of this embodiment, since there is provided the area of a frame-like form of 1.5 mm (the non-active area 202) to exclude the developing area of cracks 110 from the active area 201 even in a reliability test or equivalent in which ambient temperature is changed from high temperature to low temperature, no visible stripy display unevenness is presented on the display screen. It is noted that the distance d (mm) between the sealant 106 and the crack 110 mentioned above represents the distance between the innermost crack 110 of the cracks 110 developed in the vicinity of the sealant 106 and the inner periphery of the sealant 106, as shown in FIG. 4.

Although the panel gap between the TFT substrate 102 and the opposite substrate 103 is set at 10 $\mu$m, it is not of restrictive in this embodiment. This embodiment may adopt a panel gap falling in the range of 3 $\mu$m or more to 15 $\mu$m or less. Within the above numerical range, the developing area of cracks 110 would be an area of a frame-like form having a width of 1.5 mm from the inner periphery of the sealant 106. It is to be noted here that the developing area of cracks 110 does not show dependency on the size of the liquid crystal panel if its size is 3 inches or more, for example. To be more specific, when the liquid crystal panel is allowed to stand for a long time under high temperature and then is cooled down to room temperature, the cracks 110 are developed in the polymer resin matrix located in the vicinity of the sealant 106 by the pressure applied from the upper substrate 112 and the lower substrate 111. The extent that is affected by the applied pressure depends exclusively on the panel gap, rather than on an area of the liquid crystal panel. Therefore, within the above-described numerical range of 3 $\mu$m–15 $\mu$m, the cracks 110 develop within the area having the width of 1.5 mm from the inner periphery of the sealant 106, irrespective of the size of the liquid crystal panel.

Panel gaps over 15 $\mu$m would increase a driving voltage for driving the polymer liquid crystal composite layer 104 drastically, while on the other hand, panel gaps under 3 $\mu$m would increase permeability of the liquid crystal panel to reduce scattering power, undesirably. Due to this, the panel gap should be in the numerical range specified above in which the drastic increase of the driving voltage for driving the polymer liquid crystal composite layer 104 and the reduction of contrast are both suppressed.

No particular limitation is imposed on the TFT substrate 102 and the opposite substrate 103, as long as at least any one of them have light permeability. An opaque substrate such as a silicon substrate may be used for one of the substrates, in the case of which a reflector may be provided to form a reflection type of liquid crystal display element. As the substrate having light permeability, substrates made of glasses, quartz, etc. and plastic substrates may be used, for example. In this case, the TFT substrate 102 and the opposite substrate 103 may be different in material from each other.

The pixel electrodes 105 and the counter electrodes 107 are transparent conductive layers made of Indium Tin Oxide (ITO) for example.

The polymer liquid crystal composite layer 104 is in the form of liquid crystal droplets partly contacting with and connecting with each other. This existence form of the liquid crystal droplets is not of restrictive. For example, an existence form in which polymer compound is formed into a three dimensional network and liquid crystal is dispersed and held in the networks may be adopted. It is to be noted that the particle size of liquid crystal droplets and the interval of the network have the correlation with light scattering properties, i.e., a gain G. The gain G is expressed by the following equation.

$$G=(\text{Brightness of panel}(nt)/\text{illuminance of panel}(lx))\times\pi$$

Under consideration of the relationship between the particle size of the liquid crystal droplets and the gain G, the optimal value of the particle size of the liquid crystal droplets exists around about 1.2 $\mu$m. In more detail, particle sizes over 1.2 $\mu$m cause the scattering of blue light to be reduced, while on the other hand, particle sizes under 1.2 $\mu$m cause the scattering of red light to be reduced. In short, the both cases cause increase of the gain to cause deterioration of contrast. Accordingly, the particle size of the liquid crystal droplets in the active area 201 should preferably be set at around 1.2 $\mu$m of the optimal particle size. The interval of the network is worked out by observation under a microscope and determination of a mean value of the distances a–c shown in FIG. 5, for example.

Various kinds of liquid crystals that exhibit a liquid crystal state at around ordinary room temperature, such as nematic liquid crystals, cholesteric liquid crystals and smectic liquid crystals, may be adopted as the liquid crystal. These liquid crystals may be used singly or in combination of two or more kinds. Further, no particular limitation is imposed on the polymer compound, as long as they have light permeability and enable the liquid crystals to be held in the polymer resin matrix after the polymer liquid crystal composite layer 104 is formed. To give some actual examples, ultraviolet curable resins and heat curable resins (thermal phase separation type) may be used as the polymer compound. The ultraviolet curable resins which may be used include epoxy base resin and acrylic resin. The heat curable resins which may be used include epoxy base resin, urethane base resin, polyamide base resin, urea base resin, and polyester base resin.

No particular limitation is imposed on the sealant 106. The sealant which may be used includes a heat curable sealant, an ultraviolet curable resin and a composite sealant composed of the heat curable resin and the ultraviolet curable resin.

No particular limitation is imposed on the insulating films 109, 109. Any of the polyimide type insulating films and poly-amic acid type insulating films may be used. Also, insulating films made of inorganic compounds may be used. The insulating films 109, 109 used in this embodiment provide improved voltage retention of the polymer liquid crystal composite layer 104.

As evident from the foregoing, the liquid crystal display element of this embodiment is characterized in that the developing area of cracks 110 is formed as the non-active area 202, which is splitting from the active area 201. The non-active area 202 takes the frame-like form having a width of not less than 1.5 mm from the inner periphery of the sealant 106. This can provide an improved liquid crystal display element having good display properties of no stripy display unevenness being presented on the display screen.

In the case of the lower substrate 111 and the upper substrate 112 being different in material from each other, the development of cracks is encouraged due to the difference in dilation at high temperature between the both. However, the embodiment of the invention is still more useful for such a different material case as well, because the active area 201 is set so that the crack developing area can be excluded from the active area 201.

Although the active matrix drive adopting the TFT is referred to in this embodiment of the invention, the invention is not limited thereto. A passive matrix drive may be adopted.

Further, the embodiment of the invention may be modified such that the interior of the cracks 110 can be filled with material composed mainly of liquid crystal. This enables the difference in index of refraction between the cracks and the area other than the cracks 110 to be reduced to make the cracks 110 inconspicuous. As a result of this, the developing area of cracks 110 can be included in the active area, to make an attempt to enlarge the display screen.

No particular limitation is imposed on the method of filling the interior of the cracks 110. The methods which may be used for filling the interior of the cracks 110 include, for example, the heat treatment of annealing the liquid crystal display element 101 at the conditions of 80° C. and 2 hours. Further, in addition to the above-described heat treatment, the annealing at temperatures of 60° C. or more may be adopted as the method of filling the cracks 110 with liquid crystal, to produce similar effects. In addition, the number of times that the annealing is carried out may be increased. With the increased number of times that the annealing is carried out, the state of increasing flowability of the liquid crystal is maintained for a given time, so that the flow of liquid crystal from the center part of the active area 201 toward the non-active area 202 is developed to make it easy to fill the cracks 110 with the liquid crystal.

EXAMPLE 1-1

The liquid crystal display element according to Example 1-1 corresponds to the first embodiment mentioned above.

The above-described liquid crystal display element was produced in the method discussed below. The pixel electrodes 105, the source lines 108 and the insulating film 109 were formed on the lower substrate 111 made of glass by the techniques of vacuum deposition and etching, to form the TFT substrate 102. On the other hand, the counter electrodes 107 and the insulating film 109 were formed on the upper substrate 112 by the same method as the above, to form the opposite substrate 103.

Then, the heat curable sealant as the sealant 106 (STRUCT BOND XN21-S available from MITSUI TOATSU CHEMICALS, INC.) was coated on the TFT substrate 102 in such a manner as to take the form of a frame-like pattern hollowing a part corresponding to a liquid crystal filling hole. Further, the TFT substrate 102 and the opposite substrate 103 are bonded together through the sealant 106 so that the panel gap can be 10 μm.

Sequentially, the mixture of the liquid crystal and ultraviolet curable polymer dispersion material of PNM 201 (available from DAINIPPON INK AND CHEMICALS, INC.) was introduced into a space between the TFT substrate 102 and the opposite substrate 103 by the vacuum filling method. At this time, the liquid crystal filling hole 111 formed in the sealant 106 was not closed. Thereafter, the panel was irradiated with ultraviolet of a dominant wavelength of 365 nm and an irradiation intensity of 80 mW/cm$^2$ (measured with an ultraviolet illumination meter UV-M02 (available from ORC MANUFACTURING CO., LTD.), to polymerize the ultraviolet curable polymer dispersion material. Thus, a polymer network type liquid crystal element in which liquid crystal droplets were dispersed in continuation to each other in the polymer resin matrix was produced. The polymerization temperature during the irradiation of ultraviolet was set to be 20° C. It should be noted that the polymerization conditions and irradiation intensity need not be limited to those disclosed above, but may be set at a proper value as required.

Further, a sealing was carried out by use of a sealing material (TB3026 (trade made) available from Three Bond Co., Ltd.) to thereby produce the liquid crystal display element according to Example 1. The active area 201 was located on the inner periphery side of the non-active area 202 of the frame-like form having a width of 3 mm from the inner periphery of the sealant 106.

Next, the reliability test was carried out on the liquid crystal display element according to the Example, with ambient temperature varied. When the liquid crystal display element was observed under microscope prior to the reliability test, it was confirmed that no cracks developed in the polymer resin in the vicinity of the sealant 106. In the reliability test, the liquid crystal display element was annealed in an oven at 80° C. for 10 hours and thereafter was taken out of the oven to be cooled down at room temperature. When the liquid crystal display element was observed under microscope, it was confirmed that the cracks 110 developed in the polymer resin in the vicinity of the sealant 106. In more detail, the cracks 110 developed in the whole area of the non-active area 202 located in the vicinity of the sealant 106 and developed deep 1.5 mm at maximum from the sealant 106 toward the center. Thus, it was proven that the cracks developed when the liquid crystal display element was allowed to stand in the environment in which ambient temperature varies from high temperature to low temperature. With the liquid crystal display element according to the Example, since the non-active area 202 is so formed between the sealant 106 and the active area 201 as to be of the frame-like form having the width of 3 mm, no cracks developed in the polymer resin matrix in the active area 201 and good display was obtained.

As seen from the foregoing, in the liquid crystal display element in which the cracks are developed in the polymer resin matrix in the vicinity of the sealant 106 due to variations in ambient temperature, the whole area except the area for the cracks to develop is formed as the active area 201 to thereby produce an improved liquid crystal display element that can prevent display unevenness from being presented on the display screen to provide high reliability and good display properties.

Further, similar tests were carried out with the interval of the sealant 106 and the active area 201 varied. The results are shown in TABLE 1 given below. In TABLE 1, the evaluation criteria for determining the degree of display unevenness are expressed as follows: ⊙: No cracks develop in the active area 201; ○: Cracks develop partially in some pixels around the active area 201; Δ: Cracks develop substantially entirely in some pixels around the active area 201; and X: Cracks develop in concentration in some more pixels from the boundary between the active area 201 and the non-active area 202 to the inside of the boundary.

TABLE 1

| | Distance between the sealant and the active area (mm) | | | | | | | |
|---|---|---|---|---|---|---|---|---|
| | 0 | 0.5 | 1.0 | 1.5 | 2.0 | 3.0 | 4 | 5 | 6 |
| Degree of display unevenness | X | X | X | ○ | ⊙ | ⊙ | ⊙ | ⊙ | ⊙ |

Note:
⊙: No cracks develop in the pixels;
○: Cracks develop partially in some pixels around the active area; and
X: Cracks develop in concentration in some more pixels from around the active area to the inside thereof.

As apparent from TABLE 1, it was confirmed that with the interval smaller than 1.5 mm, the cracks 110 in the polymer resin matrix developed in the active area, so that the stripy display unevenness was presented on the display screen. It can be said otherwise that the developing area of cracks 110 is in the area of the frame-like form having the width of 1.5 mm from the inner periphery of the sealant 106. Thus, when the active area 201 was formed with the interval of not less than 1.5 mm from the sealant 106, the display unevenness was solved and good display was obtained. Further, it is most preferable for the requirement for producing the most superior effect to ensure the interval of not less than 3.0 mm. It is noted that in the case of the interval of the heat curable sealant 106 and the active area 201 being of 3.0 mm, no cracks developed in the active area 201, so good display was obtained. The cracks 110 were then visually inspected in the non-active area 202. When the inspection was made on the cracks 110, it was found that the interior of the cracks 110 was evacuated.

It was confirmed from the above results that according to the liquid crystal display element of this Example, even when the cracks 110 developed, no stripy display unevenness was presented on the display screen to provide good display properties.

EXAMPLE 1-2

The liquid crystal display element according to the Example 1-2 corresponds to the first embodiment.

The difference between the liquid crystal display element according to the Example 1-1 and that of the Example 1-2 is that the whole area of the polymer liquid crystal composite layer 104 is formed as the active area and also the cracks 110 are filled with materials containing liquid crystal as their major component.

First, the liquid crystal display element was produced in the same manner as in the Example 1-1. Then, the reliability test was carried out on the produced liquid crystal display element in the same manner as in the Example 1-1. When the liquid crystal display element was observed under microscope after the reliability test, it was confirmed that the cracks 110 developed in the polymer resin matrix in the vicinity of the sealant 106.

Further, when the liquid crystal display element 101 was annealed again in an oven at conditions of 80° C. and 2 hours, the material composed mainly of liquid crystal existing around the cracks 110 flew into the cracks 110 and the cracks were filled with it. At that time, the difference in index of refraction between the cracks and the area other than the cracks 110 was reduced, so that the cracks 110 became inconspicuous. Thus, it was confirmed that the heat treatment or equivalent via which the cracks 110 were packed was effective for making inconspicuous the cracks 110 when developed.

It was confirmed from these results that according to the liquid crystal display element according to this Example, even when the cracks 110 developed, the stripy display unevenness was inconspicuously presented on the display screen to provide good display properties.

Second Embodiment

The description on the second embodiment of the invention will be given below with reference to FIGS. 6 and 7. Like parts having similar functions to those of the liquid crystal display element of the first embodiment are given like reference numerals, and a description thereof will be omitted.

The liquid crystal display element according to the this embodiment is different in construction from that of the first embodiment in that the polymer liquid crystal composite layer in the non-active area is so formed that the liquid crystal droplets are each separated and dispersed in the polymer resin matrix layer composed of polymer compound.

Figure 6A:
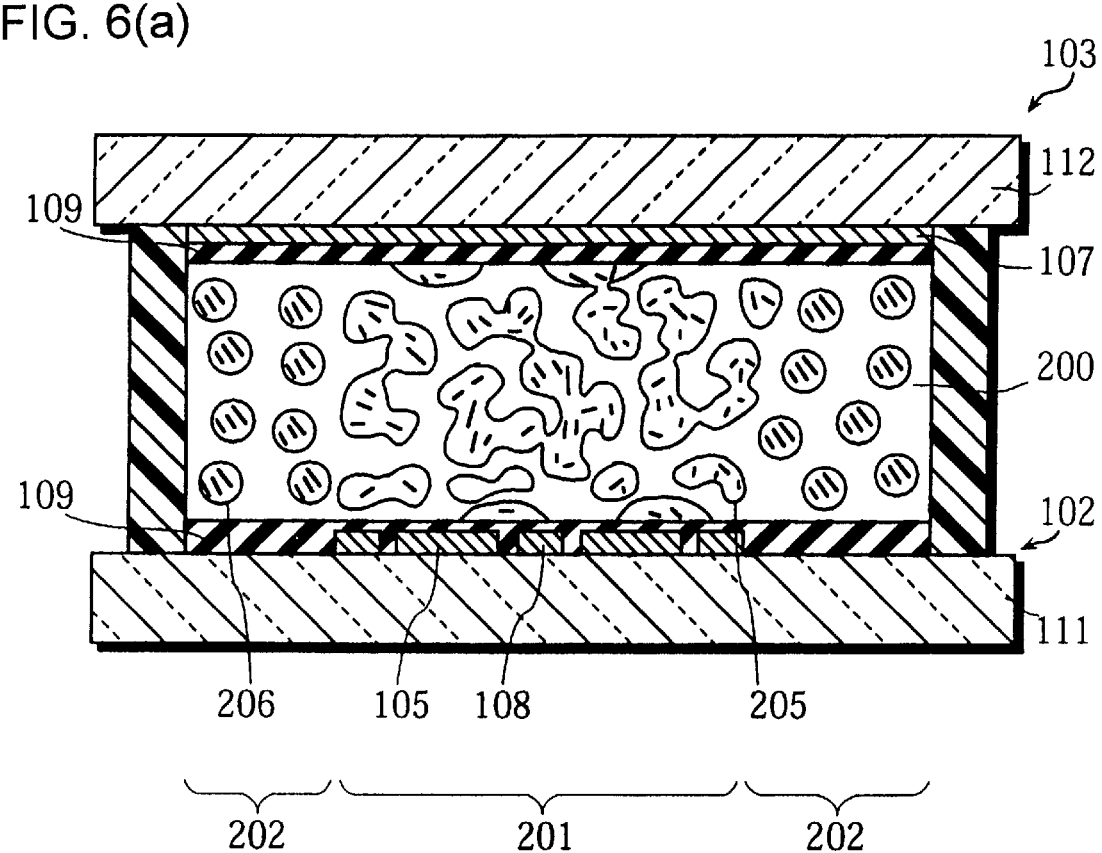
FIG. 6(a) is a sectional view schematically illustrating a liquid crystal display element of the second embodiment of the first inventive group.
Figure 6B:
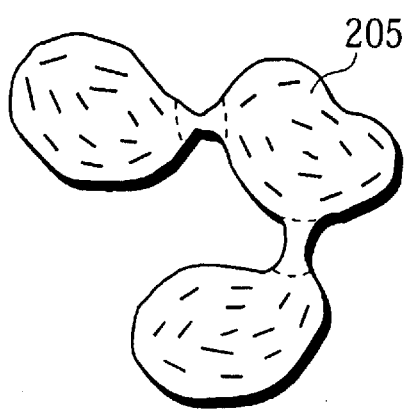
FIG. 6(b) is a sectional view schematically illustrating the form of the liquid crystal droplets in the active area.
Figure 6C:
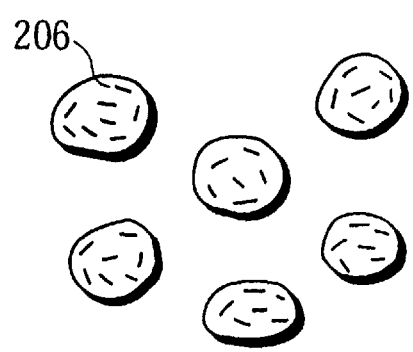
FIG. 6(c) is a sectional view schematically illustrating the form of the liquid crystal droplets in the non-active area.

FIG. 6(*a*) is a sectional view of the liquid crystal display element according to this embodiment illustrated schematically. As shown in FIG. 6(*a*), a non-active area 202 of the frame-like form is so formed at the inside of the sealant 106 as to have the width of about 1.0 mm. Further, an active area 201 is formed at the inside of the non-active area 202. In the non-active area 202, the liquid crystal droplets 206 of generally spherical or ellipsoid of revolution are dispersed and held with separated from each other (see FIG. 6(*c*)). In contrast to this, in the active area 201, the liquid crystal droplets 205 are formed with their partly contacting with and connecting with each other (see FIG. 6(*b*)). The active area 201 may be so formed that the liquid crystal droplets are dispersed and held in networks of the polymer resin matrix formed into a three dimensional network form.

The abovesaid form in which the liquid crystal droplets 206 existing in the vicinity of the sealant 106 are separated from each other provides the effect of making it hard for the liquid crystal droplets 206 to move toward the inside when temperature is raised. This enables the development of the cracks in the non-active area 202 to be suppressed. On the other hand, as referred to in the first embodiment, since the particle size of liquid crystal droplets and the intervals of the network have the correlation with light scattering properties, i.e., a gain G, the particle size of the liquid crystal droplets should preferably be about 1.2 $\mu$m.

The polymer liquid crystal composite layer 200, which is a major component of the liquid crystal display element according to this embodiment, can be formed by the method mentioned below.

Figure 7:
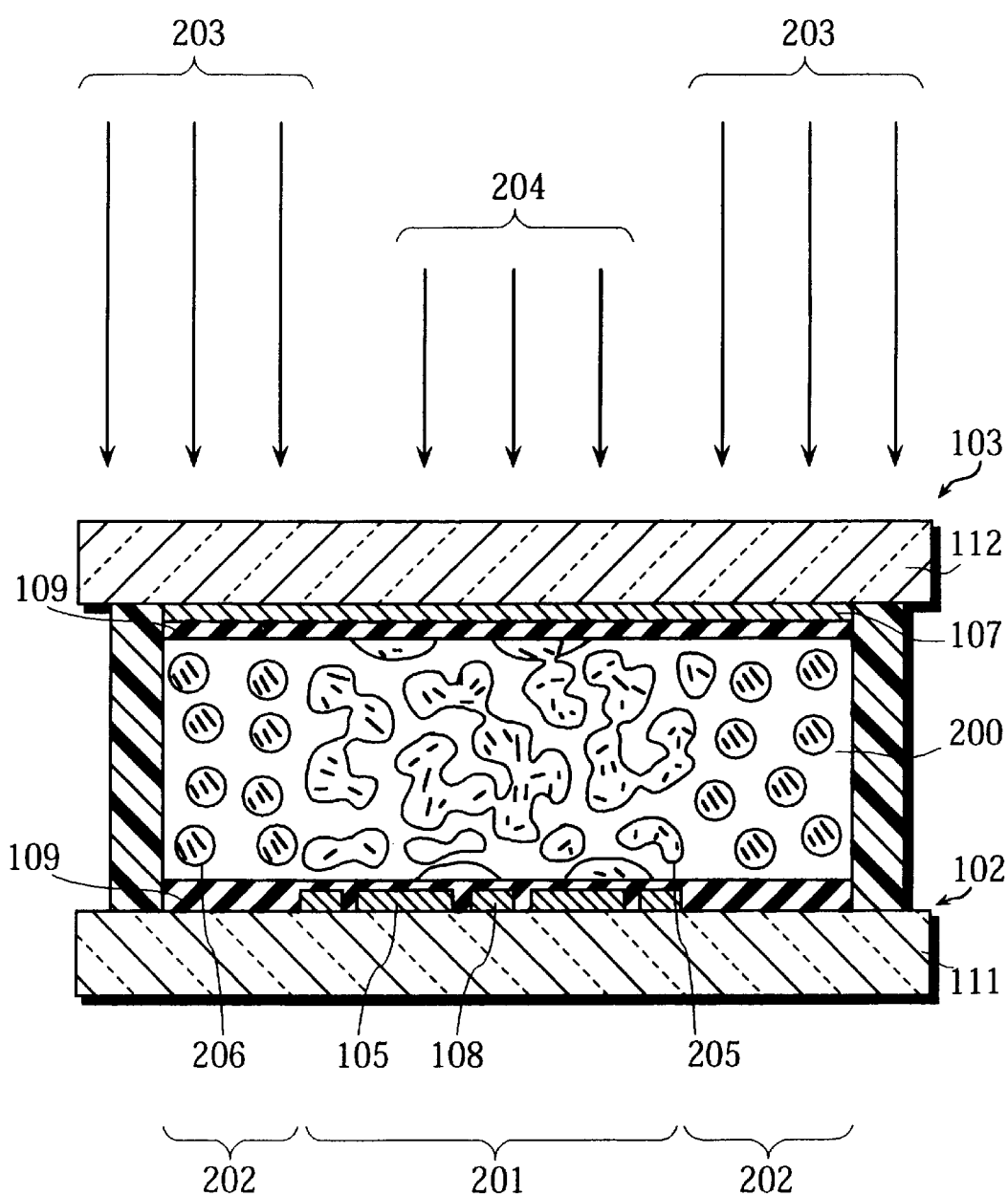
FIG. 7 is a sectional view for schematically illustrating the producing method of the liquid crystal display element.

FIG. 7 is a sectional view for illustrating the method for producing the liquid crystal display element described above. First, the TFT substrate 102 and the opposite substrate 103, pre-forming thereon the pixel electrodes 105 and the counter electrodes 107, respectively, are bonded together through the sealant 106. Further, the liquid crystal polymer mixture, whose major materials are uncured resin monomer (polymer precursor), such as ultraviolet curable resin, and liquid crystal materials, was filled in a space between the TFT substrate 102 and the opposite substrate 103. Sequentially, when the liquid crystal polymer mixture is irradiated with ultraviolet, the uncured resin monomer is polymerized to cause phase separation into the liquid crystal and the polymer resin matrix.

It should be noted that the ultraviolet is so set as to be different in irradiation intensity between the active area 201 and the non-active area 202. In more detail, the irradiation intensity of the second ultraviolet 203 with which the non-active area 202 is irradiated is set to be larger than the irradiation intensity of first ultraviolet 204 with which the active area 201 is irradiated. With this increased irradiation intensity of the second ultraviolet 203, the phase separation between the liquid crystal and the polymer compound is further promoted, so that the non-active area 202 takes the structure that the liquid crystal droplets 206 are each independently dispersed. On the other hand, the irradiation intensity of the first ultraviolet 204 set to be smaller than that of the second ultraviolet 203 causes the degree of progress of the phase separation between the liquid crystal and the polymer compound to be suppressed. As a result of this, the active area 201 takes the structure that the liquid crystal droplets 205 are partly contacting with and continuing to each other or being held in networks of the polymer resin matrix formed into a three dimensional network form. The polymer liquid crystal composite layer 200 is thus produced. It is noted that the width of the non-active area 202 is set to be 1.0 mm in view of the effects of the light curving from the back to the side during the irradiation of the first ultraviolet 204, for example, and it is difficult to make the width smaller than 1.0 mm.

No particular limitation is imposed on the irradiation intensity of ultraviolet. Any selected irradiation intensity of ultraviolet may be used, as long as the structure of the liquid crystal droplets 205 in the active area 201 and the structure of the liquid crystal droplets 206 in the non-active area 202 are produced by it, as mentioned above. However, with increasing irradiation intensity of ultraviolet, the degree of polymerization proceeds and accordingly the particle size of the liquid crystal droplets decreases. For this reason, the ultraviolet with which the non-active area 202 is irradiated must have a larger irradiation intensity than the ultraviolet with which the active area 201 is irradiated.

Examples of the method for varying the irradiation intensity of ultraviolet in the liquid crystal panel surface include a method of an UV-cut filter being partially disposed in the liquid crystal panel. For example, an UV-cut filter for filtering out light wavelengths of 370 nm is disposed in the active area 201 and another UV-cut filter for filtering out light wavelength of 350 nm is disposed in the non-active area 202. This method can allow the ultraviolet from the same light source to be larger in irradiation intensity in the non-active area 202 than in the active area 201 through the action of the UV-cut filters. As this method requires only one irradiation, the production process can be simplified.

As apparent from the foregoing, the liquid crystal display element according to this embodiment is characterized by the structure of the liquid crystal droplets 206 being each independently dispersed in the area (the non-active area 202) located in the vicinity of the sealant 106. This structure can allow the liquid crystal droplets 206 to be hard to move to the interior even when the ambient temperature rises, so as to prevent reduction of the density of liquid crystal in the non-active area 202. Consequently, the development of cracks can be prevented and thus the generation of the display unevenness originating from the cracks can be prevented. Besides, since the liquid crystal droplets 205 in the active area 201 are dispersed and held in the continuous phase of matrix comprising polymer compound, the generation of the display unevenness can be prevented with good contrast being maintained. In addition, since the non-active area 202 is formed in the frame-like form having the width of not less than 1.0 mm, the active area can be enlarged effectively.

EXAMPLE 2

The liquid crystal display element according to Example 2 corresponds to the second embodiment. The liquid crystal display element described above was produced in the method discussed below.

As is the case with Example 1, the pixel electrodes 105, the source lines 108 and the insulating film 109 were formed on the lower substrate 111 made of glass by the vacuum deposition and etching, to form the TFT substrate 102. Further, OPTOMER AL5417 (available from JAPAN Synthetic Rubber Co., Ltd.) was printed on the lower substrate 111 by a printing method and thereafter was cured by heating in an oven, to form the insulting film 109. On the other hand, the counter electrodes 107 were formed on the upper substrate 112 by the vacuum deposition and etching, as in the case with the above. Further, the OPTOMER AL5417 was coated on the upper substrate 112 and then was cured in the oven as in the same manner as in the above, to form the insulating film 109, thereby forming the opposite substrate 103.

Sequentially, the heat curable sealant as the sealant 106 (STRUCT BOND XN21-S available from MITSUI TOATSU CHEMICALS, INC.) was coated on the TFT substrate 102 in such a manner as to take the form of a frame-like pattern hollowing a part corresponding to a liquid crystal filling hole. Further, after glass spacers were sprayed on the TFT substrate, the TFT substrate 102 and the opposite substrate 103 were bonded together through the sealant 106 so that the panel gap could be set to be 13 μm.

Then, the liquid crystal polymer mixed solution including the liquid crystal and ultraviolet curable polymer dispersion material of PNM 201 was introduced into a space between the TFT substrate 102 and the opposite substrate 103 by the vacuum filling method.

Figure 8:
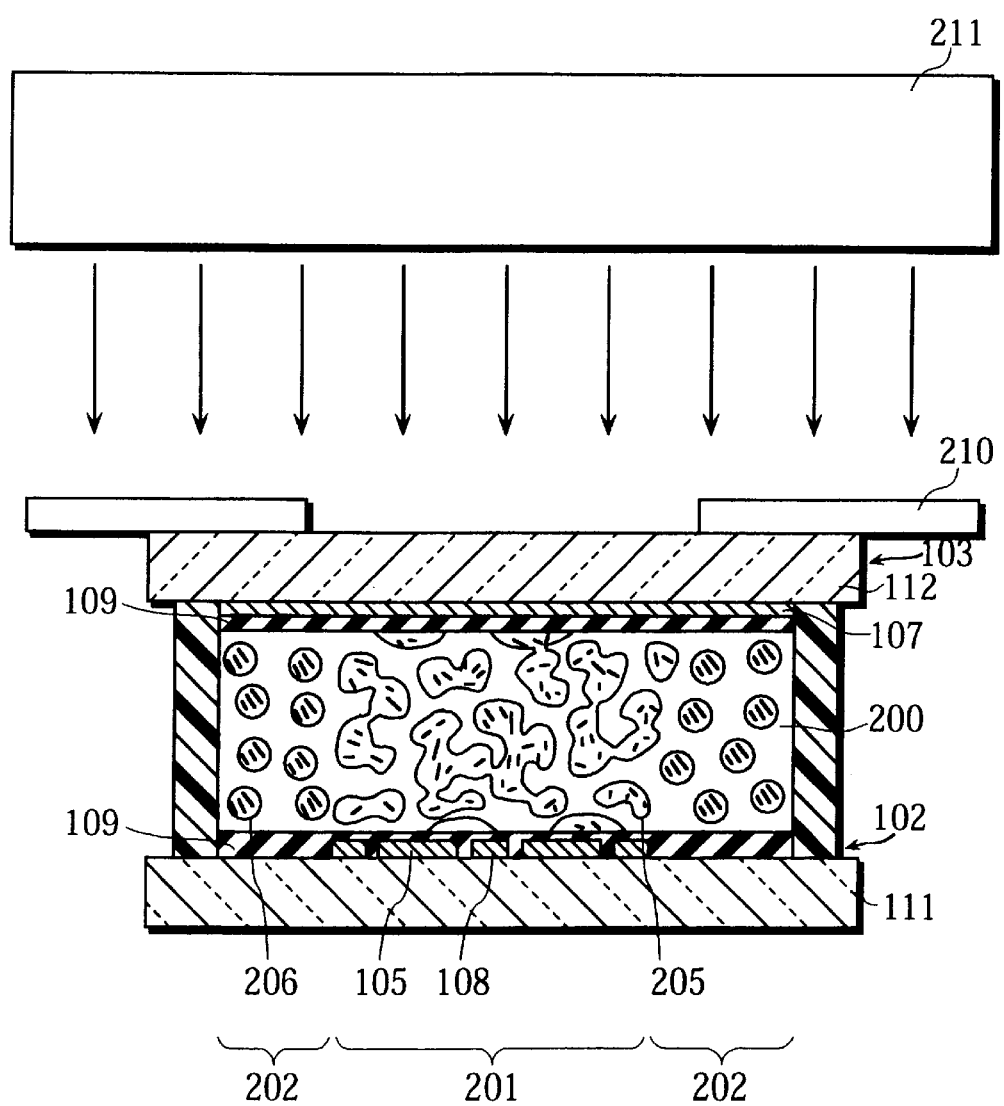
FIG. 8 is a sectional view for schematically illustrating the producing method of the liquid crystal display element of Example 2 of the second embodiment.

Further, as shown in FIG. 8, after ultraviolet reflectors 210, 210 were disposed so that the non-active area 202 in the vicinity of the sealant 106 and the sealant 106 could be shielded by them, the panel was irradiated with the first ultraviolet for 60 seconds from the opposite substrate 103 side by use of an ultraviolet generator 211 (UVA702-IMNSC-BB01 (trade name) available from USHIO INC.) with an extra-high pressure mercury lamp as the light source. Then, the polymer in the area except the area shielded by the ultraviolet reflectors 210, 210 was polymerized to cause a phase separated into the liquid crystal and the polymer resin matrix. It is noted that the temperature of the liquid crystal panel (polymerization temperature) was so set that the surface temperature of the panel could be 19° C. by means of a circulating thermostatic chamber. Further, the irradiation intensity of ultraviolet was so set as to be 100 mW/cm², while it was measured with the ultraviolet illumination meter UV-M02 (available from ORC MANUFACTURING CO., LTD.).

Then, the ultraviolet reflectors 210, 210 were removed from the panel, and then the entire panel was irradiated with the second ultraviolet for 60 seconds. The irradiation intensity of the second ultraviolet was set to be 500 mW/cm². Then, the polymer dispersion material in the non-active area 202 was polymerized to cause a phase separation into the liquid crystal and the polymer resin matrix. As mentioned above, when the liquid crystal polymer mixed solution is irradiated with ultraviolet, the irradiation intensity of ultraviolet with which the non-active area 202 is irradiated may be made larger than the irradiation intensity of ultraviolet with which the active area 201 is irradiated, to control the existence forms of the liquid crystal droplets. With the increased irradiation intensity of the ultraviolet, the phase separation between the liquid crystal and the polymer compound is promoted increasingly, so that the liquid crystal droplets 206 in the non-active area 202 exist in the state of being independently dispersed. On the other hand, the liquid crystal droplets 205 in the active area 201 exist in the state of partly contacting with and continuing to each other.

When the irradiation of ultraviolet is carried out in the manner mentioned above, the irradiation intensity of ultraviolet with which the non-active area 202 is irradiated will be 600 mW/cm² in total, and the irradiation intensity of ultraviolet with which the active area 201 is irradiated will be 500 mW/cm² in total. Accordingly, the ultraviolet with which the non-active area 202 was irradiated is apparently larger in irradiation amount than the ultraviolet with which the active area 201 was irradiated. However, in the active area 201, the phase separation between the liquid crystal and the polymer compound is in completion at the end of the first step of irradiation of ultraviolet. Therefore, no further reaction is caused to progress by further irradiation of ultraviolet of 500 mW/cm². Resultantly, the irradiation of ultraviolet for the phase separation in the non-active area 202 is substantially larger in amount.

The structure of the liquid crystal droplets 205, 206 was confirmed by the following manner. After a pair of glass substrates were bonded together through the sealant, liquid crystal polymer mixed solution comprising the same composition was filled in between the substrates and polymerized in the same polymerization conditions, to thereby produce the liquid crystal panel. The liquid crystal panel does not form thereon the TFT and others. Any one of the substrates of the liquid crystal panel thus produced was peeled off, to measure the particle size of the liquid crystal droplets. More specifically, the measurement of the particle size of the liquid crystal droplets was performed by observation under a microscope and determination of a mean value of the particle sizes by use of an image processing apparatus. The observation showed that the mean value of the particle sizes of the liquid crystal droplets in the active area was 1.2 μm and the liquid crystal droplets were in the form of being partly connected with each other. The percentage of the liquid crystal in the active area at that time was 75%. On the other hand, the mean value of the particle sizes of the liquid crystal droplets in the non-active area was as small as 0.6 μm and the liquid crystal droplets were in the form of being independent from each other. The percentage of the liquid crystal at that time was 68%.

It was presumed from the foregoing that in the liquid crystal display element according to this Example as well, the liquid crystal droplets 205 in the active area 201 have the structure of being partly connected with each other, and those 206 in the non-active area 202 have the structure of being independently dispersed, as is the case with the above described structure.

Sequentially, the liquid crystal panel thus produced was put in the oven to be annealed at the conditions of 80° C. and 10 hours. Thereafter, the panel was cooled down to room temperature and was observed with a microscope on the state of the crack developing in the polymer resin matrix. It was then confirmed that no cracks were developed in the polymer resin matrix in the vicinity of the sealant 106, while also no display unevenness was generated in the active area 201.

In the second irradiation of ultraviolet, the ultraviolet reflectors 210 were removed from the panel and the entire surface of the panel was irradiated with ultraviolet. Alternatively, the area corresponding to the active area 201 to which ultraviolet was applied in the first irradiation may be shielded from ultraviolet by the ultraviolet reflectors 210 in the second irradiation of ultraviolet. To shield the first irradiated area from ultraviolet provides the effect of suppressing decomposition of the liquid crystal and others in the active area 201 caused by the ultraviolet.

The irradiation intensity of ultraviolet may be controlled by varying the intensity of the lamp of the light source. Specifically, for this purpose, the extra-high pressure mercury lamp, a high pressure mercury lamp and equivalent are used, for example. In this case, the ultraviolet peaks at the light wavelength of 365 nm and is small in irradiation intensity of ultraviolet in a visible light region, thus enabling decomposition of the liquid crystal to be suppressed to prevent reduction of reliability. On the other hand, in the case of using a metal halide lamp and equivalent, a lamp intensity exists in the visible light region as well, then causing possible decomposition of the liquid crystal to arise a problem of reliability.

Third Embodiment

The description on the third embodiment of the invention will be given below with reference to FIGS. 9 and 10. Like parts having similar functions to those of the liquid crystal display element of the first or second embodiment are given like reference numerals, and a detailed description thereof will be omitted.

The liquid crystal display element according to the third embodiment is different in construction from that of the first embodiment or the second embodiment in that the liquid crystal and the polymer compound are in a dissolved state without being phase-separated in the non-active area of the polymer liquid crystal composite layer.

Figure 9:
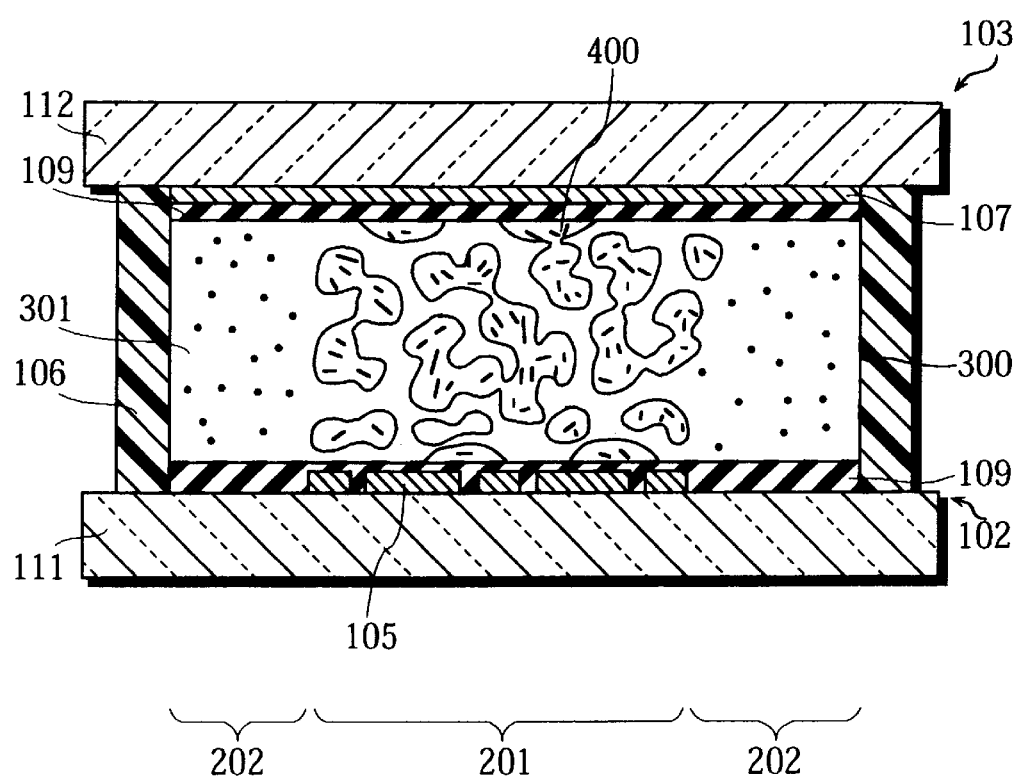
FIG. 9 is a sectional view schematically illustrating the liquid crystal display element of the third embodiment of the first inventive group.

In more detail, as shown in FIG. 9, in the non-active area 202 of the polymer liquid crystal composite layer 300 in the vicinity of the sealant 106, the liquid crystal and the polymer compound are in the dissolved state without being phase-separated. In contrast to this, in the active area 201, the liquid crystal droplets exist in the form of partly contacting with and continuing to each other. The active area 201 may take another form of the liquid crystal droplets being dispersed with their being held in networks of the polymer resin matrix formed into a three dimensional network form. This construction can allow the area in the vicinity of the sealant 106, in which the cracks are easy to develop, to be in a liquid state or a semi-solid state, and resultantly, the development of cracks can be prevented. It is noted that the non-active area 202 is formed in the frame-like form having the width of about 1 mm.

The polymer liquid crystal composite layer 300, which is a major component of the liquid crystal display element according to this embodiment, can be formed by the method mentioned below.

Figure 10:
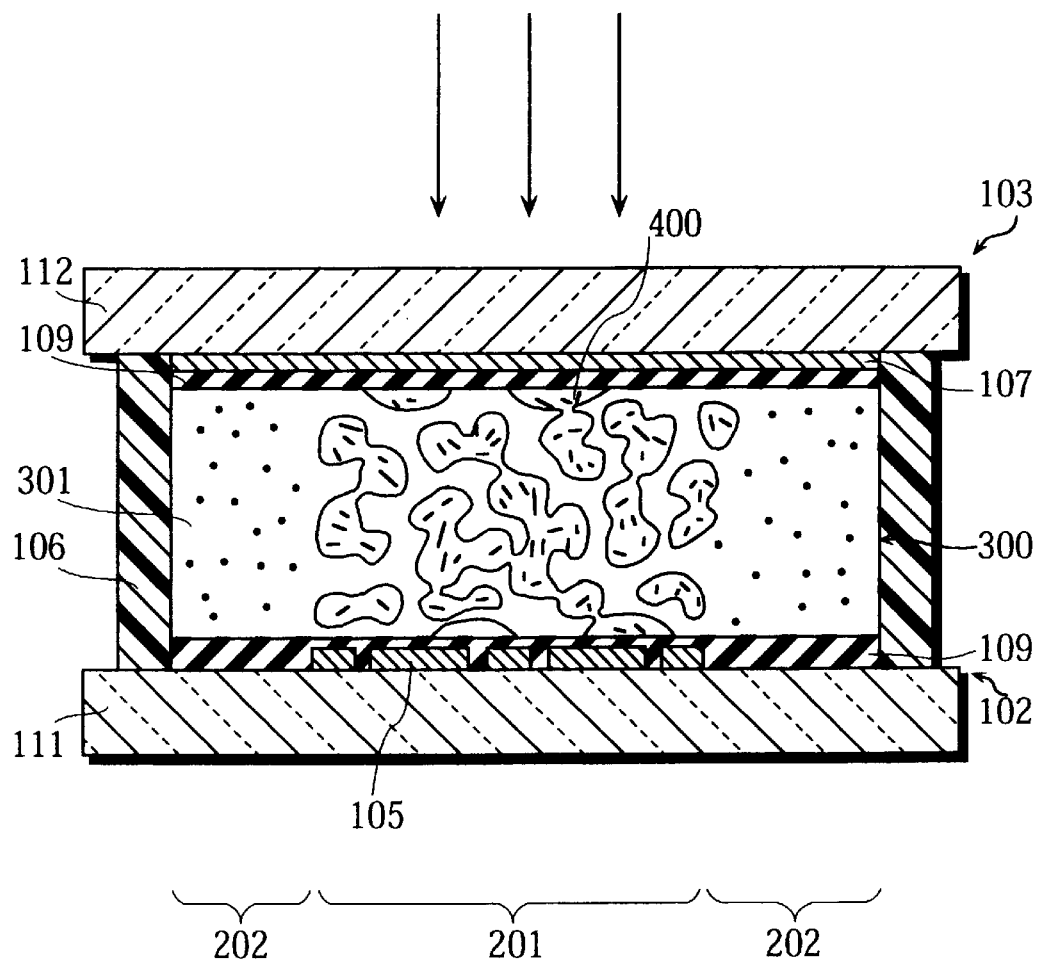
FIG. 10 is a sectional view schematically illustrating the producing method of the liquid crystal display element.

FIG. 10 is a sectional view for illustrating the method for producing the liquid crystal display element described above. First, the TFT substrate 102 and the opposite substrate 103, pre-forming thereon the pixel electrodes 105 and the counter electrodes 107, respectively, are bonded together through the sealant 106. Further, the liquid crystal polymer mixture whose major materials are uncured resin monomer, such as ultraviolet curable resin, and liquid crystal materials was filled in a space between the TFT substrate 102 and the opposite substrate 103. Sequentially, only the area of the liquid crystal polymer mixture corresponding to the active area 201 was irradiated with ultraviolet, with shielding means for shielding ultraviolet being disposed over the area corresponding to the non-active area 202. This can produce the result that in the active area 201, the liquid crystal droplets exist in the form of being partly contacting with and continuing to each other or being dispersed with their being held in networks of the polymer resin matrix formed into a three dimensional network form. On the other hand, in the non-active area 202, which is not irradiated with ultraviolet, the phase separation between the liquid crystal and the polymer compound is not caused, so that the ultraviolet curable resin and the liquid crystal material are in the state of being dissolved. As a result of this, since the ultraviolet curable resin in the non-active area 202 is not cured, the development of cracks in the non-active area 202 is prevented.

The active area 201 may have the structure that the liquid crystal droplets are dispersed, with their being held in networks of the polymer resin matrix formed in a three dimensional network form. Alternatively, it may have the structure that the liquid crystal droplets are each separately dispersed, though contrast deteriorates.

EXAMPLE 3

The liquid crystal display element according to Example 3 corresponds to the third embodiment. In this liquid crystal display element, the liquid crystal panel was produced in the same manner as in Example 2.

Further, as is the case with Example 2, after the non-active area 202 in the vicinity of the sealant 106 and the sealant 106 were shielded by the ultraviolet reflectors 210, 210, the liquid crystal panel was irradiated with the first ultraviolet from the opposite substrate 103 side, with its surface temperature kept at 19° C. The irradiation was made at the conditions of 100 mW/cm$^2$ of irradiation intensity and 60 seconds of irradiation time.

Then, the polymer precursor in the area except the area shielded by the ultraviolet reflectors 210, 210 was polymerized to cause a phase separation into the liquid crystal and the polymer resin matrix. As a result, in the active area 201, the liquid crystal droplets were in the form of being partly connected to each other. On the other hand, the non-active area 202 was in an uncured liquid state in which the liquid crystal and polymer compound are mixed. It is noted that the temperature of the liquid crystal panel (polymerization temperature) was set so that the surface temperature of the liquid crystal panel could be 19° C. by means of a circulating thermostatic chamber.

Sequentially, the liquid crystal panel thus produced was put in the oven to be annealed at the conditions of 80° C. and 10 hours. Thereafter, the panel was cooled down to room temperature and was observed with a microscope on the state of the crack developing in the polymer resin matrix. It was then found that no cracks were developed in the polymer resin matrix in the vicinity of the sealant 106, and also no display unevenness was generated in the active area 201, so that a good display screen was obtained.

Fourth Embodiment

The description on the fourth embodiment of the invention will be given below with reference to FIG. 11. Like parts having similar functions to those of the liquid crystal display elements of the first to third embodiments are given like reference numerals, and a detailed description thereof will be omitted.

The liquid crystal display element according to the fourth embodiment is different in construction from that of the first embodiment, the second embodiment or the third embodiment in that no polymer liquid crystal composite layer exist in the non-active area, but instead a side gap layer is formed therein.

Figure 11:
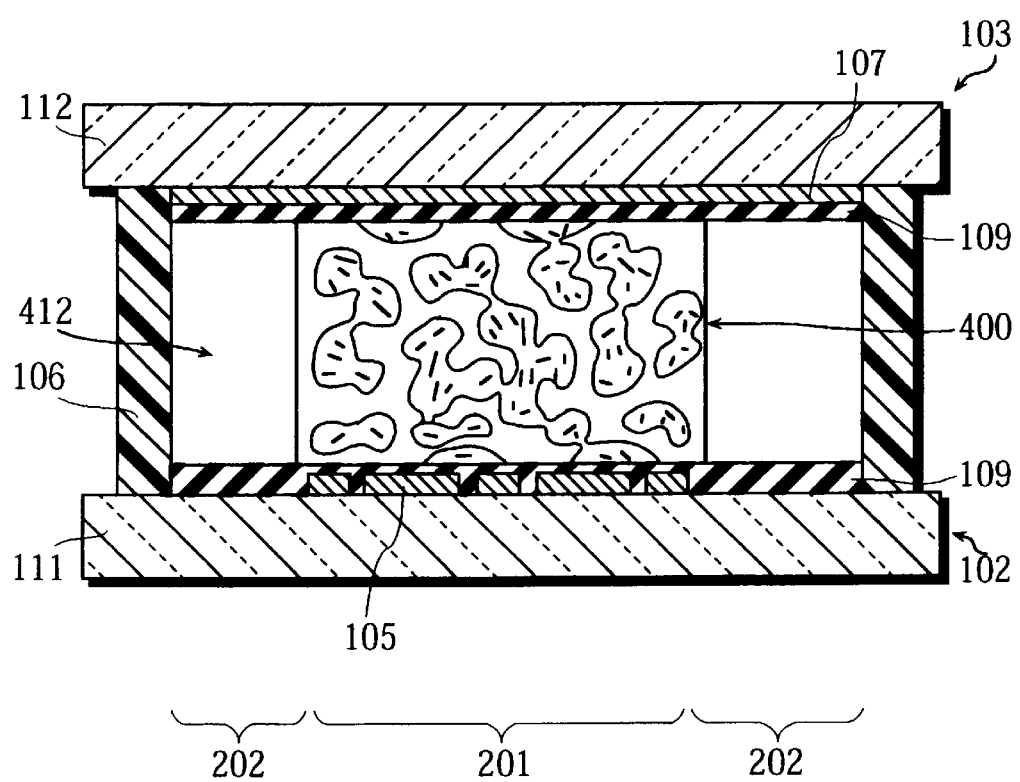
FIG. 11 is a sectional view schematically illustrating the liquid crystal display element of the fourth embodiment of the first inventive group.

In more detail, as shown in FIG. 11, a polymer liquid crystal composite layer 400 is formed substantially in the active area 201 only and the side gap layer 412 is in an evacuated or vacuum state. Thus, since no polymer resin matrix or liquid crystal exists, to begin with, in the area in which the cracks will develop, it is possible to prevent the development of cracks completely. It is noted that instead of being evacuated, the non-active area 202 may be filled with other gases including air, nitrogen and argon or polymer compound. In the case of using air, dried, low humidity air should preferably be used in that contamination of the liquid crystal and the like is reduced.

Further, the active area 201 may have the structure that the liquid crystal is dispersed, with their being held in networks of the polymer resin matrix formed in a three dimensional network form. Alternatively, it may have the structure that the liquid crystal droplets are each separately dispersed, though contrast deteriorates.

In the second to fourth embodiments, the layer in which the liquid crystal is dispersed in the polymer is so structured that the area in the vicinity of the sealant 106 is rendered different in structure from the remaining area. With this structure, it is not desirable to use the area around the sealant 106 for an image displaying area, and the area other than the area around the sealant 106 should preferably be used as the image active area.

EXAMPLE 4-1

The liquid crystal display element according to Example 4-1 corresponds to the fourth embodiment. The liquid crystal display element of this Example was produced in the following manner.

First, as is the case with the Example 1, the pixel electrodes 105, the source lines 108 and the insulating film 109 were formed on the lower substrate 111 made of glass by the vacuum deposition and etching, to form the TFT substrate 102. Further, the OPTOMER AL5417 was printed on the lower substrate 111 by the printing method and thereafter was cured by heating in the oven, to form the insulting film 109. On the other hand, the counter electrodes 107 and the insulating film 109 were formed on the upper substrate 112 in the same manner as in the above, to form the opposite substrate 103. Sequentially, the heat curable sealing material as the sealant 106 was coated on the TFT substrate 102 in such a manner that the coating can take the form of a frame-like pattern hollowing a part corresponding to a liquid crystal filling hole.

Then, a required amount of the liquid crystal polymer mixed solution containing the liquid crystal and the ultraviolet curable polymer dispersion material of PNM201 was added dropwise to the area including the active area 201 through a nozzle. Otherwise, the polymer material may be placed in the active area 201 by coating the polymer material thereon with a spinner, with the non-active area 202 being masked. Additionally, any known printing methods including a roller may be used.

Further, after glass spacers were sprayed on the TFT substrate 102, the TFT substrate 102 and the opposite substrate 103 were bonded together through the sealant 106 so that the panel gap could be 10 μm, to thereby produce the liquid crystal panel. The interval of the inner periphery of the sealant 106 and the active area 201 was then set to be about 3 mm. The step of bonding the TFT substrate 102 and the opposite substrate 103 together was carried out in the air, so that the non-active area 202 located in the vicinity of the sealant 106 was filled with air.

Further, the liquid crystal panel was irradiated with ultraviolet for 60 seconds from the opposite substrate 103 side by use of an ultraviolet generator 211 with an extra-high pressure mercury lamp as the light source. Then, the polymer precursor in the active area 201 was polymerized to cause a phase separation into the liquid crystal and the polymer compound. The temperature of the liquid crystal panel (polymerization temperature) was then set so that the surface temperature of the panel could be 20° C. by means of the circulating thermostatic chamber. Further, the irradiation intensity of ultraviolet was set to be 80 mW/cm$^2$.

When the liquid crystal panel was observed, it was found that the side gap layer 412 was filled with air and the polymer liquid crystal composite layer 400 was formed in the active area 201. Finally, the liquid crystal filling hole was sealed by use of a sealing material (TB3026 available from Three Bond Co., Ltd.).

Further, when the liquid crystal panel thus produced was observed with a microscope, no cracks were found in the non-active area 202 located in the vicinity of the sealant 106. Then, the liquid crystal panel was annealed in the oven at 80° C. for 10 hours and then cooled at room temperature. As a result of this, no polymer liquid crystal composite layer exists in the vicinity of the sealant 106, so no cracks developed and accordingly the liquid crystal display element having good display properties was obtained.

EXAMPLE 4-2

Figure 12:
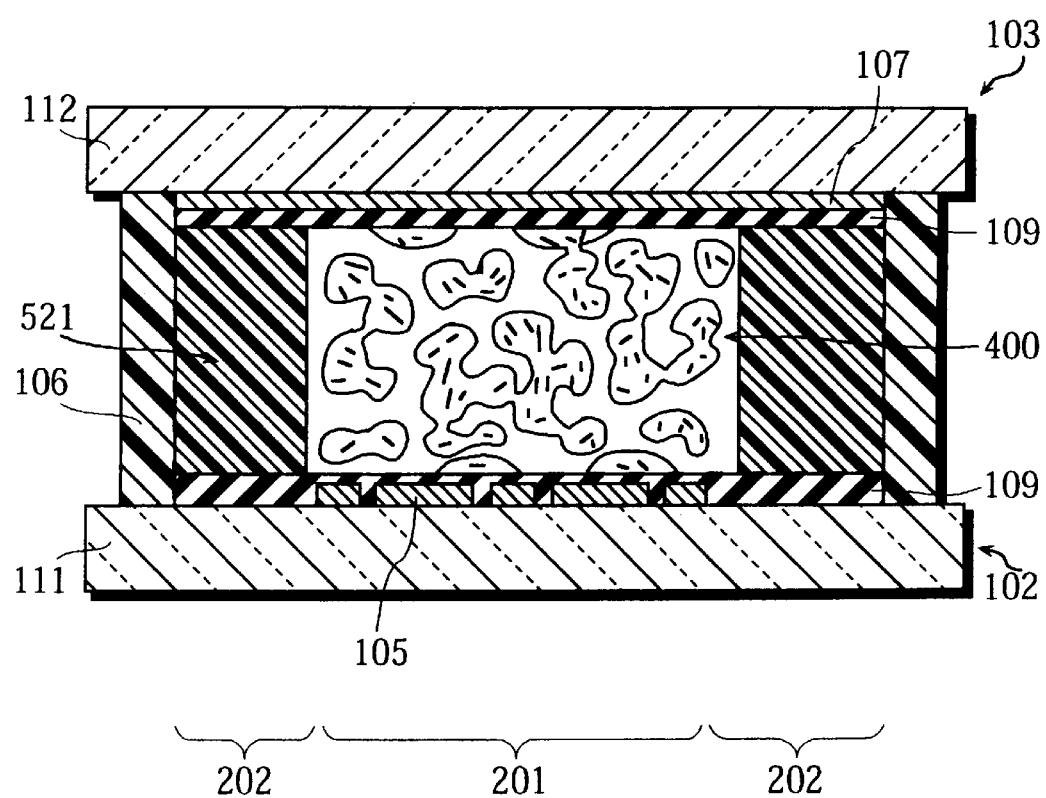
FIG. 12 is a sectional view schematically illustrating the liquid crystal display element of Example 4-2 of the fourth embodiment.

The liquid crystal display element according to Example 4-2 corresponds to the fourth embodiment. The polymer dispersed liquid crystal of Example 4-2 is different from the polymer dispersed liquid crystal of Example 4-1 in that the non-active area 202 is not evacuated or vacuum but is provided with the polymer resin layer, instead (see FIG. 12).

The liquid crystal display element of this Example was produced in following manner.

First, as is the case with the Example 4-1, the pixel electrodes 105, the source lines 108 and the insulating film 109 were formed on the lower substrate 111, to form the TFT substrate 102. On the other hand, the counter electrodes 107 and the insulating film 109 were formed on the upper substrate 112 in the same manner as in the above, to form the opposite substrate 103. Sequentially, the heat curable sealing material as the sealant 106 was printed on the TFT substrate 102 in such a manner that the coating can take the form of a frame-like pattern hollowing a part corresponding to a liquid crystal filling hole.

Then, 90% of polymerizable monomer (2-ethylhexyl acrylate), 9% of oligomer (Biscoat 828 (trade name) available from OSAKA ORGANIC CHEMICAL INDUSTRY LTD.) and 1% of polymerization initiator (Benzylmethyl Ketal (trade name) available from NIPPON KAYAKU CO., LTD.) were mixed to prepare polymer composition A. Further, 80% of liquid crystal material of TL 205 (available from Merck Industrial Chemicals) was mixed to 20% of the polymer composition A to prepare polymer composition B.

Sequentially, a required amount of the polymer composition B was added dropwise to the area including the active area 201 through the nozzle. Further, after the polymer composition A was added dropwise to the non-active area 202 through the nozzle, the TFT substrate 102 and the opposite substrate 103 were bonded together.

Finally, the liquid crystal panel was irradiated with ultraviolet in the same manner as in Example 4 to produce the liquid crystal display element according to this Example.

When the liquid crystal display element thus produced was observed, it was found that the active area 201 took the form of the polymer dispersion liquid crystal in which the liquid crystal droplets were dispersed and held in the resin, while on the other hand, the non-active area 202 took the form of only the polymerized polymer resin existing, in other words, the polymer resin layer 521 was formed in the non-active area.

Sequentially, the liquid crystal panel thus produced was put in the oven to be annealed at conditions of 80° C. and 10 hours. Thereafter, the liquid crystal panel was cooled down to room temperature and was observed with a microscope on the state of the cracks developing in the polymer resin matrix. It was then found that no cracks were developed in the polymer resin matrix in the vicinity of the sealant 106, and no display unevenness was generated in the active area 201, so that a good display screen was obtained.

That is why, since only the polymer resin exists in the vicinity of the sealant 106, breaking strength against a warp or equivalent of the lower substrate 111 or the upper substrate 112 increases, as compared with the case of the liquid crystal droplets existing in the vicinity of the sealant.

The polymer resin layer 521 in the vicinity of the sealant 106 is made of the same material as the polymer resin matrix in the polymer liquid crystal composite layer 400, thus providing an inconspicuous boundary between the polymer liquid crystal composite layer 400 and the polymer resin layer 521.

Ultraviolet curable resins and heat curable resins may be used as the polymer resin layer 521. No particular limitation is imposed on the ultraviolet curable resin, and various kinds of known ones may be used, as long as they can be cured by ultraviolet when they are given a polymerization initiator. The use of these resins contributes to the development of no cracks in the polymer resin layer 521 and in turn to good display. In addition, if the non-active area 202 initiates polymerization, lagging behind the active area 201 when irradiated with ultraviolet, such would produce the effect of providing a further inconspicuous boundary between the polymer resin layer 521 and the polymer liquid crystal composite layer 400.

Fifth Embodiment

The description on the fifth embodiment of the invention will be given below with reference to FIGS. 13 to 17. Like parts having similar functions to those of the liquid crystal display element of the first to fourth embodiments are given like reference numerals, and a detailed description thereof will be omitted.

Figure 13:
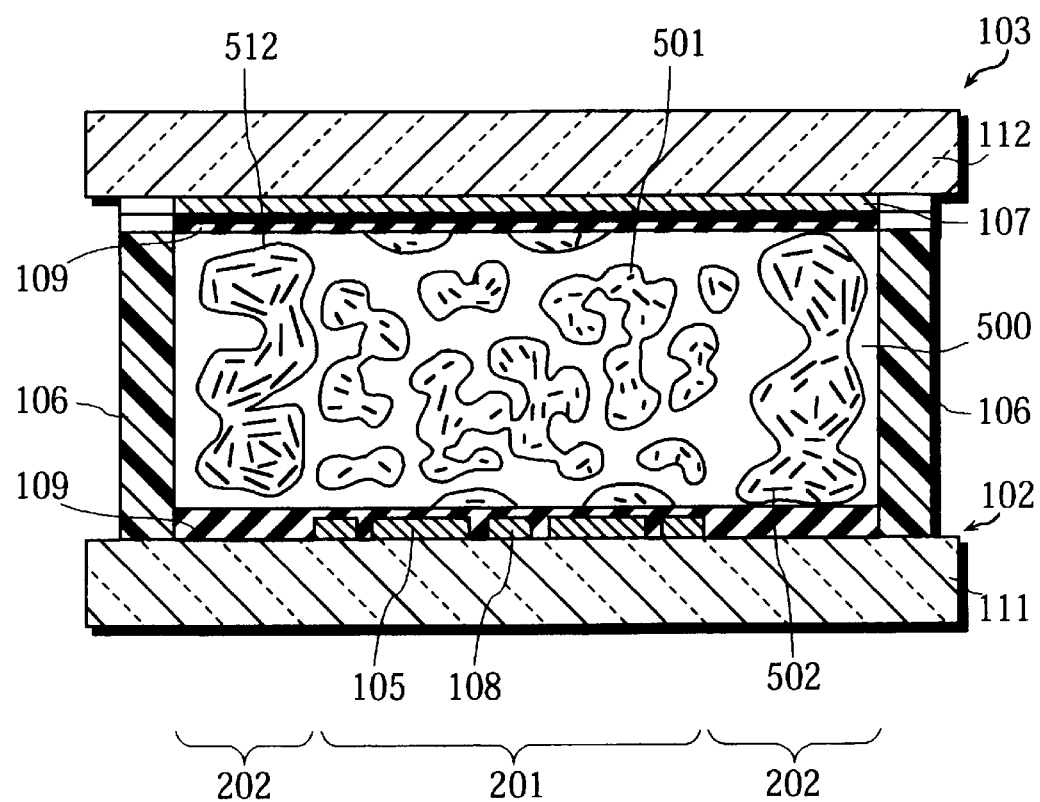
FIG. 13 is a sectional view schematically illustrating the liquid crystal display element of the fifth embodiment of the first inventive group.

The liquid crystal display element according to this embodiment is different in construction from liquid crystal display elements of the $1^{st}$ to $4^{th}$ embodiments in that the liquid crystal droplets in the non-active area have a larger particle size than the liquid crystal droplets in the active area of the polymer liquid crystal composite layer (see FIG. 13).

Figure 14:
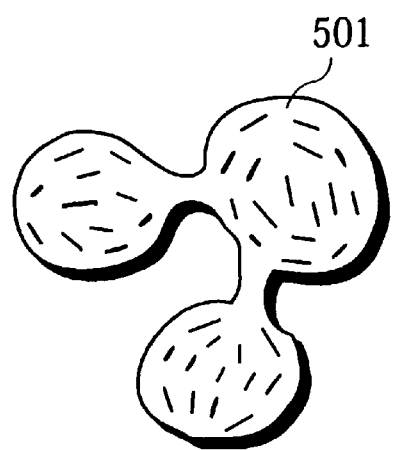
FIG. 14 is an illustration schematically illustrating the form of the liquid crystal droplets in the active area of the liquid crystal display element.
Figure 15:
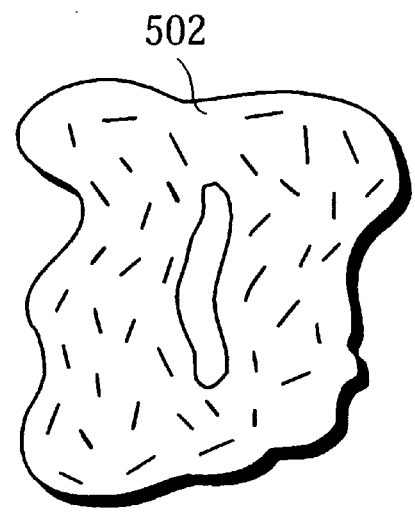
FIG. 15 is an illustration schematically illustrating the form of the liquid crystal droplets in the non-active area of the liquid crystal display element.
Figure 16:
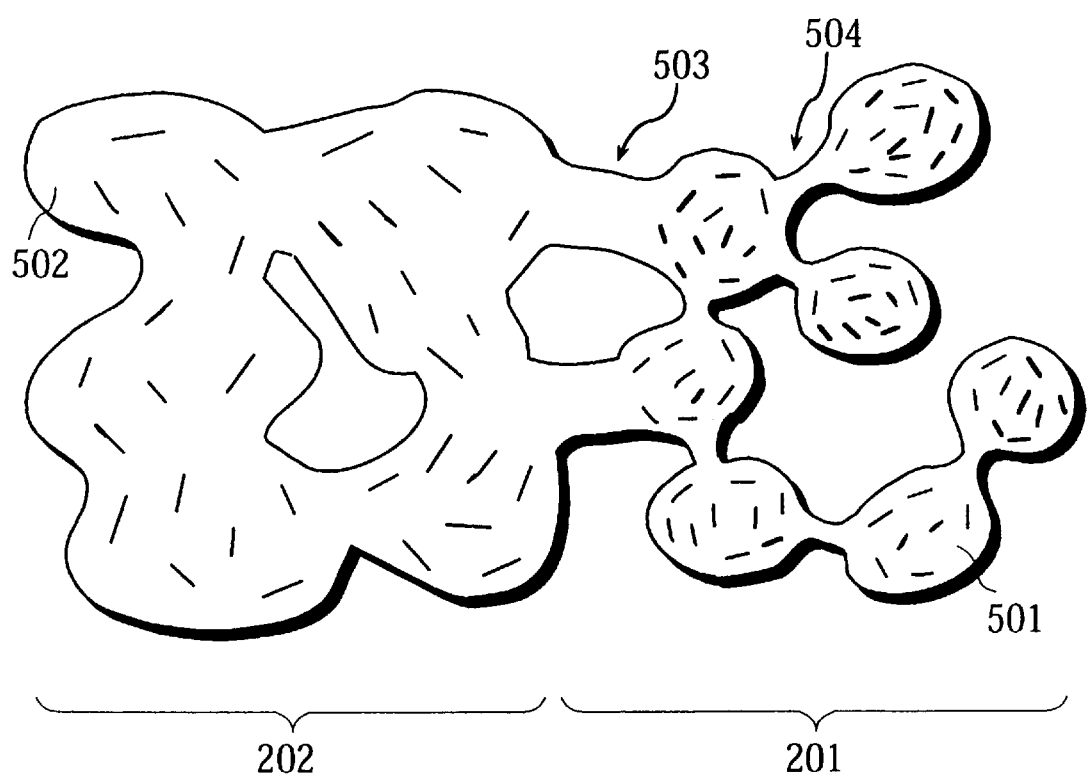
FIG. 16 is a sectional view schematically illustrating the from of the liquid crystal droplets of the liquid crystal display element.

In more detail, as shown in FIGS. 14 and 15, the liquid crystal droplets 501 in the active area 201 exist with their partly connected to each other, while on the other hand, the liquid crystal droplets 502 in the non-active area 202 exist with the greater part thereof being connecting with each other. Thus, the liquid crystal droplets 501 apparently have a smaller particle size than the liquid crystal droplets 502. Also, as shown in FIG. 16, a connecting portion 503 connecting between the liquid crystal droplet 501 and the liquid crystal droplet 502 is larger than a connecting portion 504 connecting with the liquid crystal droplets 501 themselves. This enables a relatively easy flow of the liquid crystal at the connecting portion 503 even when the polymer liquid crystal composite layer 500 expands or contracts, thus enabling the cracks to be prevented from developing in the vicinity of the sealant 106. It is noted that the non-active area 202 is formed in a frame-like form, of which width is not less than 1.0 mm from the inner periphery of the sealant 106.

Thus, even when the liquid crystal expands by heating the liquid crystal display element, the flow of the liquid crystal is not prevented, because the liquid crystal droplets 502 have a large particle size and also have a large connecting portion 503. On the other hand, even when the polymer resin matrix contracts in volume by cooling the liquid crystal panel and thereby the pressure applied from the polymer resin matrix to the liquid crystal increases sharply, the flow of the liquid crystal is not prevented for the same reason as the abovesaid. Accordingly, even when the liquid crystal panel is allowed to stand under high temperature for a long time and thereby the liquid crystal collects in the inside of the panel, after the panel is cooled down to room temperature, the liquid crystal can come to move easily between the liquid crystal droplets to return to the non-active area 202. This enables the prevention of the development of cracks.

Also, as is the case with the first and second embodiments, the liquid crystal droplets 501 in the active area 201 should preferably have the particle size of about 1.2 $\mu$m. On the other hand, if the liquid crystal droplets in the non-active area 202 have the particle size of about 1.2 $\mu$m at which a sufficient gain is achieved, the flow of the liquid crystal is suppressed to cause the cracks to develop easily. In addition, the area in the vicinity of the sealant 106 is not included in the active area 201. Consequently, the liquid crystal droplets 502 need not necessarily have the optimal particle size. When viewed from the foregoing, the particle sizes of the liquid crystal droplets 502 or the intervals of the network in the area in the vicinity of the sealant 106 should advantageously be made larger than those in the active area 201 in that the cracks can be prevented from developing in the vicinity of the sealant 106, with contrast being maintained unchanged.

The polymer liquid crystal composite layer 500, which is a major component of the liquid crystal display element according to this embodiment, can be formed by the method mentioned below.

Figure 17A:
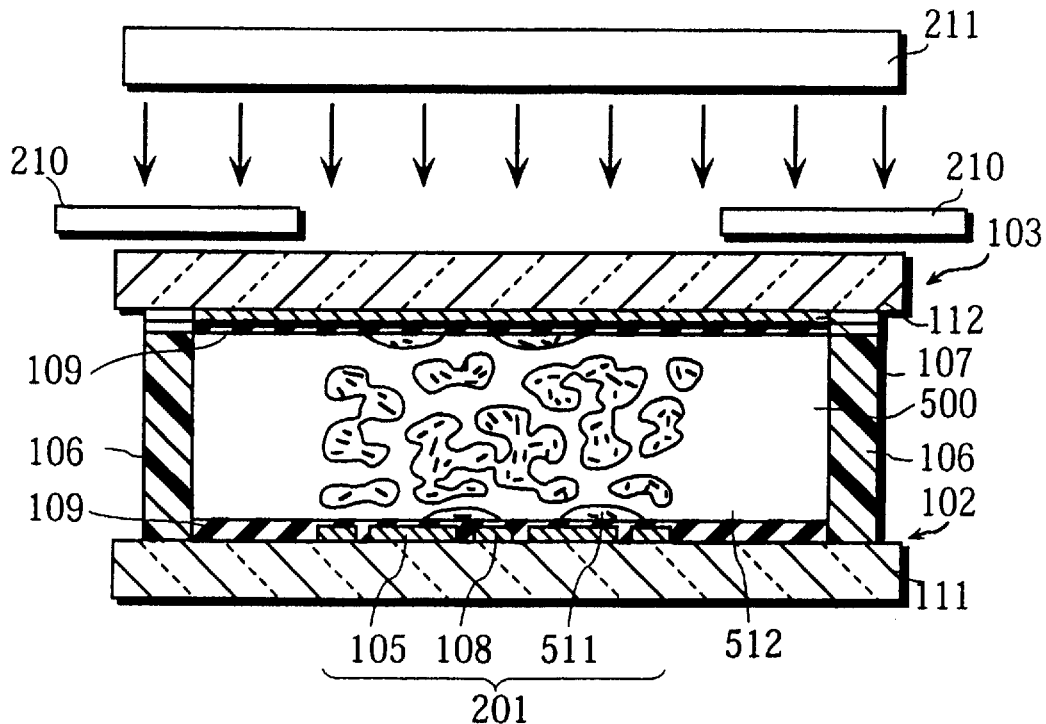
FIG. 17(a) is a sectional view illustrating the step of forming the active area in the polymer liquid crystal composite layer.
Figure 17B:
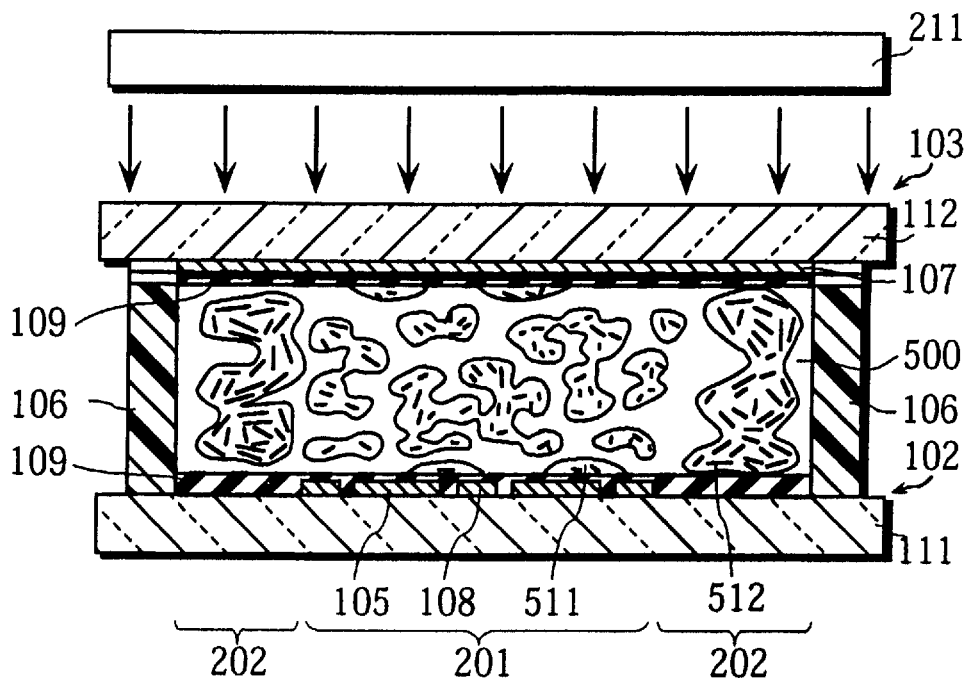
FIG. 17(b) is a sectional view illustrating the step of forming the non-active area in the polymer liquid crystal composite layer.

FIG. 17 is a sectional view for illustrating the method for producing the liquid crystal display element described above. First, the TFT substrate 102 and the opposite substrate 103, pre-forming thereon the pixel electrodes 105 and the counter electrodes 107, respectively, are bonded together through the sealant 106. Further, the liquid crystal polymer mixture whose major materials are uncured resin monomer, such as ultraviolet curable resin, and liquid crystal materials is filled in a space between the TFT substrate 102 and the opposite substrate 103. Sequentially, the liquid crystal polymer mixture is irradiated with ultraviolet in such a manner as to provide different degrees of progress of phase separation between the active area 201 and the non-active area 202.

Specifically, the first ultraviolet is applied to the active area 201, and the second ultraviolet having a smaller irradiation intensity than the first ultraviolet is applied to the non-active area 202. This enables the degree of progress of phase separation in the active area 201 to increase, and as such can allow the particle size of the liquid crystal droplets 502 to decrease. On the other hand, the degree of progress of phase separation in the non-active area 202 is slower than in the active area 201, and as such can allow the particle size of the liquid crystal droplets 501 to increase. The polymer liquid crystal composite layer 500 is produced in the manner as described above. It is noted that the width of the non-active area 202 is set to be 1.0 mm in view of the effects of the light curving from the back to the side during the irradiation of ultraviolet, for example, and it is difficult to make the area of the non-active area 202 smaller than that.

It is noted that according to the second embodiment, the entire liquid crystal panel was irradiated with the second ultraviolet after removal of the ultraviolet reflectors 210 from the panel, but instead of this, the liquid crystal panel may be irradiated with the ultraviolet, with the area irradiated with the first ultraviolet (corresponding to the display rear 201) being masked with the ultraviolet reflectors 210. This provides the advantageous effect of suppressing the decomposition of the liquid crystal and others in the active area 201 caused by the ultraviolet during the irradiation of the second ultraviolet.

Also, although the ultraviolet reflectors for reflecting ultraviolet were used as the ultraviolet shielding means, any ultraviolet shielding means may be used without limiting to them, as long as they have the effects of shielding from ultraviolet. In other words, any type of ultraviolet shielding means may be used without limitation to absorption type or reflection type. However, in the case of the absorption type ultraviolet shielding means, the polymerization temperature must be controlled more carefully than in the case of the reflection type one, because temperature rises during the irradiation of ultraviolet.

Further, at the time of irradiation of ultraviolet, the shielding means may be disposed on the top and bottom sides of the liquid crystal panel such that their relative positions can be in alignment with each other. Further, the lateral sides of the liquid crystal panel may be shielded from light by use of light-shielding tapes and equivalent. This enables the wraparound light curving from the back to be shielded, thus permitting the phase separation between the liquid crystal and polymer compound to progress uniformly, to thereby produce the liquid crystal panel including the liquid crystal droplets having uniform particle sizes.

EXAMPLE 5

The liquid crystal display element according to Example 5 corresponds to the fifth embodiment. The liquid crystal display element described above was produced in the method discussed below. First, as is the case with Example 2, the pixel electrodes 105, the source lines 108 and the insulating film 109 were formed on the lower substrate 111, to form the TFT substrate 102. On the other hand, the counter electrodes 107 and the insulating film 109 were formed on the upper substrate 112 in the same manner as in the above, to from the opposite substrate 103. Sequentially, the sealant 106 was printed on the TFT substrate 102 in such a manner as to take the form of a frame-like pattern, and thereafter the TFT substrate 102 and the opposite substrate 103 were bonded together.

Further, as is the case with Example 2, after the non-active area 202 in the vicinity of the sealant 106 and the sealant 106 were shielded by the ultraviolet reflectors 210, 210, the liquid crystal panel was irradiated with the first ultraviolet with the irradiation intensity of 100 mW/cm$^2$ for 60 seconds from the opposite substrate 103 side, with its surface temperature being kept at 19° C. Then, the polymer precursor in the area except the areas shielded by the ultraviolet reflectors 210, 210 was polymerized to cause a phase separation into the liquid crystal and the polymer resin matrix. As a result of this, the liquid crystal droplets in the active area 201 took the form of being partly connected to each other. It is noted that the temperature of the liquid crystal panel (polymerization temperature) was so set that the surface temperature of the panel could be 19° C. by means of a circulating thermostatic chamber.

Then, the ultraviolet reflectors 210, 210 were removed from the panel, and then the entire panel was irradiated with the second ultraviolet for 240 seconds. The irradiation intensity of the second ultraviolet was set to be 10 mW/cm$^2$. This reduced irradiation intensity of ultraviolet causes the phase separation between the liquid crystal and the polymer compound to be suppressed, and accordingly the degree of polymerization of polymer is reduced. Therefore, the liquid crystal droplets 502 in the non-active area 202 have a larger particle size than the liquid crystal droplets 501 in the active area 201 and exist in the form of the greater part thereof being connected to each other. On the other hand, in the active area 201, the liquid crystal droplets 501 having a smaller particle size than the liquid crystal droplets 502 exist in the form of a part thereof being contacting with and continuing to each other.

The structure of the liquid crystal droplets 501, 502 was confirmed by the following manner. After a pair of glass substrates were bonded together through the sealant, liquid crystal polymer mixed solution comprising the same composition as the above was filled in between the substrates and polymerized in the same polymerization conditions, to thereby produce the liquid crystal panel. The liquid crystal panel does not form thereon the TFT and others. Any one of the substrates of the liquid crystal panel thus produced was peeled off, to measure the particle size of the liquid crystal droplets. In more detail, the measurement of the particle size of the liquid crystal droplets was performed by observation under a microscope and determination of a mean value of the particle sizes by use of an image processing apparatus. The observation showed that the liquid crystal droplets had a particle size of 1.2 μm and were in the form of a part thereof being connected to each other. On the other hand, the liquid crystal droplets in the non-active area 202 had a particle size as large as 2 μm and were in the form of the greater part thereof being connected to each other. The percentage of the liquid crystal in the non-active area 202 at that time was 80%.

It was presumed from the foregoing that in the polymer dispersed liquid crystal element according to this Example as well, the liquid crystal droplets 501 in the active area 201 have the structure of a part thereof being connected to each other, and those 502 in the non-active area 202 have the structure of the greater part thereof being connected to each other, as is the case with the above described structure.

Sequentially, the liquid crystal panel thus produced was put in the oven to be annealed at the conditions of 80° C. and 10 hours. Thereafter, the panel was cooled down to room temperature and was observed with a microscope on the state of the crack developing in the polymer resin matrix. It was then confirmed that no cracks were developed in the polymer resin matrix in the vicinity of the sealant 106, while also no display unevenness was generated in the active area 201.

The inventors discovered that as the irradiation intensity of ultraviolet decreases, the rate of polymerization decreases and the particle size of the liquid crystal droplets increases. If the second ultraviolet with which the non-active area 202 is irradiated is smaller in irradiation intensity than the first ultraviolet with which the active area 201 is irradiated, that will cause the liquid crystal droplets in the vicinity of the sealant 106 to have a larger particle size than the liquid crystal droplets in the active area 201. As a result of this, the structure described above can be obtained. With the irradiation intensity of the first and second ultraviolet being varied, the degree of display unevenness caused by the cracks, the gain in the active area 201 and the particle size of the liquid crystal droplets were checked. The results are shown in TABLES 2 and 3 given below. The evaluation criteria shown in TABLE 2 are expressed as follows: ⊙: Contrast ratio of 250; ○: Contrast ratio of 100; Δ: Contrast ratio of 80; and X: Contrast ratio of 30. Shown in FIG. 3 are the results obtained when the irradiation intensity of the first ultraviolet was changed to 10, 20, 50, 70, 100, 200, 300 and 400 with respect to the irradiation intensity of the second ultraviolet.

TABLE 2

| | Irradiation Intensity of 1$^{st}$ Ultraviolet (mW/cm$^2$) | | | | | | | |
|---|---|---|---|---|---|---|---|---|
| | 10 | 20 | 50 | 70 | 100 | 200 | 300 | 400 |
| Particle size (μm) | 2.0 | 1.8 | 1.4 | 1.3 | 1.2 | 1.1 | 1.0 | 0.8 |
| Gain G | 8.0 | 5.2 | 2.4 | 2.2 | 1.3 | 1.4 | 1.5 | 1.7 |
| Evaluation | X | X | Δ | ○ | ⊙ | ⊙ | ○ | ○ |

Note:
⊙: Contrast ratio of 250;
○: Contrast ratio of 100;
Δ: Contrast ratio of 80; and
X: Contrast ratio of 30.

TABLE 3

| | Irradiation Intensity of 2$^{nd}$ Ultraviolet (mW/cm$^2$) | | | | | | | |
|---|---|---|---|---|---|---|---|---|
| | 10 | 20 | 50 | 70 | 100 | 200 | 300 | 400 |
| Particle size (μm) | 2.0 | 1.8 | 1.4 | 1.3 | 1.2 | 1.1 | 1.0 | 0.8 |
| Degree of display unevenness | ⊙ | ○ | X | X | X | X | X | X |

Note:
⊙: No cracks develop in the pixels;
○: Cracks develop partially in some pixels around the active area;
Δ: Cracks developed in all of some pixels around the active area; and
X: Cracks develop in concentration in some more pixels from around the active area to the inside thereof.

The contrast ratio of the liquid crystal panel of 100 or more requires the gain G of not more than 2.5. Accordingly, from the viewpoint of the gain, the irradiation intensity of the first ultraviolet with which the active area 201 is irradiated should preferably be in the range of 50 mW/cm$^2$ to 400 mW/cm$^2$, which corresponds to the range of 0.8 μm to 1.4 μm, when expressed by the particle size of the liquid crystal droplets. On the other hand, in the non-active area 202 in the vicinity of the sealant 106, the liquid crystal droplets are required to be easily flowable even in the cooling in the reliability test, in order to eliminate the display unevenness in the active area 201. Accordingly, from the results of TABLE 3, the particle size of the liquid crystal droplets existing in the vicinity of the sealant 106 should preferably be 1.8 μm or more, which corresponds to 20 mW/cm$^2$ or less, when expressed by the irradiation intensity of the second ultraviolet.

(2) Embodiments of the 2$^{nd}$ Inventive Group

Next, the second inventive group of the present invention will be described below with reference to the accompanying drawings.

Sixth Embodiment

The description on the sixth embodiment of the invention will be given below with reference to FIGS. 18 to 24. Some parts unnecessary for the description are omitted from the drawings, and for the sake of simplicity, some parts are depicted with enlarged or contracted. The same is applied to the following drawings.

Figure 18:
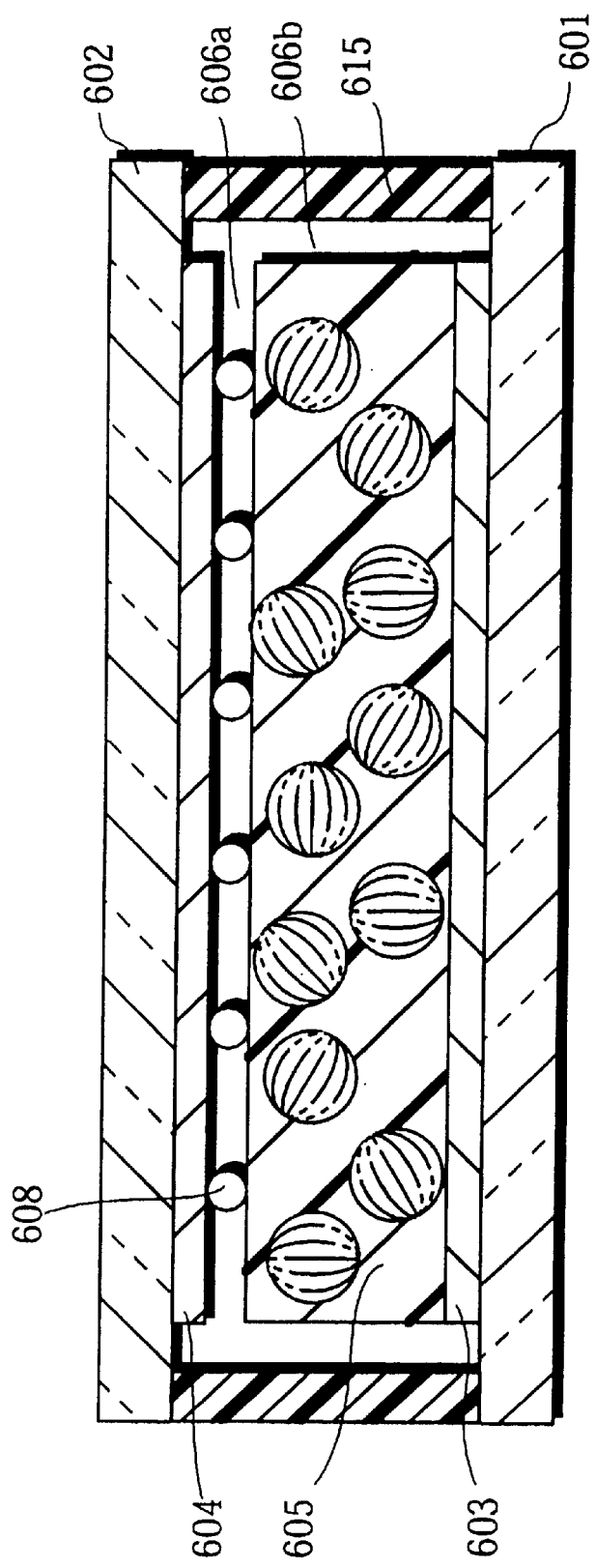
FIG. 18 is a sectional view showing the construction of the liquid crystal display element of the sixth embodiment of the second inventive group.
Figure 19:
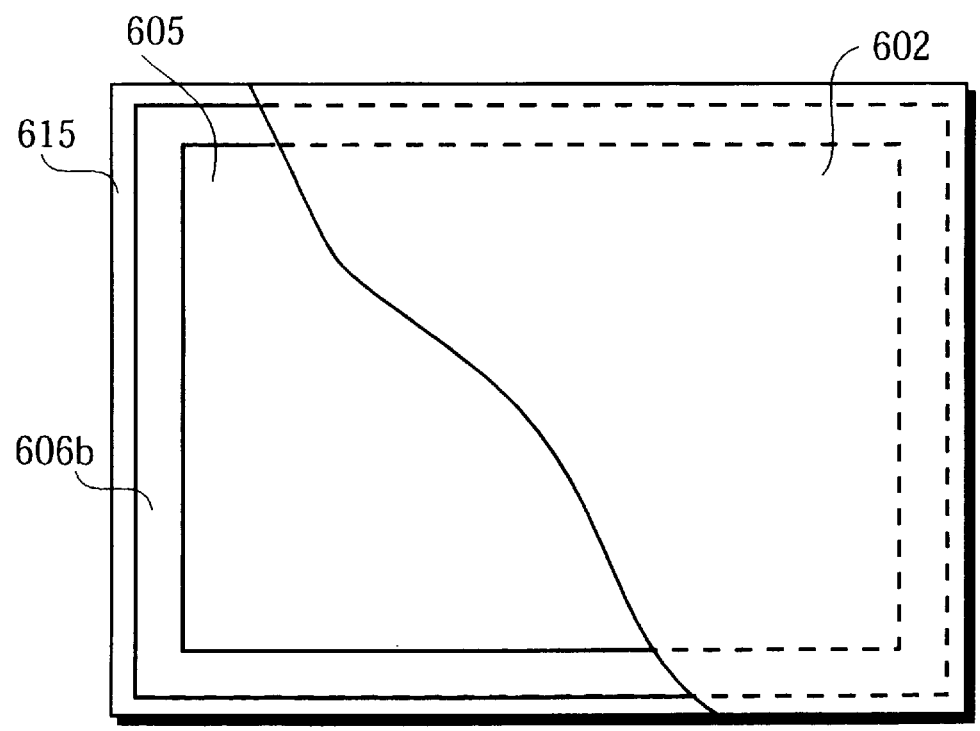
FIG. 19 is a plan view showing the construction of the liquid crystal display element.

FIG. 18 a sectional view of an essential part of the liquid crystal display element of the type according to this embodiment of the invention. The liquid crystal display element includes a TFT (Thin Film Transistor) substrate 601 as a first substrate, an opposite substrate 602 as a second substrate confronting the FFT substrate 601 and a polymer liquid crystal composite layer 605 interposed between the TFT substrate and the opposite substrate 602. TFT (not shown) as switching elements and display electrodes 603 electrically connected with the TFT are formed on the inner surface of the TFT substrate 601. A sealing material layer 615 for bonding the TFT substrate 601 and the opposite substrate 602 together is formed in the frame-like form around a marginal portion of the liquid crystal display element. On the other hand, formed on the inner surface of the opposite substrate 602 are counter electrodes 604 as second display electrodes. Further, a gap layer 606a is formed between the counter electrodes 604 and the polymer liquid crystal composite layer 605. An area of the gap layer 606a in the surface of the substrate extends over the entire surface of the substrate except a sealing material layer 615. In other words, the gap layer 606a is arranged to extend over the whole area including the active area corresponding to a display screen. The active area corresponds to an area in the surface of the substrate in which a TFT array is formed. Further, as shown in FIG. 19, a side gap layer 606b of the frame-like form is formed between the inner periphery of the sealing material layer 615 and the outer periphery of the polymer liquid crystal composite layer 605. Also, spacers 608 serving as supporting members are dispersed in the gap layer 606a to provide a given interval.

The TFT substrate 601 and the opposite substrate 602 are transparent substrates made of, for example, glasses and quarts. In addition, the display electrodes 603 and the counter electrodes 604 are transparent conductive layers made of Indium Tin Oxide (ITO), for example.

The polymer liquid crystal composite layer 605 has the structure that the liquid crystal droplets are dispersed in the matrix phase of polymer compound. This existence form of the liquid crystal droplets is not of restrictive. For example, it may take the form of the liquid crystal droplets being partly connected with and continuing to each other. Alternatively, it may take the form of the liquid crystal being dispersed with their being held in the network of the polymer compound formed into a three dimensional network form.

Various kinds of liquid crystals that exhibit a liquid crystal state at around ordinary room temperature, such as nematic liquid crystal, cholesteric liquid crystal and smectic liquid crystal, may be adopted as the liquid crystal. These liquid crystals may be used singly or in combination of two or more kinds. Further, no particular limitation is imposed on the polymer compounds. Any kinds of known polymer compounds may be used, as long as they have light permeability.

The gap layer 606a and the side gap layer 606b, which are major components of the liquid crystal display element according to this embodiment, are a fluidized layer fomred of air and the like. The air should preferably be low in humidity because it provides little contamination in the liquid crystal display element. In this embodiment, the air may be replaced with other gasses such as nitrogen and argon.

Figure 20:
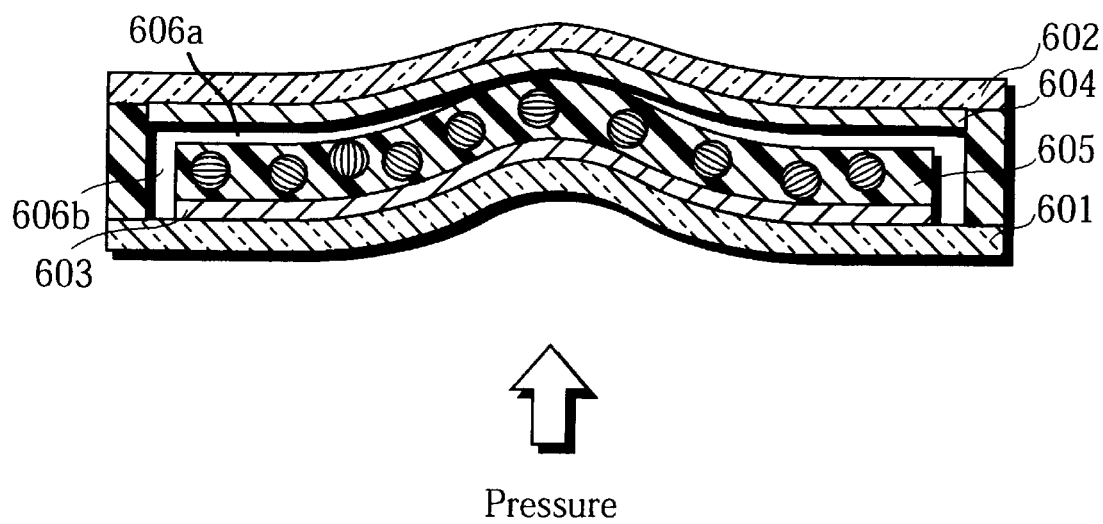
FIG. 20 is a sectional view showing the state of the liquid crystal display element when pressed.

The gap layer 606a thus formed can provide the additional function of preventing generation of shearing stress caused by deflection. For example, when pressed from the outside of the bottom of the TFT substrate 601, the liquid crystal display element deflects, as shown in FIG. 20. However, since the gap layer 606a is formed at one side of the polymer liquid crystal composite layer 605 to avoid the contact between the opposite substrate 602 and the polymer liquid crystal composite layer 605, generation of shearing stress can be prevented. Therefore, even when the liquid crystal display element deflects, no area different in light scattering are produced, so that the display unevenness in the display screen is reduced.

Although the gap layer 606a is formed in the whole area including the active area in the example described above, the gap layer 606a may alternatively be formed in the active area only. With this arrangement, even when a pressing force acts on an area within the active area from outside, the shearing stress is not produced in that area, so no display unevenness is generated. On the other hand, the shearing stress may possibly be caused at the outside of the active area, but even if the shearing stress is caused thereat, since no display unevenness is generated within the active area, that presents no problem for the liquid crystal display element. Thus, development of the different light scattering area caused by the action of shearing stress is suppressed at least in the active area, so that the display unevenness in the display screen is reduced.

The side gap layer 606b is formed into the frame-like form between the inner periphery of the sealing material layer 615 and the outer periphery of the polymer liquid crystal composite layer 605. With this arrangement, since no polymer compound and liquid crystal exist in the vicinity of sealing material layer 615 in which the cracks will develop, the development of cracks can be completely prevented even when the reliability test including the heat shock is carried out. Consequently, the stripy display unevenness caused by the cracks can be prevented. Further, the mixture of the sealing material layer 615 with the polymer liquid crystal composite layer 605 can be prevented, which is caused by stain of the sealing material layer 615 caused by deformation, such as a laterally spreading pattern width of formation pattern of the sealing material layer 615. Also, the restrictions on precision for printing the sealing material layer 615 can be relaxed.

Figure 21:
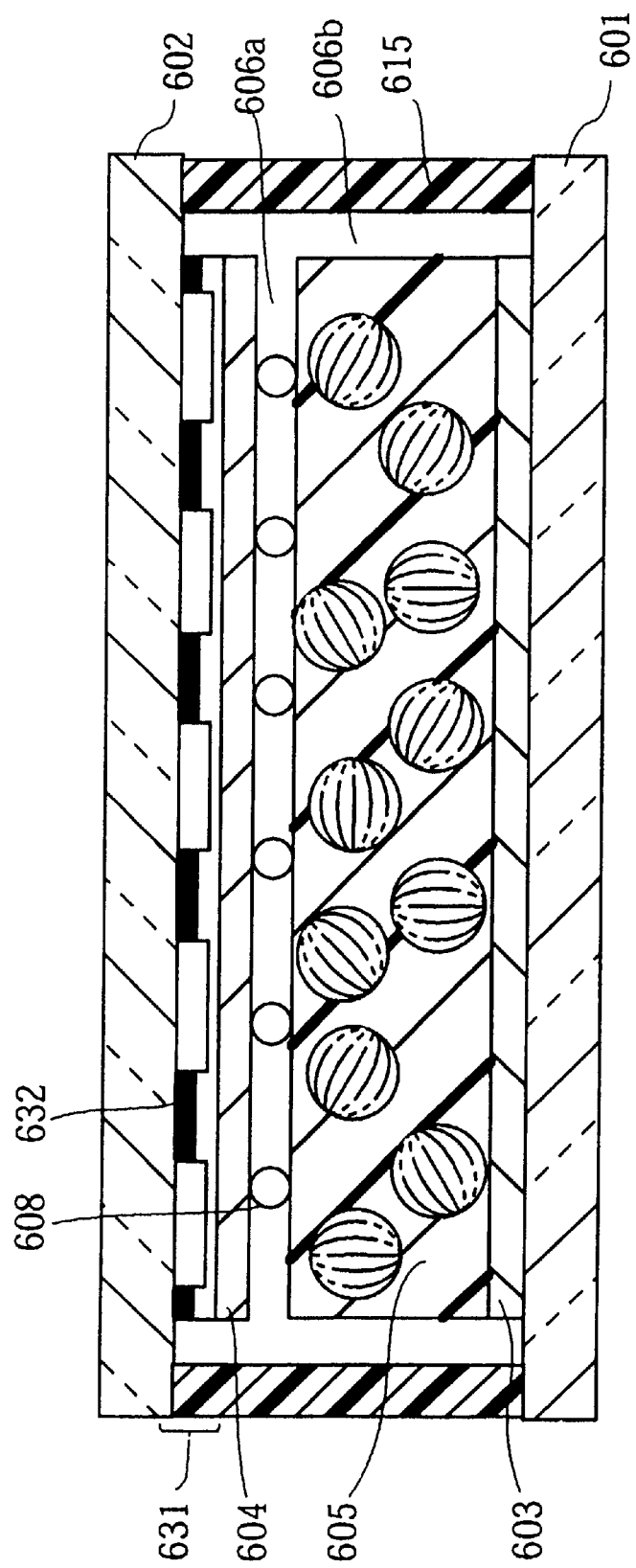
FIG. 21 is a sectional view showing another construction of the liquid crystal display element.

To add a color display capability to the liquid crystal display element according to the invention, a color filter layer 631 may be provided, for example, between the opposite substrate 602 and the counter electrodes 604, as shown in FIG. 21. The color filter layer 631 includes coloring material layers R, G, B, and back matrixes 632. We discovered that the provision of gap layer 606a enables the generation of color mixing among the coloring material layers R, G, B of the color filter layer 631 and the loss of light caused by the black matrixes 632 to be suppressed.

Figure 22:
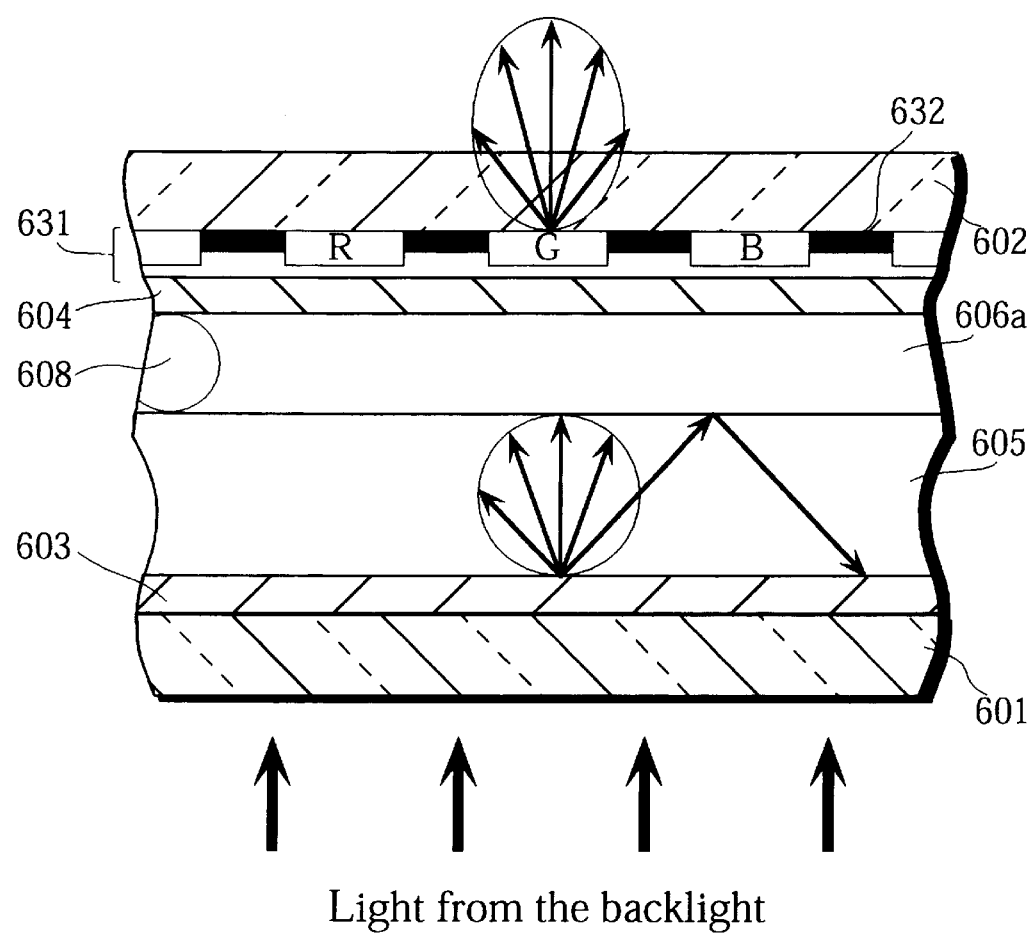
FIG. 22 is a partially sectioned view of the liquid crystal display element, showing the state of light being scattering.

Discussion on this will be given below by paying attention to, for example, the coloring material layer G in the color filter layer 631. As shown in FIG. 22, when light is irradiated from the TFT substrate 601 side via a back light and equivalent, the incident light is scattered when the light is incident on the polymer liquid crystal composite layer 605. Where the relationship between the index of refraction $n_g$ of the opposite substrate 602 and the index of refraction $n_{air}$ of air is $n_g > n_{air}$, the relationship between the index of refraction $n_p$ of the polymer liquid crystal composite layer 605 and the index of refraction $n_x$ of the gap layer 606a is set as:

$$n_p > n_x \qquad (1).$$

Further, the relationship between the index of refraction $n_g$ of the TFT substrate 601 and the index of refraction $n_x$ of the gap layer 606a is set as:

$$n_g > n_x \qquad (2).$$

In this case, as apparent from the above expression (1), a part of scattered light, scattered when the light is incident on the polymer liquid crystal composite layer 605, is totally reflected at the boundary between the polymer liquid crystal composite layer 605 and the gap layer 606a. It is noted that the term "a part of scattered light totally reflected at the boundary" is intended to include the light that may possibly be totally reflected at the boundary between the opposite substrate 602 and the air and thereby be indirectly incident on a neighboring coloring material layer B and the light that is absorbed in the black matrixes 632. Thus, by virtue of the formed gap layer 606a in combination with the polymer liquid crystal display layer 605, the gap layer 606a and the TFT substrate 601 made of materials having an index of refraction that satisfies the relationships of the above expressions (1) and (2), a part of the scattered light which may cause the color mixture can be eliminated in advance before it reaches the color filter layer 631 and also the light absorbed in the black matrixes 632 can be reduced. As a result of this, the generation of color mixture can be reduced and an utilization efficiency of light can be enhanced to brighten the display screen.

Figure 23:
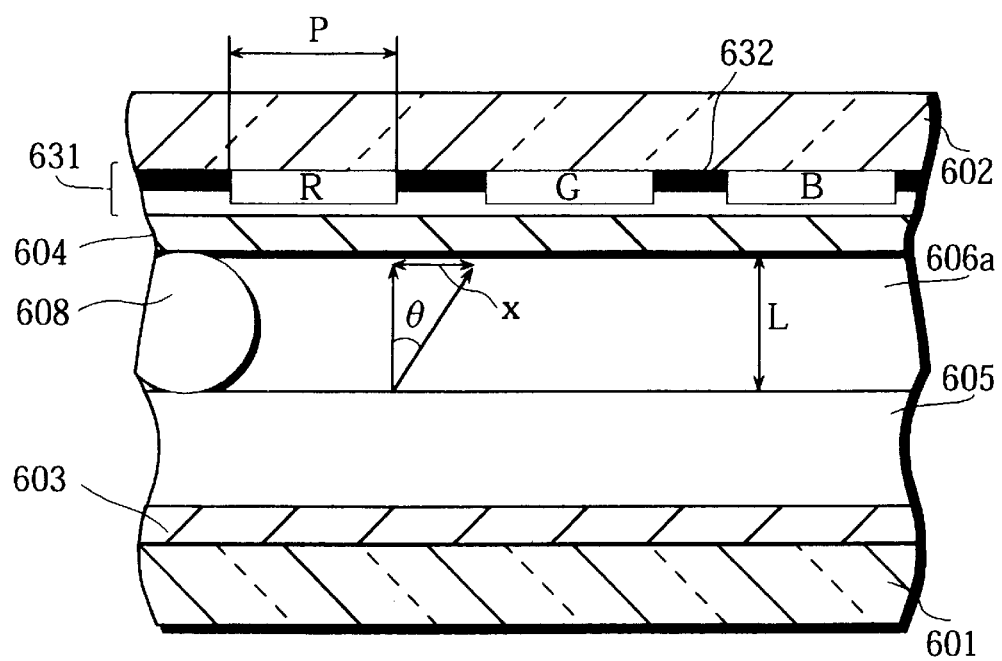
FIG. 23 is a partially sectioned view showing a gap of the gap layer of the liquid crystal display element.

Incidentally, the gap in the gap layer 606a must be properly set under consideration of the relationship with the pitches of the coloring material layers R, G, B of the color filter layer 631. Specifically, as shown in FIG. 23, where the pitch of each of the coloring material layers R, G, B is P($\mu$m) and the width of each of the black matrixes 632 is d($\mu$m), an aperture ratio Op(%) is expressed as:

$$Op(\%) = 100 \times (P-d)^2/P^2 \qquad (3)$$

To set the aperture ratio at, for example, 40% or more, it follows:

$$Op(\%) = 100 \times (P-d)^2/P^2 \geq 40 \qquad (4)$$

Therefore, the relationship between P and d is expressed as:

$$d \leq P\{1-(0.4)^{1/2}\} \qquad (5)$$

On the other hand, as shown in FIG. 23, where θ is an angle formed between straight light and scattered light when light incident from the TFT substrate 601 side is scattered at the boundary between the polymer liquid crystal composite layer 605 and the gap layer 606a, the relationship between the gap L ($\mu$m) in the gap layer 606a and the distance x ($\mu$m) between the straight light and scattered light arriving at points of the color filter layer 631 is expressed as x=L·tan θ. To prevent the scattered light from being incident on a directly adjacent coloring material layer, it is enough for x to be in the range in which the black matrix 632 is formed. In other words, it is enough to meet the relationship of x≤d.

$$\text{Therefore, } L \cdot \tan \theta \leq d \qquad (6)$$

It follows from the relationship between the above Expressions (5) and (6) that $$L \cdot \tan \theta \leq P\{1-(0.4)^{1/2}\} \qquad (7)$$

Figure 24:
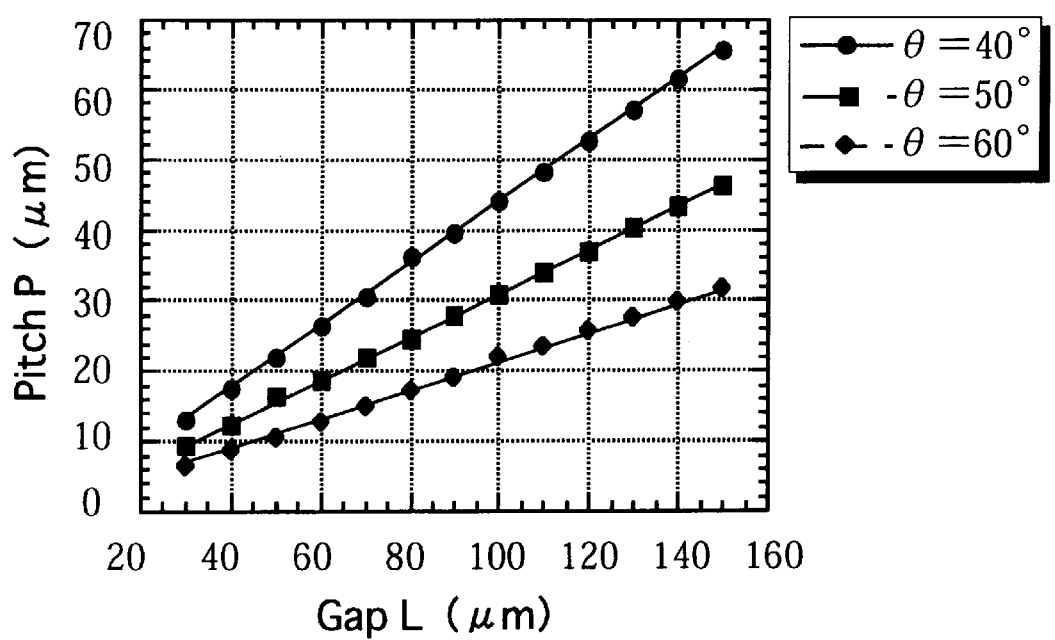
FIG. 24 is a graph showing the relationship between the pitch P of the coloring material layers and the gap L of the gap layer, in the liquid crystal display element.

Therefore, based on the Expression below, $$L \leq P \cdot \{1-(0.4)^{1/2}\}/\tan \theta \qquad (8)$$

the gap L of the gap layer 606a is set. When the gap of the gap layer 606a is set in this manner, a part of light scattered at the boundary between the polymer liquid crystal composite layer 605 and the gap layer 606a can be prevented from being incident on an adjacent coloring material layer. Shown in FIG. 24 is the relationship between the pitch P of the coloring material layers R, G, B and the gap L of the gap layer 606a in the case of the angle θ between the straight light and the scattered light being 40, 50 and 60 degrees. In common notebook PCs, monitors and the like, P is in the range of 80 to 120 $\mu$m, and even in those of highest definition, P is in the level of 30 to 50 $\mu$m. Therefore, for setting the aperture ratio at 40% or more, the gap L can be set in the range shown in FIG. 24 in accordance with the value P. Although the above description discusses on the case of the aperture ratio of 40% or more, the gap of the gap layer 606a can be relatively arbitrarily set in accordance with a value of the aperture ratio to be set. Accordingly, the same discussion as the above can be applied to the other aperture ratios.

Next, the method for producing the liquid crystal display element according to this embodiment.

Thin film transistors (TFT) were arranged on the TFT substrate 601 in the known manner. Further, the liquid crystal polymer mixture having liquid crystal material and the polymer material as its major materials (e.g. PNM201 (trade name) available from LODIC CO., LTD.) was coated on the TFT substrate 601 by a printing method, to form a liquid crystal mixture layer (not shown). The layer thickness of the liquid crystal polymer mixture layer was set at 10 $\mu$m.

Then, the liquid crystal polymer mixture layer was irradiated with ultraviolet from the light source of the high pressure mercury lamp (available from USHIO INC.), to be polymerized. Thus, the polymer liquid crystal composite layer 605 in which the liquid crystal droplets are dispersed in the polymer compound was formed. The irradiation was performed under conditions of irradiation intensity of 120 mW/cm$^2$ and irradiation time of 15 sec. Further, spherical spacers 8 each having a diameter of 1 μm (silica balls available from CATALYSTS & CHEMICALS IND) were sprayed uniformly on the polymer liquid crystal composite layer 605 so that distribution density can be uniform.

Then, ultraviolet curable sealing material (Wordlock 704 (trade name) available from KYORITSU CHEMICAL & Co., Ltd.) was coated on the TFT substrate 601 around the marginal portion thereof in such a manner as to be formed into the frame-like form. At that time, the ultraviolet curable sealing material was formed so that the ultraviolet curable sealing material and the polymer liquid crystal composite layer 605 could be spaced from each other at a given interval. Thereafter, the opposite substrate 602 on which the counter electrodes 604 and the color filter layer 631 were arranged (available from TOPPAN PRINTING Co., Ltd.) and the TFT substrate 601 were bonded together in the atmosphere so that the polymer liquid crystal composite layer 605 and the counter electrode 604 could confront each other, with being pressed with a pressure of 0.2 Kg/cm$^2$. Further, the ultraviolet curable sealing material was cured by irradiation of ultraviolet. The irradiation was made under conditions of, for example, energy density of 70 mW/cm$^2$ and irradiation time of 30 seconds. Thus, the liquid crystal display element according to Example 1 was produced, in which the gap layer 606$a$ composed of air was formed between the opposite substrate 602 and the polymer liquid crystal composite layer 605.

When a cross section of the liquid crystal panel thus produced was observed with a SEM (Scanning Electron Microscope), the gap layer 606$a$ was found to have been formed. Further, when the liquid crystal display element according to the example was deflected by application of a pressing force, no display unevenness caused by variations in scattering properties of the polymer liquid crystal composite layer 605 was visually confirmed.

Seventh Embodiment

Figure 25:
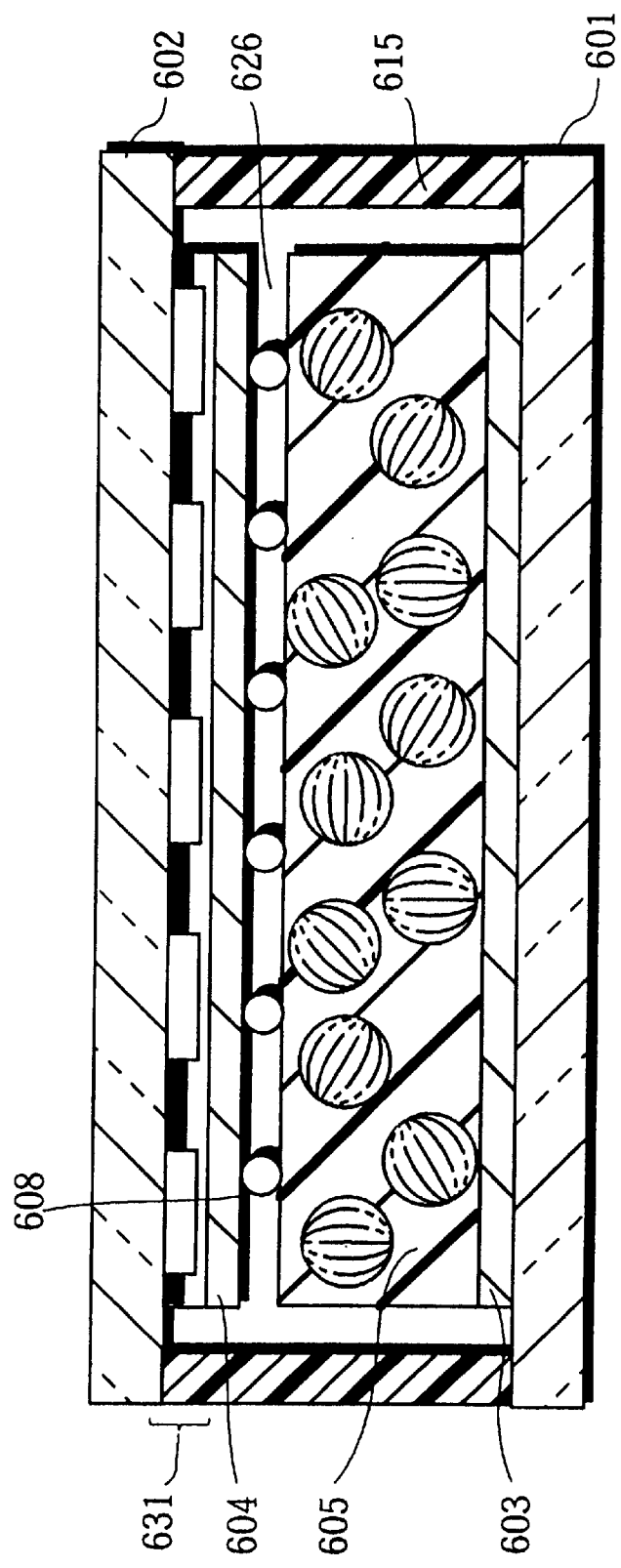
FIG. 25 is a sectional view showing the construction of the liquid crystal display element of the second embodiment of the second inventive group.

The description on the seventh embodiment of the invention will be given below with reference to FIG. 25. Like parts having similar functions to those of the liquid crystal display element of the sixth embodiment are given like reference numerals, and a detailed description thereof will be omitted.

The liquid crystal display element according to this embodiment is different in construction from that of the sixth embodiment in that the gap layer 606$a$ and the side gap layer 606$b$ are each in the form of a vacuum layer 626.

The liquid crystal display element was produced in the same process as in the sixth embodiment, except the process that the TFT substrate 601 and the opposite substrate 602 were bonded together in a vacuum.

When a cross section of the liquid crystal display element of this embodiment was observed with the SEM, the vacuum layer 626 was found to have been formed, although some spacers 608 sank in the polymer liquid crystal composite layer 605 due to the atmospheric pressure. Further, when the liquid crystal display element according to this embodiment was deflected by application of a pressing force, no display unevenness was visually confirmed on the display screen.

Eighth Embodiment

Figure 26:
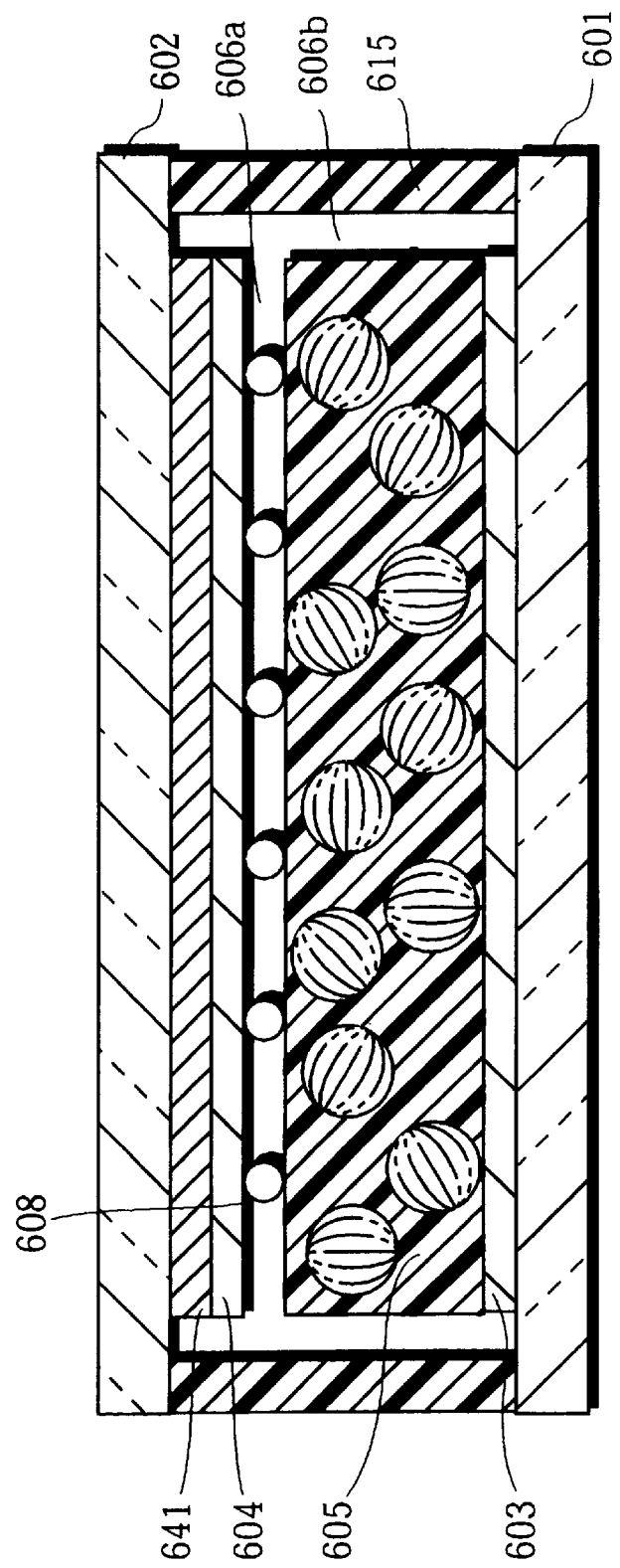
FIG. 26 is a sectional view showing the construction of the liquid crystal display element of the third embodiment of the second inventive group.

The description on the eighth embodiment of the invention will be given below with reference to FIG. 26. Like parts having similar functions to those of the liquid crystal display element of the sixth embodiment are given like reference numerals, and a detailed description thereof will be omitted.

The liquid crystal display element according to this embodiment is different in construction from that of the sixth embodiment in that the color filter layer 631 is replaced with an optical reflecting member 641.

The liquid crystal display element was produced in the same process as in the sixth embodiment, except the process that a metallic coating having light reflectivity, such as aluminum (Al), is formed on the opposite substrate 602. No particular limitation is imposed on the method of forming the optical reflecting member 641. Any suitable known methods may be adopted.

When the liquid crystal display element thus produced was deflected by application of a pressing force, no display unevenness was visually confirmed on the display screen.

Ninth Embodiment

Figure 27:
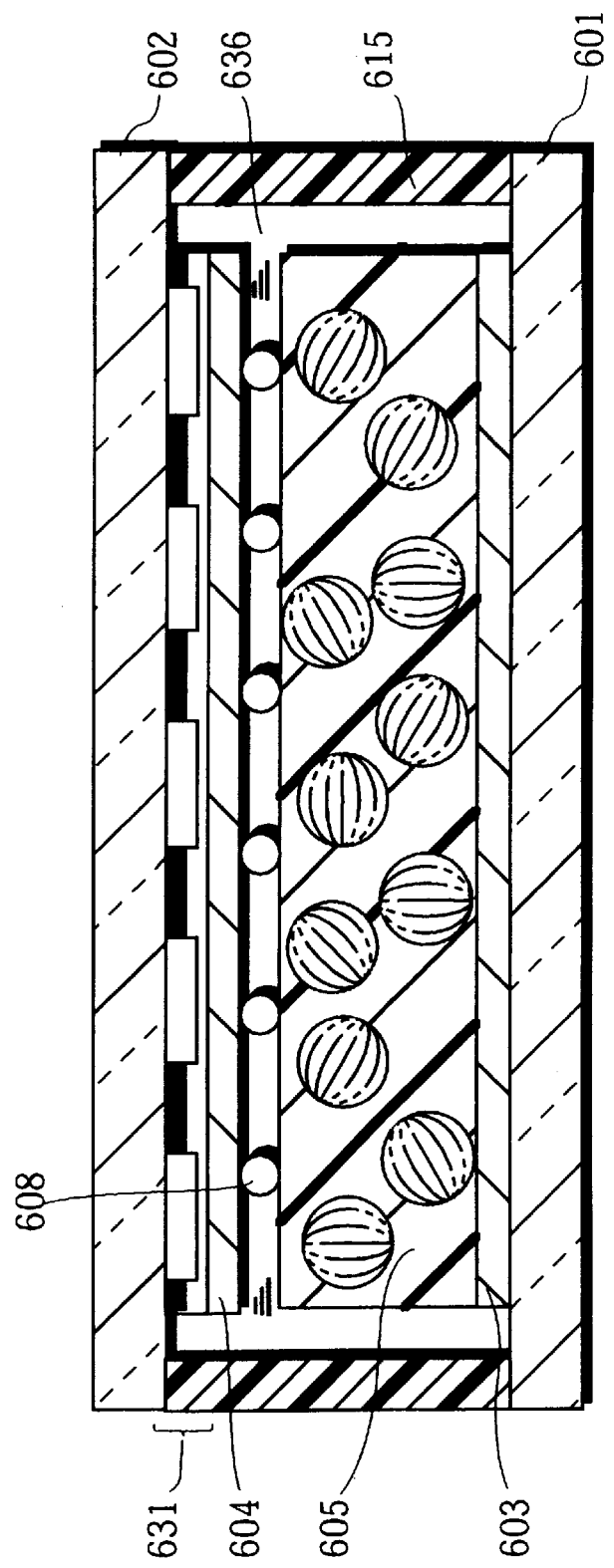
FIG. 27 is a sectional view showing the construction of the liquid crystal display element of the fourth embodiment of the second inventive group.

The description on the ninth embodiment of the invention will be given below with reference to FIG. 27. Like parts having similar functions to those of the liquid crystal display element of the sixth embodiment are given like reference numerals, and a detailed description thereof will be omitted.

The liquid crystal display element according to the ninth embodiment is different in construction from that of the sixth embodiment in that a fluidized layer including liquid crystal is filled in the gap layer 606$a$ and the side gap layer 606$b$, to form a liquid crystal layer 636. No particular limitation is imposed on the liquid crystal materials. Various kinds of known ones may be adopted, as long as they have permeability and flowability.

The liquid crystal display element was produced in the same manner as in the sixth embodiment. However, the ultraviolet curable sealing material was coated on any one of the TFT substrate 601 and the opposite substrate 602 in such a manner as to take the form of a frame-like pattern hollowing a part corresponding to a liquid crystal filling hole. Sequentially, the liquid crystal material (ZLI 2254 (trade name) available from Merck Industrial Chemicals) was filled therein by the vacuum filing method and then the liquid crystal filling hole was sealed, to form the liquid crystal layer 636.

When the liquid crystal display element thus produced was deflected by application of a pressing force, no display unevenness of the polymer liquid crystal composite layer 605 was visually confirmed.

Tenth Embodiment

Figure 28:
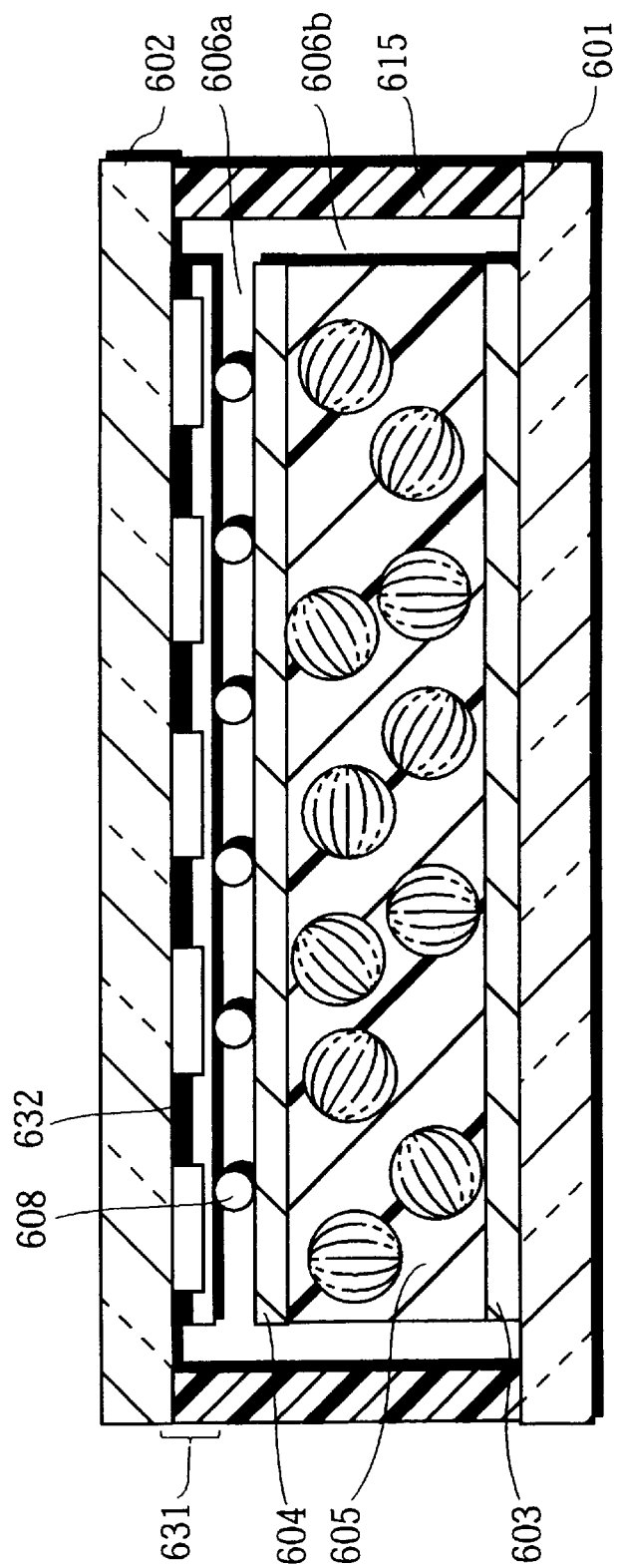
FIG. 28 is a sectional view showing the construction of the liquid crystal display element of the fifth embodiment of the second inventive group.

The description on the tenth embodiment of the invention will be given below with reference to FIG. 28. Like parts having similar functions to those of the liquid crystal display element of the sixth embodiment are given like reference numerals, and a detailed description thereof will be omitted.

The liquid crystal display element according to the tenth embodiment is different in construction from that of the sixth embodiment in that the counter electrodes 604 are formed on the polymer liquid crystal composite layer 605. Also, the inspection for inspecting the state of display was made in the manufacturing process of the liquid crystal display element.

The display electrodes 603 was formed on the TFT substrate 601 in the same manner as in the sixth embodiment and further the polymer liquid crystal composite layer 605 was formed on the display electrodes 603. Sequentially, ITO was evaporated on the polymer liquid crystal composite layer 605 in the sputtering method and thereafter unnecessary parts were removed by the photo lithography method, to produce the counter electrodes 604.

Then, the inspection step for inspecting the state of display of the TFT substrate 601 was carried out before the TFT substrate 601 and the opposite substrate 602 were bonded together. Specifically, the power source was connected with the display electrodes 603 and the counter electrodes 604, and an electric field was applied to the polymer liquid crystal composite layer 605 by the TFT drive. The polymer liquid crystal composite layer 605 became opaque when the voltage was OFF, while on the other hand, became transparent when the voltage was ON, through which the inspection of the operation conditions of the polymer liquid crystal composite layer 605, the TFT and others were inspected. When a TFT substrate 601 was found to have defects, such as dot defects and line defects, only the TFT substrate 601 itself was junked. Thus, the inspection step carried out before the TFT substrate 601 and the opposite substrate 602 are bonded together can eliminate the need for junking the not-defective opposite substrate and others together with the defective TFT substrate 601, when the TFT substrate is found to have defects. As a result of this, reduction of costs and enhancement of yields can be achieved.

Further, as is the case with the sixth embodiment, after the ultraviolet curable sealing material was coated on the TFT substrate 601 around the marginal portion thereof, the TFT substrate 601 and the opposite substrate 602 on which the counter electrodes 604 and the color filter layer 631 were arranged were bonded together in the atmosphere. Sequentially, the ultraviolet curable sealing material was cured by the irradiation of ultraviolet, to produce the liquid crystal display element according to this embodiment.

The inspection step may be carried out in such a manner that instead of the transparent conductive layer being evaporated directly on the polymer liquid crystal composite layer 605, a film on which a transparent conductive layer is evaporated is pressed on the polymer liquid crystal composite layer 605 and then the TFT is driven. In this case, after completion of inspection, the film may be peeled off so that the TFT substrate 601 and the opposite substrate 602 can be bonded together again, with their being spaced from each other at a predetermined interval.

Eleventh Embodiment

The description on the eleventh embodiment of the invention will be given below. Like parts having similar functions to those of the liquid crystal display element of the sixth embodiment are given like reference numerals, and a detailed description thereof will be omitted.

The liquid crystal display element according to this embodiment has a similar construction to the liquid crystal display element according to the sixth embodiment, but was manufactured in the following manner.

The mixture of the liquid crystal polymer mixture having liquid crystal material and the polymer material as its major materials (e.g. PNM201 (trade name) available from LODIC CO., LTD.) and the spherical spacers 608 (particle size of 10 μm) was added dropwise through a syringe on the TFT substrate 601 forming thereon the TFT, display electrodes 603 and others, to form a liquid crystal mixture layer.

Then, a silane coupler as a material having a water-repellent effect (a coupling agent for silane-based polymer compound) was coated on the glass substrate with a spinner and was cured, for a water repellent treatment to the glass substrate. Further, a mask made of Cr (chrome) and others was formed on the glass substrate around a marginal portion thereof in the frame-like form by a sputtering method. It is noted that the materials having a water-repellent effect not limited to the one mentioned above but include, for example, fluorocarbon polymer compound.

Sequentially, the water-repellent treated glass substrate and the TFT substrate 601 on which the liquid crystal polymer mixture was coated were bonded together and were pressed until a specified cell gap was defined therebetween. Further, the liquid crystal polymer mixture was irradiated with ultraviolet from outside to be polymerized, to thereby produce the polymer liquid crystal composite layer 605. The polymer liquid crystal composite layer 605 was then formed in the active area only, because the mask was formed around the marginal portion of the glass substrate. This can ensure areas for the sealing material layer 615 and side gap layer 606b to be formed in a further process. Sequentially, the glass substrate was peeled off, then forming the polymer liquid crystal composite layer 605 having an uniform film thickness on the TFT substrate 601.

Thereafter, as in the case with the sixth embodiment, the ultraviolet curable sealing material was coated around the marginal portion of the TFT substrate 601 so that it could be formed in the frame-like form. Further, the opposite substrate 602 on which the counter electrodes 604 and the color filter layer 631 were arranged and the TFT substrate 601 were bonded together in the atmosphere, with being pressed with a given pressure. Thus, the liquid crystal display element was produced.

When the liquid crystal display element thus produced was deflected by application of a pressing force, no display unevenness was visually confirmed on the display screen.

Other Embodiments

Figure 29:
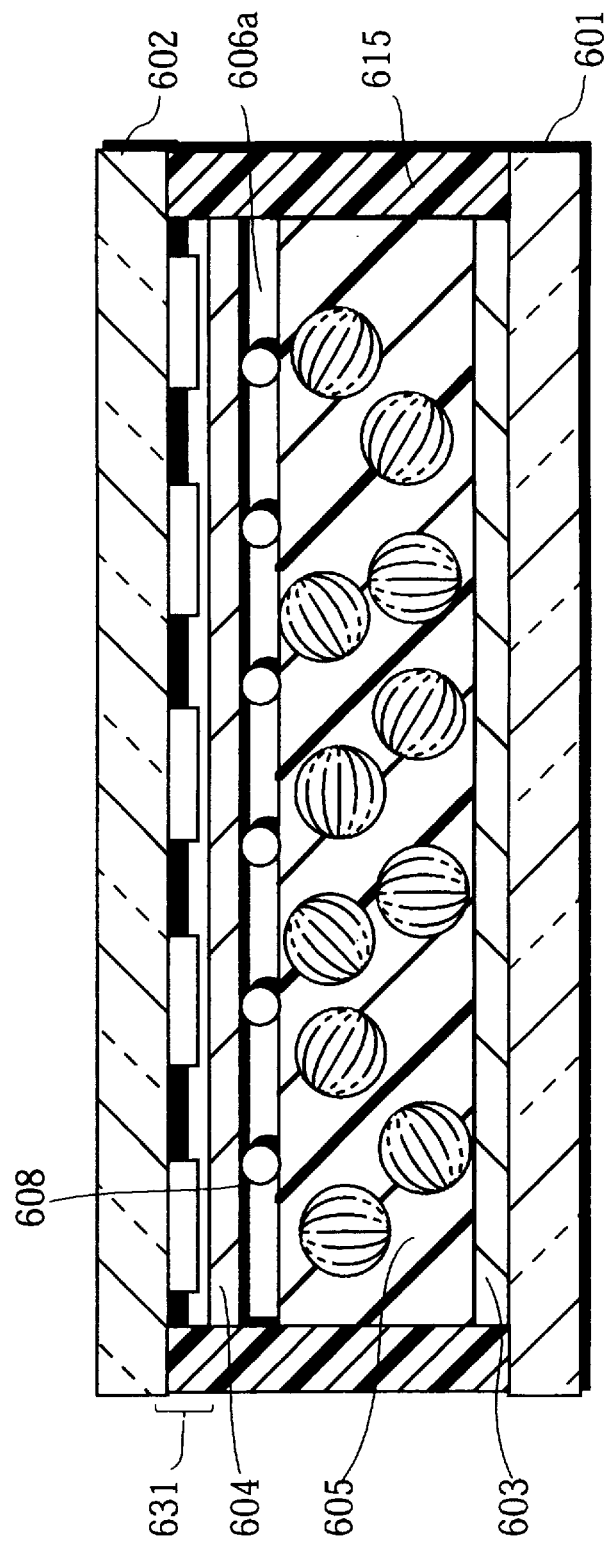
FIG. 29 is a sectional view showing the construction of the liquid crystal display element of another embodiment of the second inventive group.

Although the sixth to eleventh embodiments illustrate the form in which the gap layer 606a is formed between the opposite substrate 602 and the polymer liquid crystal composite layer 605 to extend over the whole surface thereof and the side gap layer 606b is formed in the frame-like form between the inner periphery of the sealing material layer 615 and the outer periphery of the polymer liquid crystal composite layer 605, the present invention is not limited to the illustrated form. To be more specific, for example, the invention may be so embodied, as shown in FIG. 29, that the inner periphery of the sealing material layer 615 contacts with the outer periphery of the polymer liquid crystal composite layer 605 all around their peripheries so that no side gap layer 606b can exist therebetween. Alternatively, the inner periphery of the sealing material layer 615 may contact partly with the outer periphery of the polymer liquid crystal composite layer 605 so that the side gap layer 606b can exist partially around the outer periphery of the polymer liquid crystal composite layer 605.

Figure 30:
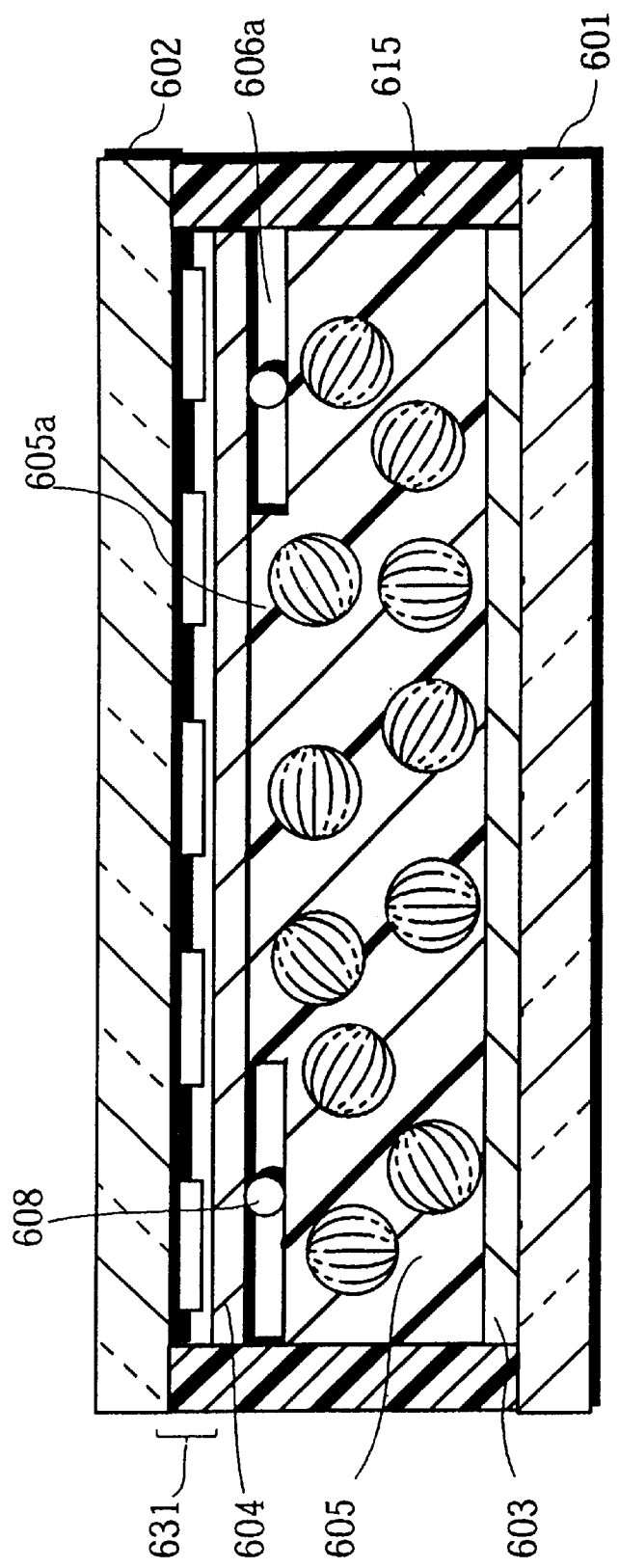
FIG. 30 is a sectional view showing the construction of the liquid crystal display element of a still another embodiment of the second inventive group.
Figure 31A:
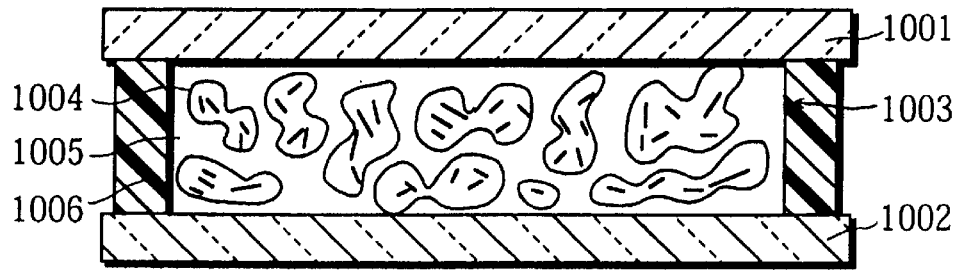
FIG. 31(a) is a sectional view schematically showing the liquid crystal display element.
Figure 31B:
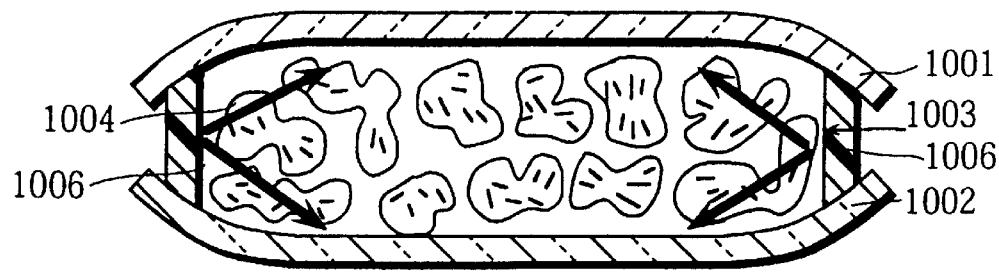
FIG. 31(b) is a sectional view showing the state of the polymer liquid crystal composite layer expanding in volume.
Figure 31C:
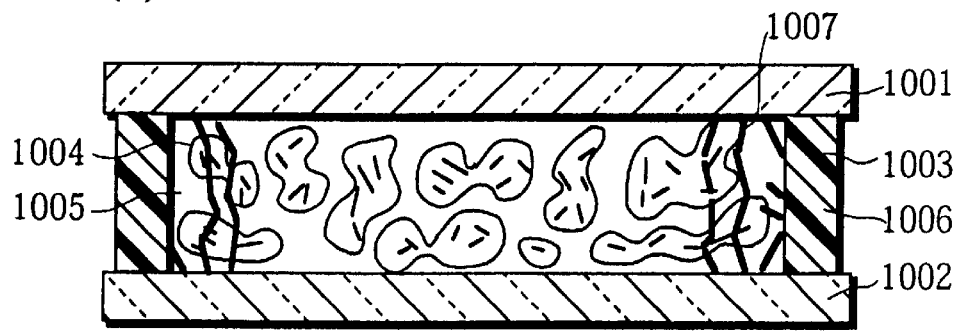
FIG. 31(c) is a sectional view showing the state of the cracks developing in the liquid crystal display element.
Figure 32:
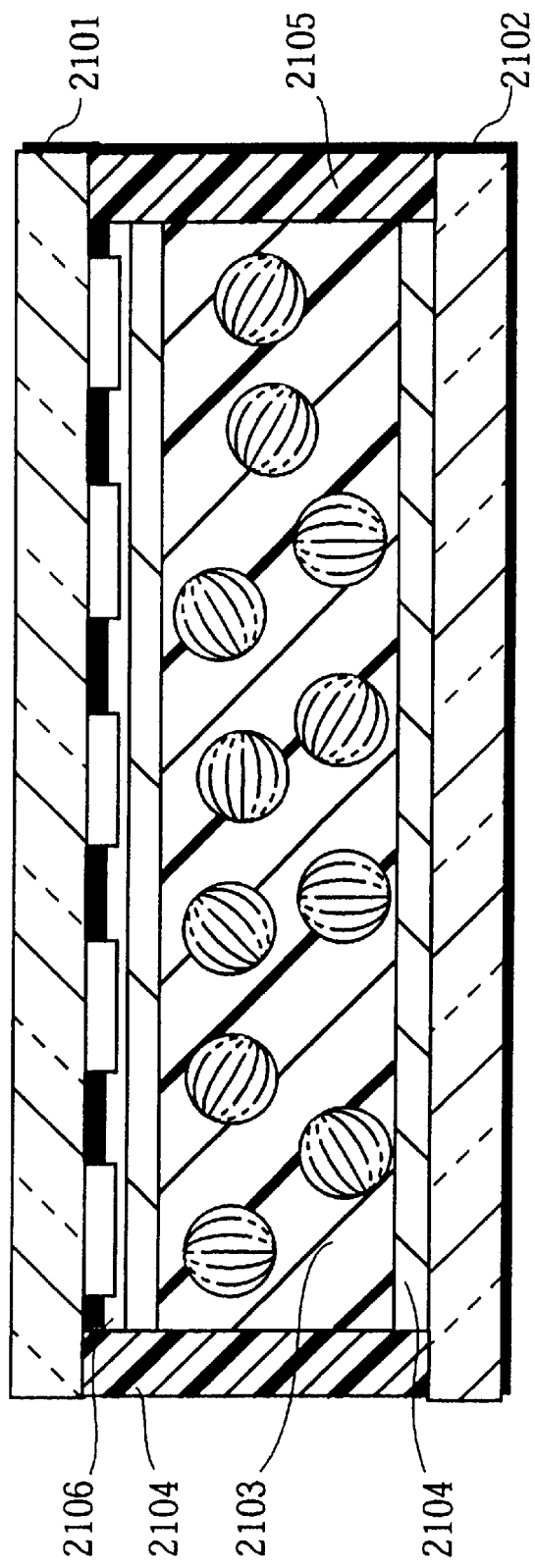
FIG. 32 is a sectional view showing the construction of a conventional type liquid crystal display element.
Figure 33A:
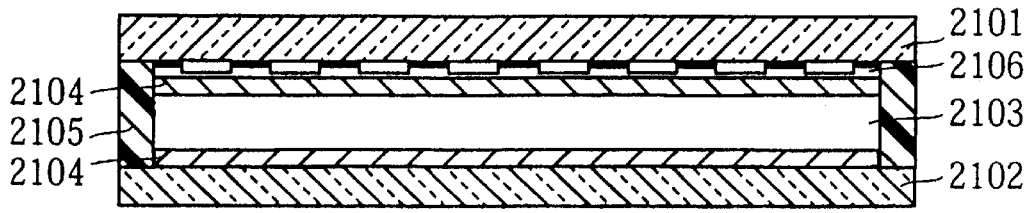
FIG. 33 is an illustration schematically illustrating the display unevenness of the conventional type of liquid crystal display element.
Figure 33B:
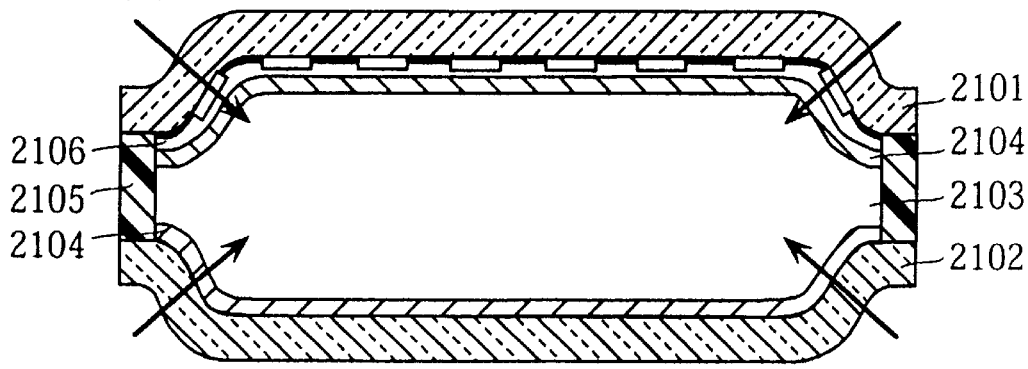
Figure 33C:
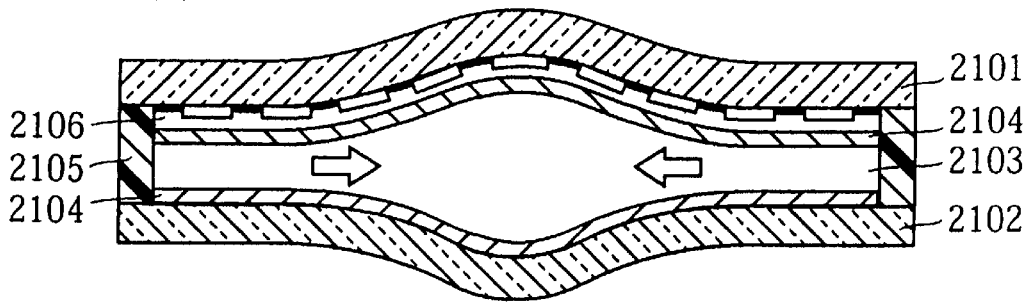
Figure 33D:
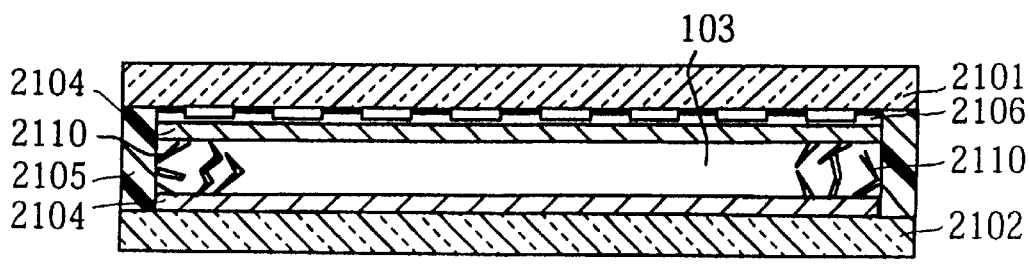
Figure 34:
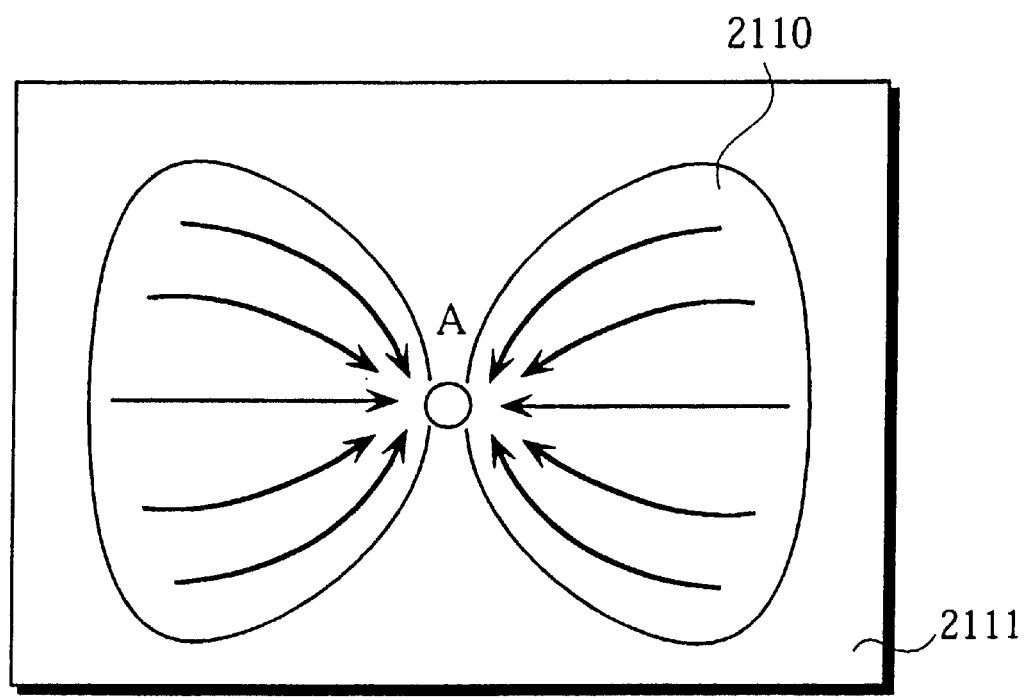
FIG. 34 is a sectional view showing the state of the conventional type of liquid crystal display element when pressed.
Figure 35:
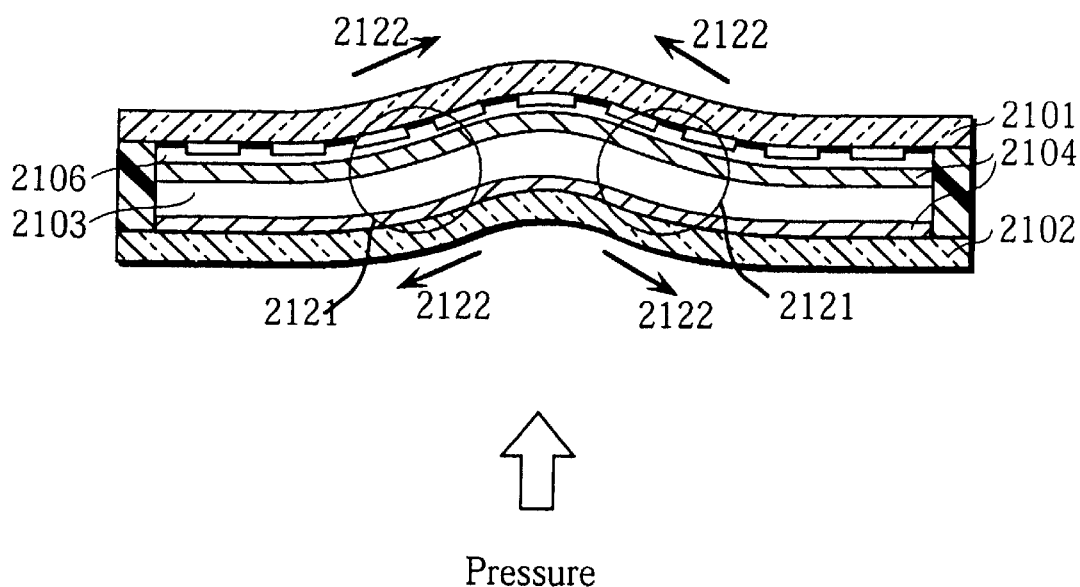
FIG. 35 is an illustration showing the state of the liquid crystal droplets being deformed when the conventional type liquid crystal display element is pressed.
Figure 36B:
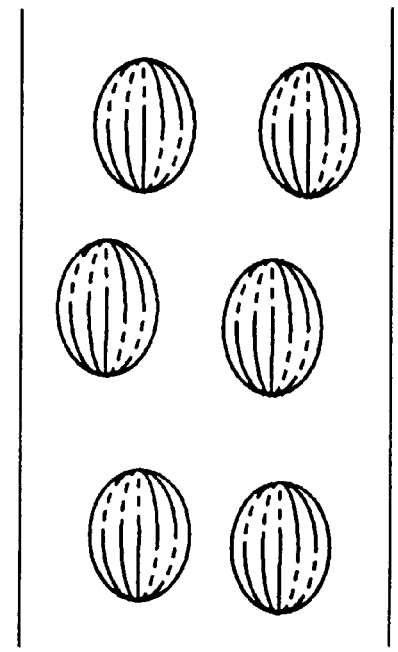
FIG. 36(b) is a sectional view showing the state of the polymer liquid crystal composite layer expanding in volume.
Figure 36A:
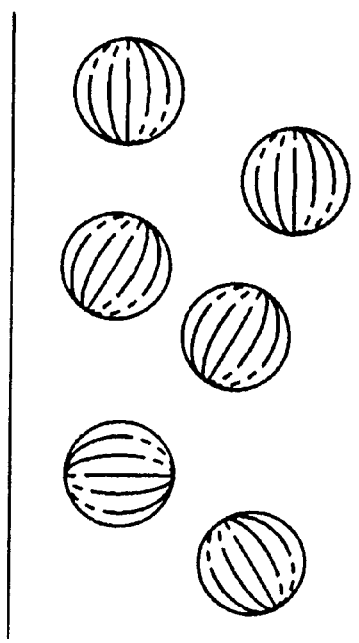
FIG. 36(a) is a sectional view schematically showing the liquid crystal display element.
Figure 37:
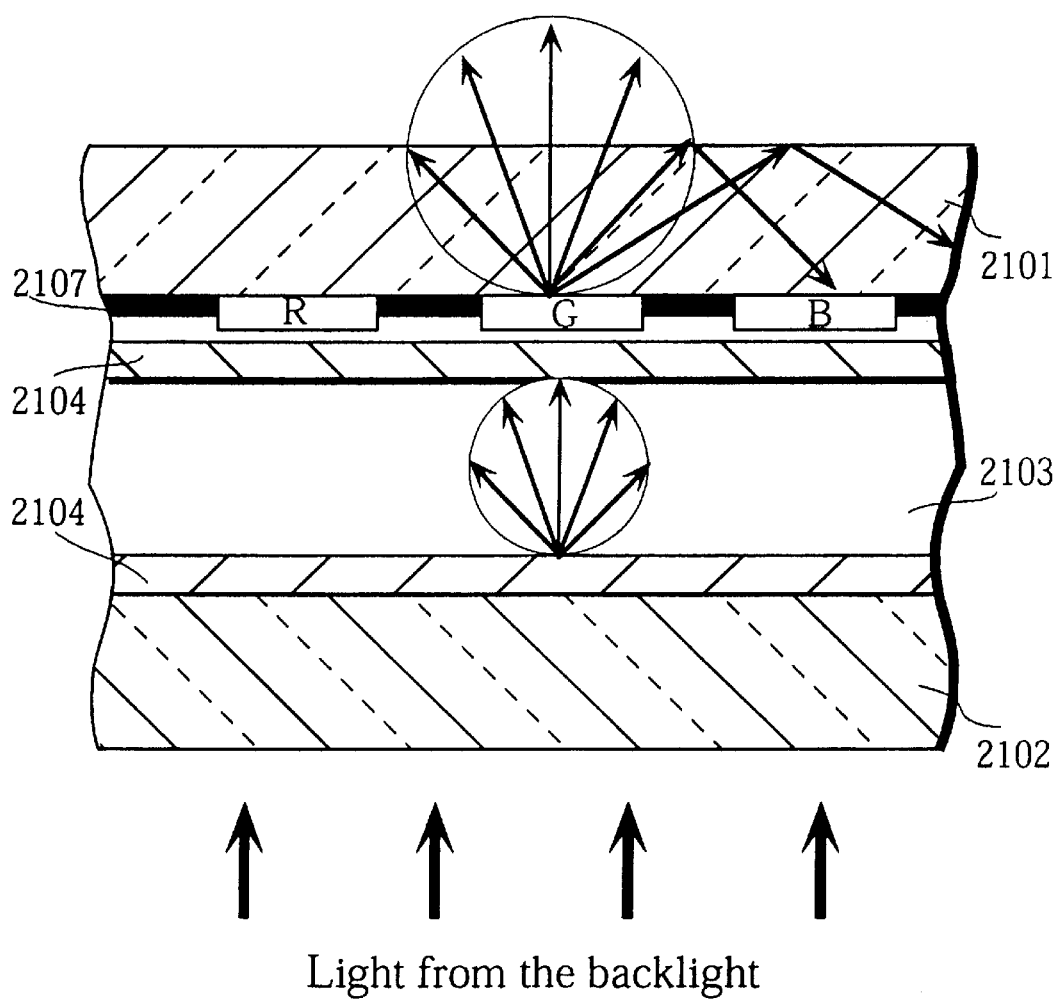
FIG. 37 is a partially sectioned view of the conventional type of liquid crystal display element, showing the state of light being scattering.

Additionally, the invention may be so embodied, as shown in FIG. 30, that no side gap layer 606b exists and the polymer liquid crystal composite layer 605 is formed in a step-like form of its center part 5a projecting upwardly so that the center part 5a can contact with the counter electrodes 604, whereby the gap layer 606a exists only in an area in the vicinity of the sealing material layer 615. It is noted that in the embodiments of the second inventive group, the display screen confronts the opposite substrate 602 side, not the TFT substrate 601 side.

Comparative Example 1

A comparative liquid crystal display element is different in construction from that of the sixth embodiment in that neither the gap layer 606a nor the side gap layer 606b are provided. The comparative liquid crystal display element was produced in the following manner.

A pair of substrates, each forming thereon a transparent conductive layer and others, were bonded together with spaced from each other at a predetermined interval through glass spacers interposed therebetween. Sequentially, the liquid crystal polymer mixture having liquid crystal material and the polymer material as its major materials (e.g. PNM201 (trade name) available from LODIC CO., LTD.) was filled in between the bonded substrates by the vacuum filling method and was irradiated with ultraviolet of a given irradiation intensity from outside, to be polymerized. Thus, the comparative liquid crystal display element in which the polymer liquid crystal composite layer in which liquid crystal droplets were dispersed in the polymer compound was interposed between the substrates was produced. Further, when the comparative liquid crystal display element was deflected by a pressing force being applied thereto in the same manner as in the sixth embodiment, low light-scattering areas appeared in some parts thereof and the display unevenness was visually confirmed.

As seen from the foregoing, it was confirmed from the comparison between the results of the $6^{th}$–$9^{th}$ and $11^{th}$ embodiments and the result of the comparative example 1 that when the gap layer 606a is provided at a predetermined spaced interval of the opposite substrate 602 and the polymer liquid crystal composite layer 605, no display unevenness was caused even when the liquid crystal display element was deflected by a pressing force being applied thereto.

It is to be understood that the embodied forms presented in the detailed description of the invention are only for the purpose of clarifying the technical contents of the invention, and accordingly the invention should not be construed in the narrow sense by limiting to any of those embodied forms, and that various changes and modifications may be made without departing from the sprit or scope of the following claims.

Capabilities of Exploitation in Industry

As described above, the construction of the invention can fully accomplish the objects of the invention.

Specifically, even when cracks develop in an area in the vicinity of the sealant due to ambient temperature variations, since the area in which cracks will develop is adapted to be excluded from the active area, stripy display unevenness caused by the cracks can be prevented from being visually confirmed on the display screen.

Further, the liquid crystal droplets in the non-active area in the vicinity of the sealant are so configured that they are separately dispersed or are made larger than those in the active area, thus preventing development of cracks and generation of stripy display unevenness, with good contrast being maintained.

Furthermore, the polymer liquid crystal composite layer is not formed in non-active area in the vicinity of the sealant, thus preventing development of cracks and generation of stripy display unevenness, with good contrast being maintained.

Additionally, even when the liquid crystal display element is deflected by, for example, a pressing force acting on the substrate, since the gap layer is provided between the liquid crystal polymer composite layer and any one of the substrates, generation of the shearing stress is prevented. As a result of this, areas different in light scattering is prevented from being created in the display screen, so that generation of the display unevenness is reduced.

Further, even when the liquid crystal polymer composite layer expands and contracts in volume due to ambient temperature variations, since the side gap layer is provided between the inner periphery of the sealing material layer and the outer periphery of the liquid crystal polymer composite layer, the cracks are prevented from being developed in the liquid crystal polymer composite layer in the vicinity of the sealing material layer. Therefore, generation of stripy display unevenness due to the cracks can be prevented. In addition, generation of the color mixture among the color material layers R, G, B is reduced and thus reduction of an utilization efficiency of light caused by the black matrixes can be prevented.

Further, since the inspection of switching element, liquid crystal polymer composite layer and others is carried out before the bonding process of the substrates, even when a first substrate is found to have defects, the need for junking a not-defective opposite second substrate including the optical color filter layer together with the first substrate can be eliminated. This can produce enhanced yields and reduced costs. Accordingly, significance in industry of the present invention is of great.

What is claimed is:

1. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is such that said liquid crystal droplets are dispersed and held in a continuous phase of a matrix comprising said polymer compound, or a liquid crystal is dispersed and held in a network of a three-dimensional network-structured matrix comprising said polymer compound;

that said polymer liquid crystal composite layer is so formed that an outer periphery of said polymer liquid crystal composite layer and an inner periphery of said sealant are so formed as to come into intimate contact with each other;

that said polymer liquid crystal composite layer is so divided that a body portion of said polymer liquid crystal composite layer is an active area and a marginal portion of said polymer liquid crystal composite layer in the vicinity of said sealant is a non-active area;

that said polymer liquid crystal composite layer in said active area is such that the liquid crystal droplets are dispersed and held in said continuous phase of matrix comprising polymer compound, with said liquid crystal droplets being partially connected each other, or the liquid crystal is dispersed and held in the networks of matrix of the three dimensional network form comprising the polymer compound; and that a particle size of said liquid crystal droplets in said active area or an interval of said network in said active area, and a particle size of said liquid crystal droplets or an interval of said network in said non-active area, are made to be different from each other.

2. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is such that said liquid crystal droplets are dispersed and held in a continuous phase of a matrix comprising said polymer compound, or a liquid crystal is dispersed and held in a network of a three-dimensional network-structured matrix comprising said polymer compound;

that an outer periphery of said polymer liquid crystal composite layer and an inner periphery of said sealant are so formed as to come into intimate contact with each other;

that said polymer liquid crystal composite layer is so divided that a body portion of said polymer liquid crystal composite layer is an active area and a marginal portion of said polymer liquid crystal composite layer in the vicinity of said sealant is a non-active area;

that said polymer liquid crystal composite layer in said active area is such that the liquid crystal droplets are dispersed and held in said continuous phase of said matrix comprising said polymer compound, with said liquid crystal droplets being partially connected each other, or the liquid crystal is dispersed and held in the networks of matrix of the three dimensional network form comprising the polymer compound; and that a percentage of liquid crystal in said active area and a percentage of liquid crystal in said non-active area are made to be different from each other.

3. A liquid crystal display element according to claim 2, wherein a difference between said percentage of liquid crystal in said active area and said percentage of liquid crystal in said non-active area is not less than 5%.

4. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is such that said liquid crystal droplets are dispersed and held in a continuous phase of a matrix comprising said polymer compound, or a liquid crystal is dispersed and held in a network of a three-dimensional network-structured matrix comprising said polymer compound;

that an outer periphery of said polymer liquid crystal composite layer and an inner periphery of said sealant are so formed as to come into intimate contact with each other; and that, an active area of the liquid crystal display element excludes, in an entire area of said polymer liquid crystal composite layer, an area in the vicinity of said sealant in which a crack develops.

5. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is such that said liquid crystal droplets are dispersed and held in a continuous phase of a matrix comprising said polymer compound, or a liquid crystal is dispersed and held in a network of a three-dimensional network-structured matrix comprising said polymer compound;

that an outer periphery of said polymer liquid crystal composite layer and an inner periphery of said sealant are so formed as to come into intimate contact with each other; and that a material consisting essentially of liquid crystal is filled in an interior of a crack which develops in said polymer liquid crystal composite layer in the vicinity of said sealant.

6. A liquid crystal display element according to claim 5, wherein said material consisting of liquid crystal is filled in said interior of said crack by a heat treatment so as to reduce a difference between an index of refraction of an area in the vicinity of said sealant in which said crack develops and an index of refraction of an area excluding said area in the vicinity of said sealant in which said crack develops.

7. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is such that said liquid crystal droplets are dispersed and held in a continuous phase of a matrix comprising said polymer compound, or a liquid crystal is dispersed and held in a network of a three-dimensional network-structured matrix comprising said polymer compound; and that an area with a frame-like form having a width of not less than 1.5 mm is provided inside an inner periphery of said sealant, and an active area is provided at the inside of said area with a frame-like form.

8. A liquid crystal display element according to claim 7, wherein said area with a frame-like form is disposed within the range of from not less than 2 mm to not more than 6 mm from said inner periphery of the sealant.

9. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is divided into an active area and a non-active area with a frame-like form located in an outer periphery of said active area;

that said polymer liquid crystal composite layer in said active area is such that said liquid crystal droplets are dispersed and held in a continuous phase of a matrix comprising said polymer compound, with said liquid crystal droplets being partially connected each other, or a liquid crystal is dispersed and held in a network of a three-dimensional network-structured matrix comprising said polymer compound; and that said polymer liquid crystal composite layer in said non-active area is such that liquid crystal droplets of generally spherical or ellipsoid of revolution are each separately dispersed and held in a matrix comprising polymer compound.

10. A liquid crystal display element according to claim 9, wherein said non-active area with a frame-like form is has a width of not less than 1.0 mm.

11. A liquid crystal display element according to claim 9, wherein a particle size of said liquid crystal droplets in said active area or an interval of said network in said active area is within the range of 0.8 $\mu$m or more to 1.4 $\mu$m or less, and a particle size of said liquid crystal droplets in said non-active area is less than 0.8 $\mu$m.

12. A liquid crystal display element according to claim 9, wherein a percentage of liquid crystal in said active area is larger than a percentage of liquid crystal in said non-active area.

13. A liquid crystal display element according to claim 12, wherein a percentage of liquid crystal in said active area is within the range of 70% or more to 80% or less and also a percentage of liquid crystal in said non-active area is less than 70%.

14. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is divided into an active area and a non-active area with a frame-like form located in an outer periphery of said active area;

that said polymer liquid crystal composite layer in said active area is such that said liquid crystal droplets are dispersed and held in a continuous phase of a matrix comprising said polymer compound, with said liquid crystal droplets being partially connected each other, or a liquid crystal is dispersed and held in a network of a three-dimensional network-structured matrix comprising said polymer compound; and that said polymer liquid crystal composite layer in said non-active area is so formed that said liquid crystal and said polymer compound are mutually dissolved therein.

15. A liquid crystal display element according to claim 14, wherein said non-active area is an area with a frame-like form having a width of not less than 1.0 mm.

16. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in that said polymer liquid crystal composite layer is provided in a place corresponding to at least an active area, and a side gap layer is provided in an area corresponding to a non-active area disposed between said sealant and said polymer liquid crystal composite layer.

17. A liquid crystal display element according to claim 16, wherein said non-active area is an area with a frame-like form having a width of not less than 1.0 mm.

18. A liquid crystal display element according to claim 17, wherein said side gap layer is a vacuum.

19. A liquid crystal display element according to claim 17, wherein said side gap layer is filled with a gas.

20. A liquid crystal display element according to claim 17, wherein a polymer compound is formed in said side gap layer.

21. A liquid crystal display element wherein a polymer liquid crystal composite layer in which liquid crystal droplets are dispersed in a polymer compound is interposed between a pair of substrates each having an electrode on an inner surface thereof, said pair of substrates being bonded together with a sealant, characterized in:

that said polymer liquid crystal composite layer is such that said liquid crystal droplets are dispersed and held in a continuous phase of a matrix comprising said polymer compound, or a liquid crystal is dispersed and held in a network of a three-dimensional network-structured matrix comprising said polymer compound;

that said polymer liquid crystal composite layer is separated into a non-active area with a frame-like form located in an inner margin of said sealant and an active area arranged at an inside of said non-active area; and that a particle size of said liquid crystal droplets or an interval of said network in said non-active area is larger than a particle size of said liquid crystal droplets in said active area or an interval of said network in said active area.

22. A liquid crystal display element according to claim 21, wherein said non-active area is an area with a frame-like form having a width of not less than 1.0 mm.

23. A liquid crystal display element according to claim 21, wherein a percentage of liquid crystal in said active area is smaller than a percentage of liquid crystal in said non-active area.

24. A liquid crystal display element according to claim 23, wherein a percentage of liquid crystal in said active area is within the range of 70% or more to 80% or less and also a percentage of liquid crystal in said non-active area is more than 80%.

25. A liquid crystal display element according to claim 24, wherein a difference between said percentage of liquid crystal in said active area and said percentage of liquid crystal in said non-active area is not less than 5%.

26. A liquid crystal display element according to claim 21, wherein a particle size of said liquid crystal droplets or an interval of said network existing in the vicinity of said sealant is 1.8 $\mu$m or more, and a particle size of said liquid crystal droplets in said active area or an interval of said network in said active area is within the range of 0.8 $\mu$m or more to 1.4 $\mu$m or less.

27. A method for producing a liquid crystal display element, said method comprising a phase separation step for producing a polymer liquid crystal composite layer in which liquid crystal droplets are dispersed and held in a continuous phase of a matrix comprising a polymer compound or a liquid crystal is dispersed and held in a network of a three-dimensional network-structured matrix comprising a polymer compound, said phase separation step in which a liquid crystal polymer precursor compatible solution including a liquid crystal and a polymer precursor is interposed between a pair of substrates each having an electrode on an inner surface thereof, and thereafter a surface of said substrates is irradiated with ultraviolet so that said liquid crystal and said polymer precursor in said liquid crystal polymer precursor compatible solution are phase-separated by polymerizing and curing said polymer precursor, said phase separation step characterized in that an irradiation intensity of a first ultraviolet, with which an area of said polymer liquid crystal composite layer corresponding to an active area is irradiated, is controlled to be smaller than an irradiation intensity of a second ultraviolet with which an area of said polymer liquid crystal composite layer corresponding to a non-active area is irradiated, so that said liquid crystal display element has such a construction that, in said active area, said liquid crystal droplets are dispersed and held in a continuous phase of a matrix comprising said polymer compound with said liquid crystal droplets being partially connected each other, and in said non-active area, said liquid crystal droplets with approximately spherical or spheroidal form are dispersed and held in a matrix comprising said polymer compound with said liquid crystal droplets being dispersed as discrete droplets.

28. A method for producing a liquid crystal display element, said method comprising a phase separation step for producing a polymer liquid crystal composite layer in which liquid crystal droplets are dispersed and held in a continuous phase of a matrix comprising a polymer compound or a liquid crystal is dispersed and held in a network of a three-dimensional network-structured matrix comprising a polymer compound, said phase separation step in which a liquid crystal polymer precursor compatible solution including a liquid crystal and a polymer precursor is interposed between a pair of substrates each having an electrode on an inner surface thereof, and thereafter an entire surface of said substrates is irradiated with ultraviolet so that said liquid crystal and said polymer precursor in said liquid crystal polymer precursor compatible solution are phase-separated by polymerizing and curing said polymer precursor, said phase separation step characterized in that a shielding means for shielding said ultraviolet is provided over at least a non-active area in said polymer liquid crystal composite layer when applying said ultraviolet.

29. A method for producing a liquid crystal display element according to claim 28, wherein said shielding means is a reflector composed of a material capable of reflecting ultraviolet.

30. A method for producing a liquid crystal display element, said method comprising a phase separation step for producing a polymer liquid crystal composite layer in which liquid crystal droplets are dispersed and held in a continuous phase of a matrix comprising a polymer compound or a liquid crystal is dispersed and held in a network of a three-dimensional network-structured matrix comprising a polymer compound, said phase separation step in which a liquid crystal polymer precursor compatible solution including a liquid crystal and a polymer precursor is interposed between a pair of substrates each having an electrode on an inner surface thereof, and thereafter a surface of said substrates is irradiated with ultraviolet so that said liquid crystal and said polymer precursor in said liquid crystal polymer precursor compatible solution are phase-separated by polymerizing and curing said polymer precursor, said phase separation step characterized in that an irradiation intensity of a first ultraviolet, with which an area of said polymer liquid crystal composite layer corresponding to an active area is irradiated, is controlled to be larger than an irradiation intensity of a second ultraviolet, with which an area of said polymer liquid crystal composite layer corresponding to a non-active area is irradiated, so that said polymer liquid crystal composite layer is made to have such a construction that said liquid crystal droplets are dispersed and held in a continuous phase of a matrix comprising said polymer compound, or said liquid crystal is dispersed and held in a network of a three-dimensional network-structured matrix comprising said polymer compound, and a particle size of said liquid crystal droplets in said active area or an interval of said network in said active area is made smaller than a particle size of said liquid crystal droplets in said non-active area or an interval of said network in said non-active area.

31. A method for producing a liquid crystal display element according to claim 30, wherein said irradiation intensity of the first ultraviolet is 50 mW/cm$^2$ or more and said irradiation intensity of the second ultraviolet is 20 mW/cm$^2$ or less.

* * * * *